United States Patent
Holtz et al.

(10) Patent No.: US 12,548,327 B2
(45) Date of Patent: *Feb. 10, 2026

(54) AERIAL VEHICLE SMART LANDING

(71) Applicant: Skydio, Inc., Redwood City, CA (US)

(72) Inventors: Kristen Marie Holtz, Redwood City, CA (US); Hayk Martirosyan, Emerald Hills, CA (US); Jack Louis Zhu, Redwood City, CA (US); Adam Parker Bry, Redwood City, CA (US); Matthew Joseph Donahoe, Redwood City, CA (US); Abraham Galton Bachrach, San Francisco, CA (US); Peter Benjamin Henry, San Francisco, CA (US); Ryan David Kennedy, San Francisco, CA (US)

(73) Assignee: Skydio, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/665,811

(22) Filed: Feb. 7, 2022

(65) Prior Publication Data
US 2022/0234733 A1 Jul. 28, 2022

Related U.S. Application Data

(63) Continuation of application No. 16/272,111, filed on Feb. 11, 2019, now Pat. No. 11,242,144.
(Continued)

(51) Int. Cl.
*G06V 20/40* (2022.01)
*B64U 70/90* (2023.01)
(Continued)

(52) U.S. Cl.
CPC .............. *G06V 20/41* (2022.01); *B64U 70/90* (2023.01); *G06V 10/225* (2022.01);
(Continued)

(58) Field of Classification Search
CPC .............. B64C 39/024; B64C 2201/06; B64C 2201/123; B64C 2201/127;
(Continued)

(56) References Cited

U.S. PATENT DOCUMENTS 6,604,706 B1    8/2003   Bostan
9,511,878 B1 *  12/2016  McDermott ......... G08B 21/185
(Continued)

FOREIGN PATENT DOCUMENTS

CN    107444665 A    12/2017
JP    2014-513642 A   6/2014
(Continued)

OTHER PUBLICATIONS

Takahashi, Marc D. et al., "Evaluation Of Safe Landing Area Determination Algorithms For Autonomous Rotorcraft Using Site Benchmarking," Journal of the American Helicopter Society, vol. 58, pp. 032007-1-032007-13, 2013.
(Continued)

*Primary Examiner* — Hussein Elchanti

(57) ABSTRACT

A technique is introduced for autonomous landing by an aerial vehicle. In some embodiments, the introduced technique includes processing a sensor data such as images captured by onboard cameras to generate a ground map comprising multiple cells. A suitable footprint, comprising a subset of the multiple cells in the ground map that satisfy one or more landing criteria, is selected and control commands are generated to cause the aerial vehicle to autonomously land on an area corresponding to the footprint. In some embodiments, the introduced technique involves a geometric smart landing process to select a relatively flat area on the ground for landing. In some embodiments, the introduced technique involves a semantic smart landing
(Continued)

process where semantic information regarding detected objects is incorporated into the ground map.

20 Claims, 27 Drawing Sheets

Related U.S. Application Data

(60) Provisional application No. 62/628,871, filed on Feb. 9, 2018.

(51) Int. Cl.

| | |
|---|---|
| G06V 10/22 | (2022.01) |
| G06V 10/764 | (2022.01) |
| G06V 10/82 | (2022.01) |
| G06V 20/13 | (2022.01) |
| G06V 20/17 | (2022.01) |
| G06V 20/58 | (2022.01) |
| G06V 20/64 | (2022.01) |
| B64U 10/14 | (2023.01) |
| B64U 50/30 | (2023.01) |
| B64U 50/34 | (2023.01) |
| B64U 101/30 | (2023.01) |

(52) U.S. Cl.
CPC ............ *G06V 10/764* (2022.01); *G06V 10/82* (2022.01); *G06V 20/13* (2022.01); *G06V 20/17* (2022.01); *G06V 20/58* (2022.01); *G06V 20/64* (2022.01); *B64U 10/14* (2023.01); *B64U 50/30* (2023.01); *B64U 50/34* (2023.01); *B64U 2101/30* (2023.01); *B64U 2201/10* (2023.01); *B64U 2201/20* (2023.01); *B64U 2201/202* (2023.01)

(58) Field of Classification Search
CPC ........ B64C 2201/141; B64C 2201/148; B64C 2201/18; G06V 20/64; G06V 20/41; G06V 20/13
See application file for complete search history.

(56) References Cited

U.S. PATENT DOCUMENTS

| | | | | |
|---|---|---|---|---|
| 9,609,288 | B1* | 3/2017 | Richman | G06T 17/05 |
| 9,630,713 | B1 | 4/2017 | Von Novak, III | |
| 11,242,141 | B2* | 2/2022 | Yoeli | B64C 27/26 |
| 11,242,144 | B2* | 2/2022 | Holtz | G06V 10/225 |
| 2005/0230563 | A1* | 10/2005 | Corcoran, III | G05D 1/104 |
| | | | | 244/175 |
| 2006/0231675 | A1 | 10/2006 | Bostan | |
| 2009/0257314 | A1* | 10/2009 | Davis | G01S 5/18 |
| | | | | 367/125 |
| 2010/0100269 | A1* | 4/2010 | Ekhaguere | G08G 5/74 |
| | | | | 701/26 |
| 2015/0153740 | A1 | 6/2015 | Ben-Shachar et al. | |
| 2015/0302858 | A1* | 10/2015 | Hearing | G01H 1/00 |
| | | | | 381/58 |
| 2016/0027314 | A1* | 1/2016 | Stathis | G01C 21/20 |
| | | | | 701/461 |
| 2016/0039300 | A1 | 2/2016 | Wang et al. | |
| 2016/0039541 | A1 | 2/2016 | Beardsley et al. | |
| 2016/0063009 | A1* | 3/2016 | Charania | G06F 16/125 |
| | | | | 707/693 |
| 2016/0111006 | A1* | 4/2016 | Srivastava | G05D 1/00 |
| | | | | 701/3 |
| 2017/0017240 | A1* | 1/2017 | Sharma | B64U 70/93 |
| 2017/0075360 | A1 | 3/2017 | Von Novak | |
| 2017/0148467 | A1* | 5/2017 | Franklin | G10L 25/39 |
| 2017/0154535 | A1* | 6/2017 | Downey | G08G 5/58 |
| 2017/0158327 | A1 | 6/2017 | Willford | |
| 2017/0178518 | A1* | 6/2017 | Foladare | G08G 5/59 |
| 2017/0197729 | A1* | 7/2017 | Derenick | G08G 5/55 |
| 2017/0243494 | A1* | 8/2017 | Taveira | G08G 5/26 |
| 2017/0267334 | A1* | 9/2017 | Tsai | G06V 20/13 |
| 2017/0267343 | A1* | 9/2017 | Chen | G08G 5/22 |
| 2017/0355453 | A1 | 12/2017 | Kim et al. | |
| 2018/0056743 | A1 | 3/2018 | Zhou et al. | |
| 2018/0059665 | A1 | 3/2018 | Shin et al. | |
| 2018/0357909 | A1* | 12/2018 | Eyhorn | G08G 5/34 |
| 2019/0002122 | A1* | 1/2019 | Ding | G08G 5/32 |
| 2019/0009893 | A1 | 1/2019 | Toyama et al. | |
| 2019/0041871 | A1 | 2/2019 | Wang | |
| 2019/0163206 | A1* | 5/2019 | Zhu | B64U 60/50 |
| 2019/0227572 | A1* | 7/2019 | Blonder | G05D 1/0676 |
| 2019/0227573 | A1* | 7/2019 | Addonisio | B64U 70/00 |

FOREIGN PATENT DOCUMENTS

| | | |
|---|---|---|
| WO | 2017/172486 A1 | 10/2017 |
| WO | 2017/206384 A1 | 12/2017 |
| WO | 2019157455 A1 | 8/2019 |

OTHER PUBLICATIONS

Japanese Patent Application No. 2020-564803, Office Action, 21 pages, Apr. 22, 2022.

* cited by examiner

AERIAL VEHICLE SMART LANDING

CROSS-REFERENCE TO RELATED APPLICATION(S)

This application is a continuation of U.S. patent application Ser. No. 16/272,111, titled "AERIAL VEHICLE SMART LANDING," filed Feb. 11, 2019; which is entitled to the benefit and/or right of priority of U.S. Provisional Patent Application No. 62/628,871, titled "UNMANNED AERIAL VEHICLE SMART LANDING," filed Feb. 9, 2018; the contents of each of which are hereby incorporated by reference in their entirety for all purposes. This application is therefore entitled to a priority date of Feb. 9, 2018.

TECHNICAL FIELD

The present disclosure generally relates to autonomous vehicle technology.

BACKGROUND

Vehicles can be configured to autonomously navigate a physical environment. For example, an autonomous vehicle with various onboard sensors can be configured to generate perception inputs based on the surrounding physical environment that are then used to estimate a position and/or orientation of the autonomous vehicle within the physical environment. An autonomous navigation system can then utilize these position and/or orientation estimates to guide the autonomous vehicle through the physical environment.

DETAILED DESCRIPTION

Overview

There are a variety of circumstances that may render continued flight by an unmanned aerial vehicle (UAV) unsafe or otherwise undesirable. For example, the batteries onboard the UAV may be low on charge or certain systems (e.g., for visual navigation) may not be operating properly. Even in nominal use cases, a UAV may reach a point during normal flight in which it has only enough charge left in its batteries to complete a controlled descent and landing before power is lost. Whatever the situation, circumstances may require an autonomous landing by the UAV.

A technique is introduced that enables autonomous smart landing by a UAV. In some embodiments, the introduced technique allows a UAV (or associated autonomous navigation system) to utilize available information to choose a safe location for landing that: 1) avoids contact and/or injury to any person; 2) avoids contact and/or damage to any property including the UAV itself; and/or 3) is convenient or otherwise desirable for the user and that user's particular use case. In some embodiments, a UAV may be configured to perform a geometric smart landing which chooses the flattest area of ground currently visible to the UAV in order to land. Some embodiments may involve incorporating semantic knowledge of the surrounding physical environment in order to select a landing spot that satisfies (as close as possible) the above requirements. In some embodiments, the UAV may be configured to collect information during user-guided or -controlled landing to train landing selection processes.

Example Implementation of an Unmanned Aerial Vehicle

Figure 1:
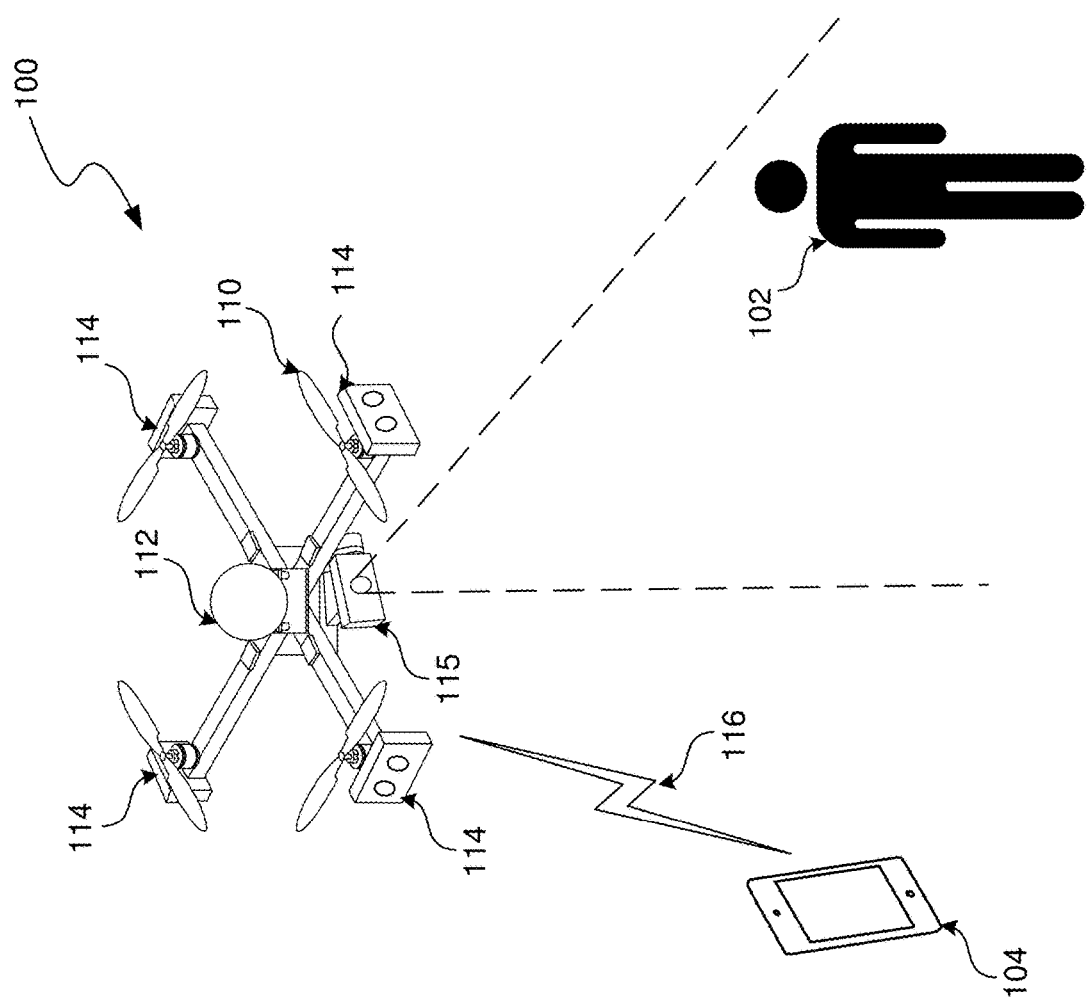
FIG. 1 shows an example configuration of an autonomous vehicle in the form of an unmanned aerial vehicle (UAV) within which certain techniques described herein may be applied.

FIG. 1 shows an example configuration of a UAV 100 within which certain techniques described herein may be applied. As shown in FIG. 1, UAV 100 may be configured as a rotor-based aircraft (e.g., a "quadcopter"), although the other introduced technique can similarly be applied in other types of UAV such as fixed-wing aircraft. The example UAV 100 includes control actuators 110 for maintaining controlled flight. The control actuators 110 may comprise or be associated with a propulsion system (e.g., rotors) and/or one or more control surfaces (e.g., flaps, ailerons, rudder, etc.) depending on the configuration of the UAV. The example UAV 100 depicted in FIG. 1 include control actuators 110 in the form of electronic rotors that comprise a propulsion system of the UAV 100. The UAV 100 also includes various sensors for automated navigation and flight control 112, and one or more image capture devices 114 and 115 for capturing images of the surrounding physical environment while in flight. "Images," in this context, include both still images and captured video. Although not shown in FIG. 1, UAV 100 may also include other sensors (e.g., for capturing audio) and systems for communicating with other devices, such as a mobile device 104, via a wireless communication channel 116.

In the example depicted in FIG. 1, the image capture devices 114 and/or 115 are depicted capturing an object 102 in the physical environment that happens to be a person. In some cases, the image capture devices may be configured to capture images for display to users (e.g., as an aerial video platform) and/or, as described above, may also be configured for capturing images for use in autonomous navigation. In other words, the UAV 100 may autonomously (i.e., without direct human control) navigate the physical environment, for example, by processing images captured by any one or more image capture devices. While in autonomous flight, UAV 100 can also capture images using any one or more image capture devices that can be displayed in real time and or recorded for later display at other devices (e.g., mobile device 104).

FIG. 1 shows an example configuration of a UAV 100 with multiple image capture devices configured for different purposes. In the example configuration shown in FIG. 1, the UAV 100 includes multiple image capture devices 114 arranged about a perimeter of the UAV 100. The image capture device 114 may be configured to capture images for use by a visual navigation system in guiding autonomous flight by the UAV 100 and/or a tracking system for tracking other objects in the physical environment (e.g., as described with respect to FIG. 2). Specifically, the example configuration of UAV 100 depicted in FIG. 1 includes an array of multiple stereoscopic image capture devices 114 placed around a perimeter of the UAV 100 so as to provide stereoscopic image capture up to a full 360 degrees around the UAV 100.

In addition to the array of image capture devices 114, the UAV 100 depicted in FIG. 1 also includes another image capture device 115 configured to capture images that are to be displayed, but not necessarily used, for navigation. In some embodiments, the image capture device 115 may be similar to the image capture devices 114, except in how captured images are utilized. However, in other embodiments, the image capture devices 115 and 114 may be configured differently to suit their respective roles.

In many cases, it is generally preferable to capture images that are intended to be viewed at as high a resolution as possible given certain hardware and software constraints. On the other hand, if used for visual navigation and/or object tracking, lower resolution images may be preferable in certain contexts to reduce processing load and provide more robust motion planning capabilities. Accordingly, in some embodiments, the image capture device 115 may be configured to capture relatively high resolution (e.g., 3840×2160) color images, while the image capture devices 114 may be configured to capture relatively low resolution (e.g., 320× 240) grayscale images.

The UAV 100 can be configured to track one or more objects such as a human subject 102 through the physical environment based on images received via the image capture devices 114 and/or 115. Further, the UAV 100 can be configured to track image capture of such objects, for example, for filming purposes. In some embodiments, the image capture device 115 is coupled to the body of the UAV 100 via an adjustable mechanism that allows for one or more degrees of freedom of motion relative to a body of the UAV 100. The UAV 100 may be configured to automatically adjust an orientation of the image capture device 115 so as to track image capture of an object (e.g., human subject 102) as both the UAV 100 and object are in motion through the physical environment. In some embodiments, this adjustable mechanism may include a mechanical gimbal mechanism that rotates an attached image capture device about one or more axes. In some embodiments, the gimbal mechanism may be configured as a hybrid mechanical-digital gimbal system coupling the image capture device 115 to the body of the UAV 100. In a hybrid mechanical-digital gimbal system, orientation of the image capture device 115 about one or more axes may be adjusted by mechanical means, while orientation about other axes may be adjusted by digital means. For example, a mechanical gimbal mechanism may handle adjustments in the pitch of the image capture device 115, while adjustments in the roll and yaw are accomplished digitally by transforming (e.g., rotating, panning, etc.) the captured images so as to effectively provide at least three degrees of freedom in the motion of the image capture device 115 relative to the UAV 100.

Mobile device 104 may include any type of mobile device such as a laptop computer, a table computer (e.g., Apple iPad™), a cellular telephone, a smart phone (e.g., Apple iPhone™), a handled gaming device (e.g., Nintendo Switch™), a single-function remote control device, or any other type of device capable of receiving user inputs, transmitting signals for delivery to the UAV 100 (e.g., based on the user inputs), and/or presenting information to the user (e.g., based on sensor data gathered by the UAV 100). In some embodiments, the mobile device 104 may include a touch screen display and an associated graphical user interface (GUI) for receiving user inputs and presenting information. In some embodiments, the mobile device 104 may include various sensors (e.g., an image capture device, accelerometer, gyroscope, GPS receiver, etc.) that can collect sensor data. In some embodiments, such sensor data can be communicated to the UAV 100, for example, for use by an onboard navigation system of the UAV 100.

Figure 2:
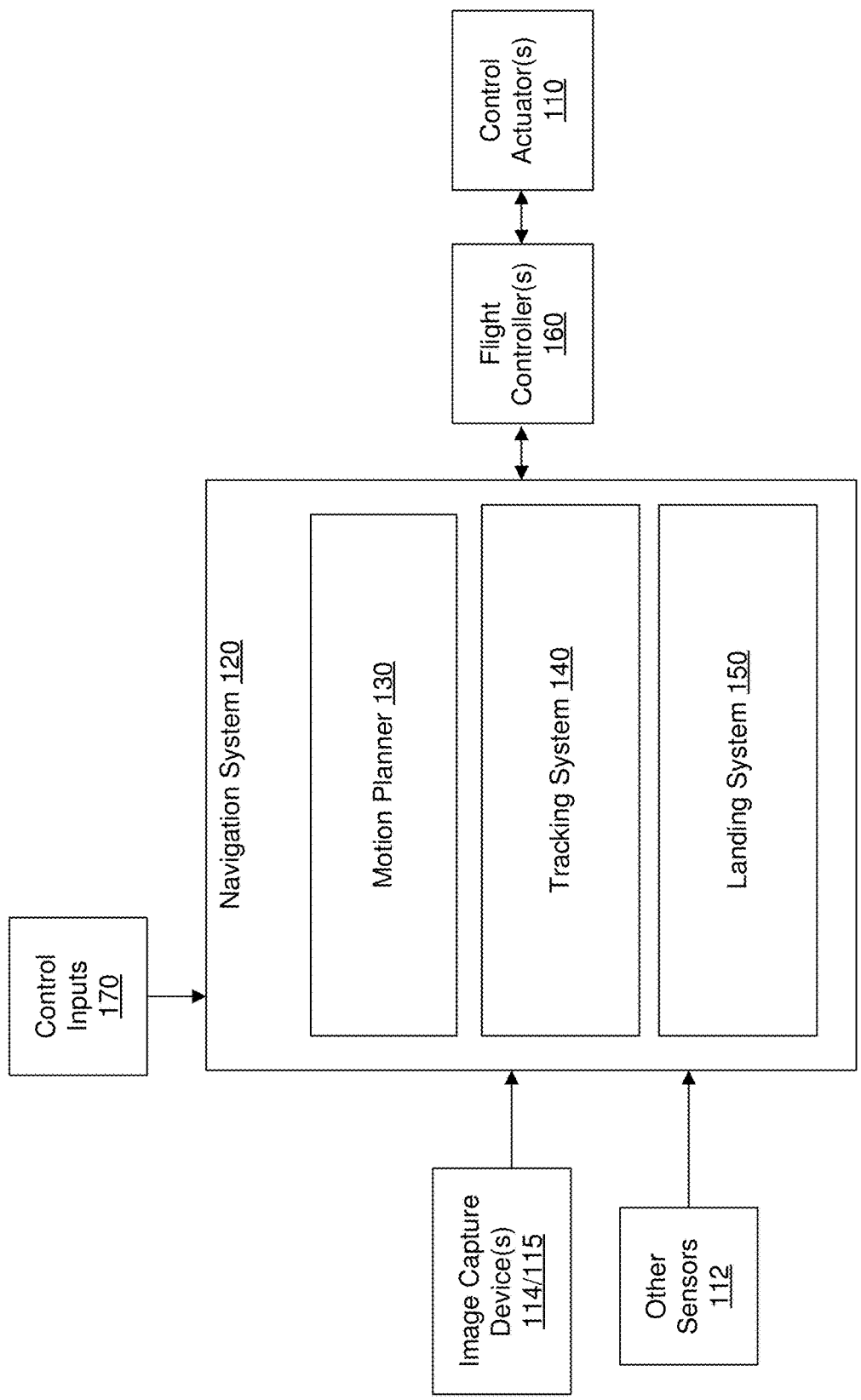
FIG. 2 shows a block diagram of an example navigation system that may be implemented with the UAV of FIG. 1.

FIG. 2 is a block diagram that illustrates an example navigation system 120 that may be implemented as part of the example UAV 100 described with respect to FIG. 1. The navigation system 120 may include any combination of hardware and/or software. For example, in some embodiments, the navigation system 120 and associated subsystems may be implemented as instructions stored in memory and executable by one or more processors.

As shown in FIG. 2, the example navigation system 120 includes a motion planner 130 (also referred to herein as a "motion planning system") for autonomously maneuvering the UAV 100 through a physical environment, a tracking system 140 for tracking one or more objects in the physical environment, and a landing system 150 for performing the smart landing technique described herein. Note that the arrangement of systems shown in FIG. 2 is an example provided for illustrative purposes and is not to be construed as limiting. For example, in some embodiments, the tracking system 140 and/or landing system 150 may be separate from the navigation system 120. Further, the subsystems making up the navigation system 120 may not be logically separated as shown in FIG. 2 and instead may effectively operate as single integrated navigation system.

In some embodiments, the motion planner 130, operating separately or in conjunction with the tracking system 140, is configured to generate a planned trajectory through a three-dimensional (3D) space of a physical environment based, for example, on images received from image capture devices 114 and/or 115, data from other sensors 112 (e.g., IMU, GPS, proximity sensors, etc.), and/or one or more control inputs 170. Control inputs 170 may be from external sources such as a mobile device operated by a user or may be from other systems onboard the UAV.

In some embodiments, the navigation system 120 may generate control commands configured to cause the UAV 100 to maneuver along the planned trajectory generated by the motion planner 130. For example, the control commands may be configured to control one or more control actuators 110 (e.g., rotors and/or control surfaces) to cause the UAV 100 to maneuver along the planned 3D trajectory. Alternatively, a planned trajectory generated by the motion planner 130 may be output to a separate flight controller 160 that is configured to process trajectory information and generate appropriate control commands configured to control the one or more control actuators 110.

The tracking system 140, operating separately or in conjunction with the motion planner 130, may be configured to track one or more objects in the physical environment based, for example, on images received from image capture devices 114 and/or 115, data from other sensors 112 (e.g., IMU, GPS, proximity sensors, etc.), one or more control inputs 170 from external sources (e.g., from a remote user, navigation application, etc.), and/or one or more specified tracking objectives. Tracking objectives may include, for example, a designation by a user to track a particular detected object in the physical environment or a standing objective to track objects of a particular classification (e.g., people).

As alluded to above, the tracking system 140 may communicate with the motion planner 130, for example, to maneuver the UAV 100 based on measured, estimated, and/or predicted positions, orientations, and/or trajectories of objects in the physical environment. For example, the tracking system 140 may communicate a navigation objective to the motion planner 130 to maintain a particular separation distance to a tracked object that is in motion.

In some embodiments, the tracking system 140, operating separately or in conjunction with the motion planner 130, is further configured to generate control commands configured to cause a mechanism to adjust an orientation of any image capture devices 114/115 relative to the body of the UAV 100 based on the tracking of one or more objects. Such a mechanism may include a mechanical gimbal or a hybrid digital-mechanical gimbal, as previously described. For example, while tracking an object in motion relative to the UAV 100, the tracking system 140 may generate control commands configured to adjust an orientation of an image capture device 115 so as to keep the tracked object centered in the field of view (FOV) of the image capture device 115 while the UAV 100 is in motion. Similarly, the tracking system 140 may generate commands or output data to a digital image processor (e.g., that is part of a hybrid digital-mechanical gimbal) to transform images captured by the image capture device 115 to keep the tracked object centered in the FOV of the image capture device 115 while the UAV 100 is in motion.

The landing system 150, operating separately or in conjunction with the motion planner 130, may be configured to determine when to initiate a landing procedure (e.g., in response to a user command or a detected event such as low battery), identify a landing location (e.g., based on images received from image capture devices 114 and/or 115 and/or data from other sensors 112 (e.g., IMU, GPS, proximity sensors, etc.)) and generate control commands configured to cause the UAV to land at the selected location. Note that in some embodiments, the landing system 150 may be configured to generate an output in the form of a landing objective and input the landing objective into the motion planner 130 where that landing objective is utilized along with other objectives (e.g., avoiding collisions with objects) to autonomously land the UAV.

In some embodiments, a navigation system 120 (e.g., specifically a motion planning component 130) is configured to incorporate multiple objectives at any given time to generate an output such as a planned trajectory that can be used to guide the autonomous behavior of the UAV 100. For example, certain built-in objectives, such as obstacle avoidance and vehicle dynamic limits, can be combined with other input objectives (e.g., a landing objective) as part of a trajectory generation process. In some embodiments, the trajectory generation process can include gradient-based optimization, gradient-free optimization, sampling, end-to-end learning, or any combination thereof. The output of this trajectory generation process can be a planned trajectory over some time horizon (e.g., 10 seconds) that is configured to be interpreted and utilized by a flight controller 160 to generate control commands that cause the UAV 100 to maneuver according to the planned trajectory. A motion planner 130 may continually perform the trajectory generation process as new perception inputs (e.g., images or other sensor data) and objective inputs are received. Accordingly, the planned trajectory may be continually updated over some time horizon, thereby enabling the UAV 100 to dynamically and autonomously respond to changing conditions.

Figure 3A:
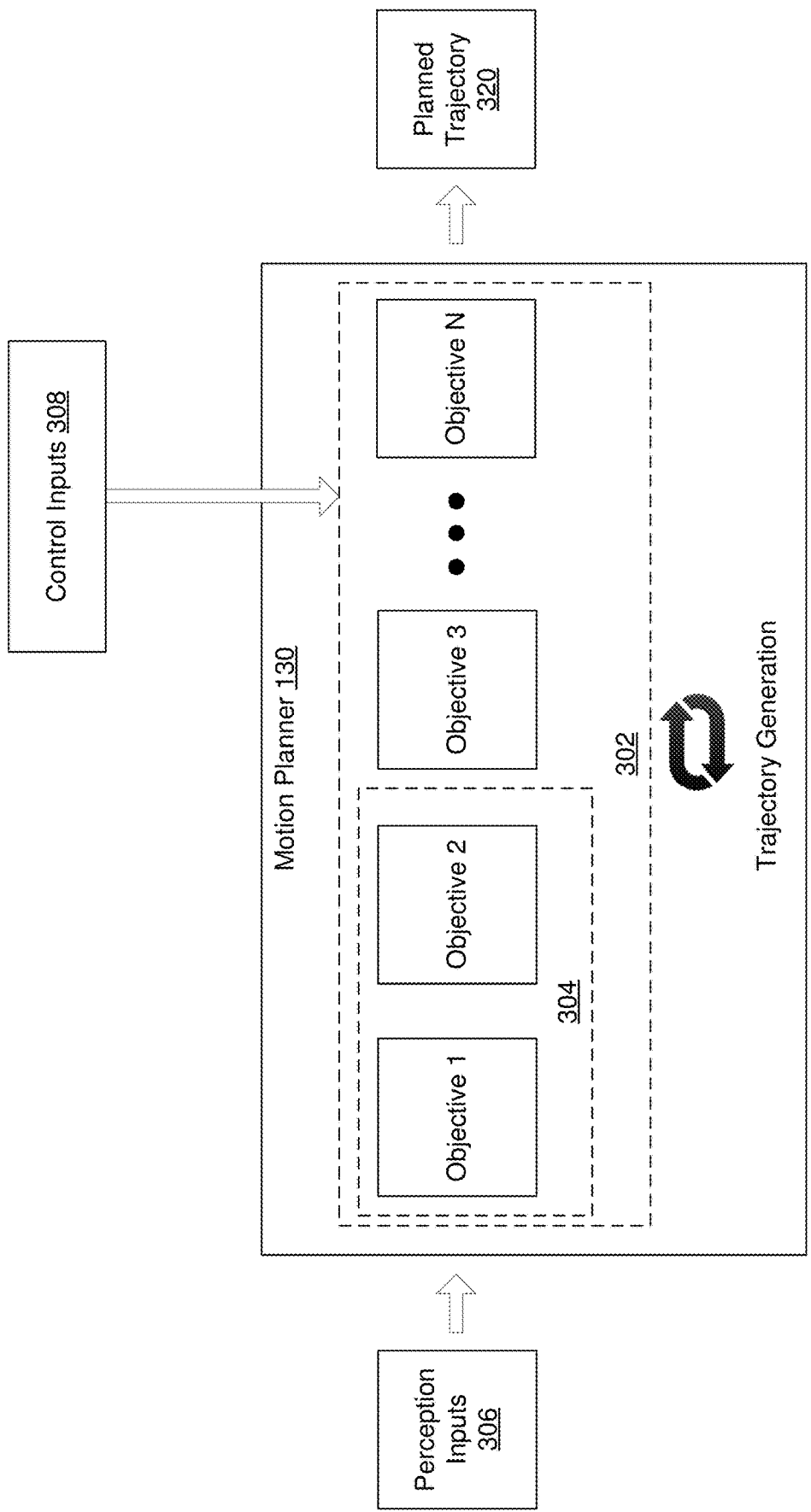
FIG. 3A shows a block diagram of an example motion planning system that may be part of the navigation system of FIG. 2.

FIG. 3A shows a block diagram that illustrates an example system for objective-based motion planning. As shown in FIG. 3A, a motion planner 130 (e.g., as discussed with respect to FIG. 2) may generate and continually update a planned trajectory 320 based on a trajectory generation process involving one or more objectives (e.g., as previously described) and/or more perception inputs 306. The perception inputs 306 may include images received from one or more image capture devices 114/115, results of processing such images (e.g., disparity images or depth values), and/or sensor data from one or more other sensors 112 onboard the UAV 100 or associated with other computing devices (e.g., mobile device 104) in communication with the UAV 100. The one or more objectives 302 utilized in the motion planning process may include built-in objectives governing high-level behavior (e.g., avoiding collision with other objects, the smart landing technique described herein, etc.)

as well as objectives based on control inputs 308 (e.g., from users). Each of the objectives 302 may be encoded as one or more equations for incorporation in one or more motion planning equations utilized by the motion planner 130 when generating a planned trajectory to satisfy the one or more objectives. The control inputs 308 may be in the form of control commands from a user or from other components of the navigation system 120 such as a tracking system 140 and/or a smart landing system 150. In some embodiments, such inputs are received in the form of calls to an application programming interface (API) associated with the navigation system 120. In some embodiments, the control inputs 308 may include predefined objectives that are generated by other components of the navigation system 120 such as tracking system 140 or landing system 150.

Figure 3B:
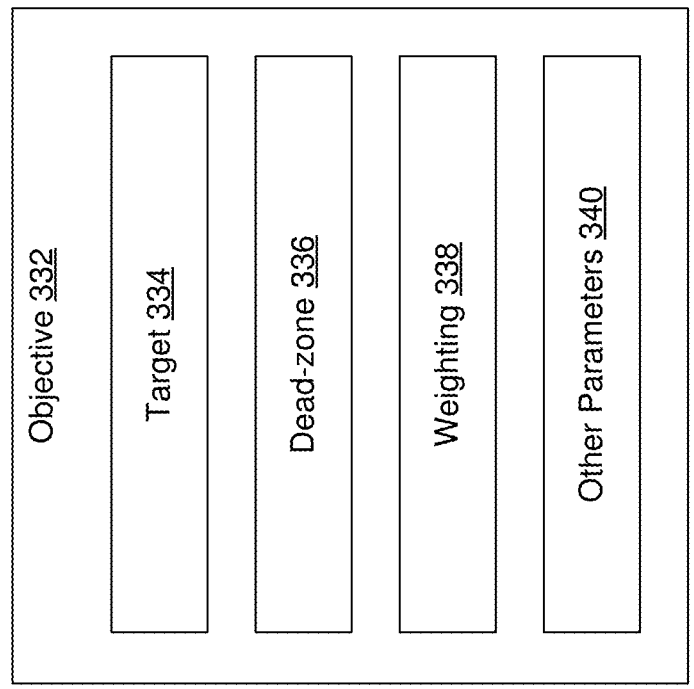
FIG. 3B shows a block diagram of representing an example objective that can be incorporated into the motion planning system depicted in FIG. 3A.

Each given objective of the set of one or more objectives 302 utilized in the motion planning process may include one or more defined parameterizations that are exposed through the API. For example, FIG. 3B shows an example objective 332 that includes a target 334, a dead-zone 336, a weighting factor 338, and other parameters 3400.

The target 344 defines the goal of the particular objective that the motion planner 130 will attempt to satisfy when generating a planned trajectory 320. For example, the target 334 of a given objective may be to maintain line of sight with one or more detected objects or to fly to a particular position in the physical environment.

The dead-zone defines a region around the target 334 in which the motion planner 130 may not take action to correct. This dead-zone 336 may be thought of as a tolerance level for satisfying a given target 334. For example, a target of an example image-relative objective may be to maintain image capture of a tracked object such that the tracked object appears at a particular position in the image space of a captured image (e.g., at the center). To avoid continuous adjustments based on slight deviations from this target, a dead-zone is defined to allow for some tolerance. For example, a dead-zone can be defined in a y-direction and x-direction surround a target location in the image space. In other words, as long as the tracked object appears within an area of the image bounded by the target and respective dead-zones, the objective is considered satisfied.

The weighting factor 336 (also referred to as an "aggressiveness" factor) defines a relative level of impact the particular objective 332 will have on the overall trajectory generation process performed by the motion planner 130. Recall that a particular objective 332 may be one of several objectives 302 that may include competing targets. In an ideal scenario, the motion planner 130 will generate a planner trajectory 320 that perfectly satisfies all of the relevant objectives at any given moment. For example, the motion planner 130 may generate a planned trajectory that maneuvers the UAV 100 to a particular GPS coordinate while following a tracked object, capturing images of the tracked object, maintaining line of sight with the tracked object, and avoiding collisions with other objects. In practice, such an ideal scenario may be rare. Accordingly, the motion planner system 130 may need to favor one objective over another when the satisfaction of both is impossible or impractical (for any number of reasons). The weighting factors for each of the objectives 302 define how they will be considered by the motion planner 130.

In an example embodiment, a weighting factor is numerical value on a scale of 0.0 to 1.0. A value of 0.0 for a particular objective may indicate that the motion planner 130 can completely ignore the objective (if necessary), while a value of 1.0 may indicate that the motion planner 130 will make a maximum effort to satisfy the objective while maintaining safe flight. A value of 0.0 may similarly be associated with an inactive objective and may be set to zero, for example, in response to toggling by an application 1210 of the objective from an active state to an inactive state. Low weighting factor values (e.g., 0.0-0.4) may be set for certain objectives that are based around subjective or aesthetic targets such as maintaining visual saliency in the captured images. Conversely, higher weighting factor values (e.g., 0.5-1.0) may be set for more critical objectives such as avoiding a collision with another object.

In some embodiments, the weighting factor values 338 may remain static as a planned trajectory is continually updated while the UAV 100 is in flight. Alternatively, or in addition, weighting factors for certain objectives may dynamically change based on changing conditions, while the UAV 100 is in flight. For example, an objective to avoid an area associated with uncertain depth value calculations in captured images (e.g., due to low light conditions) may have a variable weighting factor that increases or decreases based on other perceived threats to the safe operation of the UAV 100. In some embodiments, an objective may be associated with multiple weighting factor values that change depending on how the objective is to be applied. For example, a collision avoidance objective may utilize a different weighting factor depending on the class of a detected object that is to be avoided. As an illustrative example, the system may be configured to more heavily favor avoiding a collision with a person or animal as opposed to avoiding a collision with a building or tree.

The UAV 100 shown in FIG. 1 and the associated navigation system 120 shown in FIG. 2 are examples provided for illustrative purposes. A UAV 100, in accordance with the present teachings, may include more or fewer components than are shown. Further, the example UAV 100 depicted in FIG. 1 and associated navigation system 120 depicted in FIG. 2 may include or be part of one or more of the components of the example UAV system 2100 described with respect to FIG. 21 and/or the example computer processing system 2200 described with respect to FIG. 22. For example, the aforementioned navigation system 120 and associated motion planner 130, tracking system 140, and landing system 150 may include or be part of the UAV system 2100 and/or computer processing system 2200.

The introduced technique for smart landing is described in the context of an unmanned aerial vehicle such as the UAV 100 depicted in FIG. 1 for illustrative simplicity; however, the introduced technique is not limited to this context. The introduced technique may similarly be applied to guide the landing of other types of aerial vehicles, such as manned rotor craft such as helicopters or a manned or unmanned fixed-wing aircraft. For example, a manned aircraft may include an autonomous navigation component (e.g., navigation system 120) in addition to a manual control (direct or indirect) component. During a landing sequence, control of the craft may switch over from manual control component to an automated control component where the introduced technique for touchdown detection is performed. Switchover from manual control to automated control may be executed in response to a pilot input and/or automatically in response to a detected event such as a remote signal, environmental conditions, operational state of the aircraft etc.

Smart Landing Process

Figure 4:
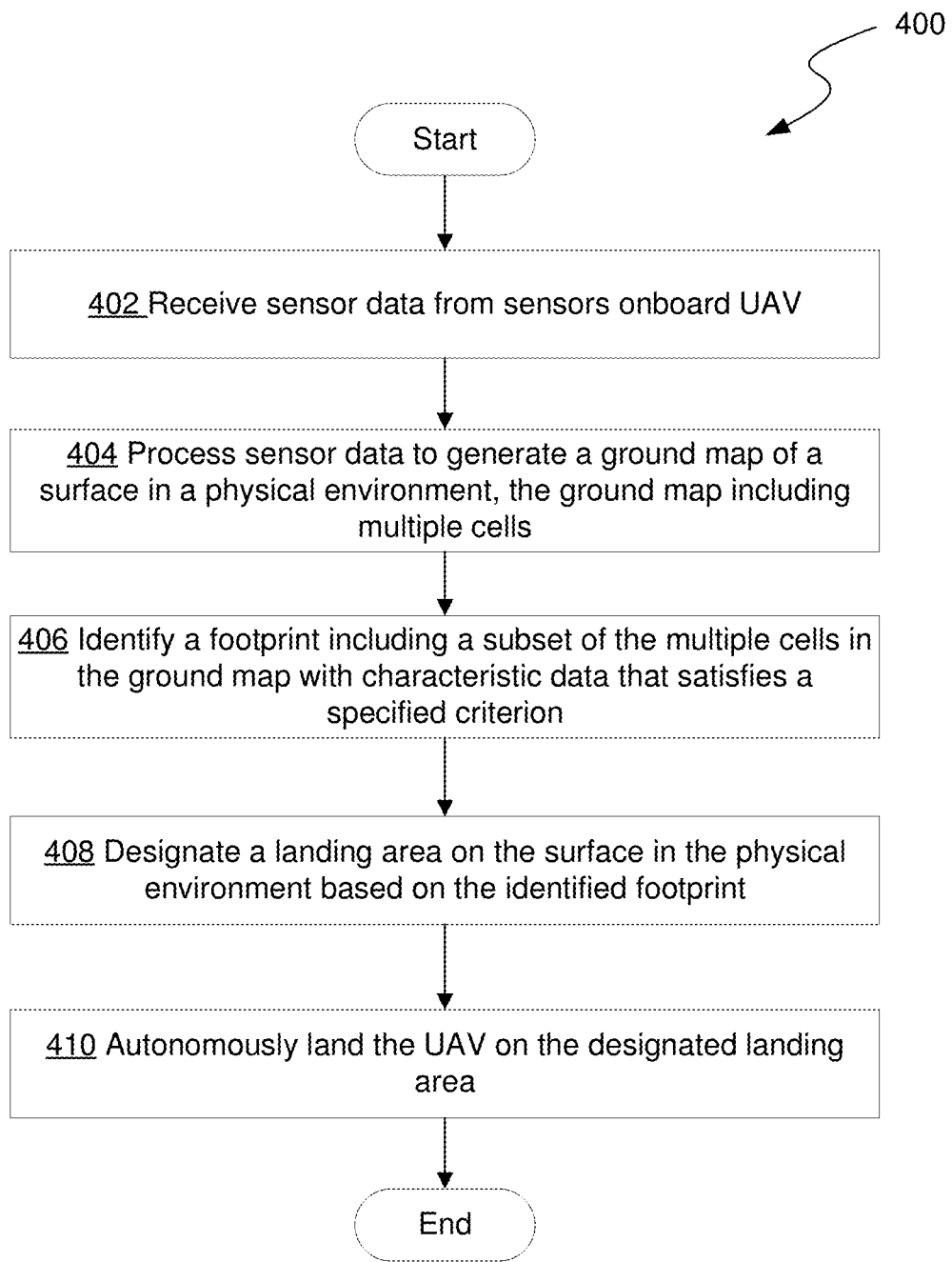
FIG. 4 is a flow chart of an example process for autonomous landing by a UAV.

FIG. 4 shows a flow chart of an example process 400 for autonomous landing by a UAV, according to the introduced technique. One or more steps of the example process may be performed by any one or more of the components of the example navigation system 120 depicted in FIG. 2. For example, process 400 may be performed by a landing system 150 component of the navigation system 120. Further, performance of process 400 may involve any of the computing components of the example computer systems of FIG. 21 or 22. For example, the process 400 depicted in FIG. 4 may be represented in instructions stored in memory that are then executed by a processing unit. The process 400 described with respect to FIG. 4 is an example provided for illustrative purposes and is not to be construed as limiting. Other processes may include more or fewer steps than depicted while remaining within the scope of the present disclosure. Further, the steps depicted in the example processes may be performed in a different order than is shown.

Example process 400 begins at step 402 with receiving sensor data (i.e., perception inputs) from one or more sensors onboard or otherwise associated with the UAV while the UAV is in flight through a physical environment. As previously discussed, the sensors may include visual sensors such as image capture device 114 and/or 115 as well as other types of sensors 112 configured to perceive certain aspects of the physical environment.

Example process 400 continues at step 404 with processing the received sensor data to generate a "ground map" of the physical environment. In order to evaluate a high number of potential landing areas effectively, the landing system 150 may maintain information regarding smaller areas of the ground map referred to herein as "cells." In other words, the ground map may comprise an arrangement of multiple cells, each of the multiple cells representing a particular portion of a surface in the physical environment. Each cell may be associated with data indicative of perceived characteristics (also referred to as "characteristic data") of that portion of the physical environment corresponding to the cell. For example, as will be described in more detail, the characteristic data for a given cell may include statistics regarding the height of various points along the surface in an area corresponding to the cell. Characteristic data may also include semantic information associated with detected physical objects in an area corresponding to the cell. In any case, the characteristic data may be primarily based on the sensor data received at step 402 that is gathered by the UAV while the UAV is in flight, but may be supplemented with information from other data sources, such as remote sensors in the physical environment, sensors onboard other UAVs, sensors in a mobile device 104, a database of predetermined elevation values, object locations, etc.

Figure 5A:
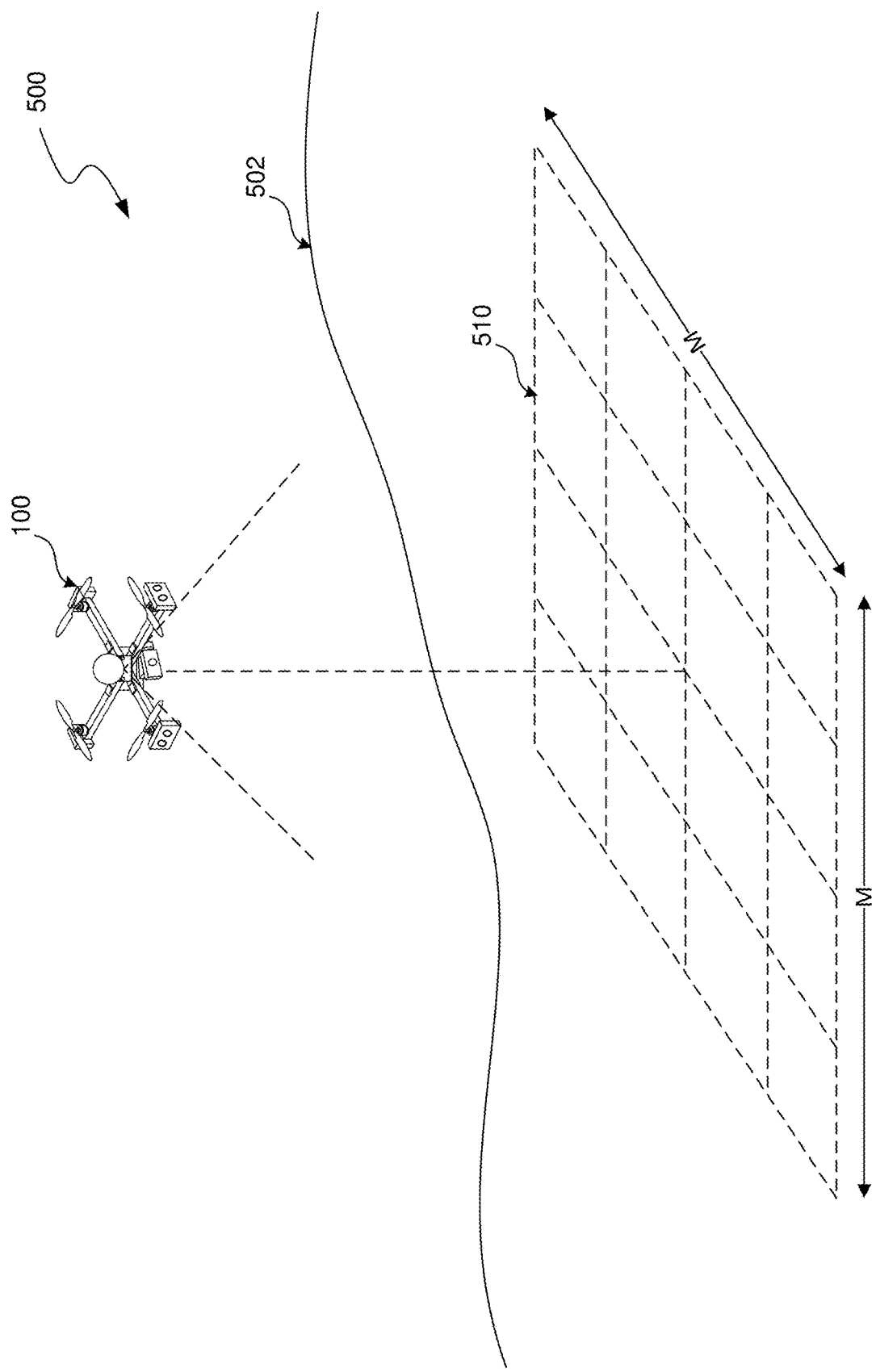
FIG. 5A shows an example ground map generated by a UAV in flight.

FIG. 5A shows an example UAV 100 in flight through a physical environment 500 including a physical ground surface 502. As shown in FIG. 5A, a landing system 150 associated with the UAV 100 may maintain and continually update a two-dimensional (2D) ground map 510 comprising multiple cells. In the example depicted in FIG. 5A, the cells of the ground map 510 are rectangular in shape and are arranged in a rectangular 2D grid that is M cells wide by M cells long. This example configuration of cells in a ground map 510 is provided for illustrative purposes and is not to be construed as limiting. For example, the cells in the ground map may be shaped differently than as depicted in FIG. 5A. Further, the cells in the ground map 510 may be arranged differently than as depicted in FIG. 5A. For example, an alternative ground map may be M1 cells wide by M2 cells long where M1 does not equal M2.

In some embodiments, steps 402 and 404 are performed continually as the UAV 100 is in flight over the physical environment 502. In other words, as new sensor data is received while the UAV is in flight, the characteristic data associated with each cell in the ground map 510 is continually updated to reflect the characteristics of the portion of the surface of the physical environment 502 associated with that cell. "Continually," in this context, may refer to performance of a given step at short intervals such as every millisecond. The actual intervals utilized will depend on the operational requirements of the UAV 100 and/or the computational capabilities of the landing system 150.

In some embodiments, the ground map 510 is UAV-centered. In other words, the ground map 510 remains centered on, or otherwise stationary, relative to the position of the UAV 100 while the UAV 100 is in flight. This means that any given moment, the ground map 510 may include only characteristic data associated with a portion of the physical environment within a particular range of the UAV 100 based on the dimensions of the ground map 510.

Associating characteristic data (e.g., height statistics) with portions of the ground map (i.e., cells) may simplify the calculations needed to later select an appropriate area on the surface to land thereby reducing required computing resources to store and compute characteristic data and reducing latency when selecting an appropriate landing area. Further, the arrangement of cells in the ground map 510 can be adjusted to conform with the operational requirements of the UAV 100 while staying within certain constraints such as available computing resources, power usage, etc. For example, increasing the "resolution" of the ground map 510 by increasing the value M may provide the landing system 150 with a more accurate perception of the characteristics of the portion of the physical environment 502 corresponding to the ground map 510. However, this increase in resolution will likely increase the computing resources necessary to compute and maintain the characteristic data associated with the cells, which may exceed the capabilities of onboard systems and/or may increase power draw. In any case, the particular configuration of the ground map 510 can be adjusted (either during design or while the UAV 100 is in flight) to balance operation requirements with given constraints.

Referring back to FIG. 4, example process 400 continues at step 406 with identifying a footprint that includes a subset of the cells in the ground map 510 that is associated with characteristic data that satisfy one or more specified landing criteria. As used herein, a "footprint" refers to an arrangement of any subset of the cells included in the ground map 510. For example, a footprint may comprise a single cell in the ground map 510 or may comprise an arrangement of multiple cells. For example, FIG. 5B shows a view of the ground map 510 with a highlighted subset of cells representing a footprint 512.

Figure 5B:
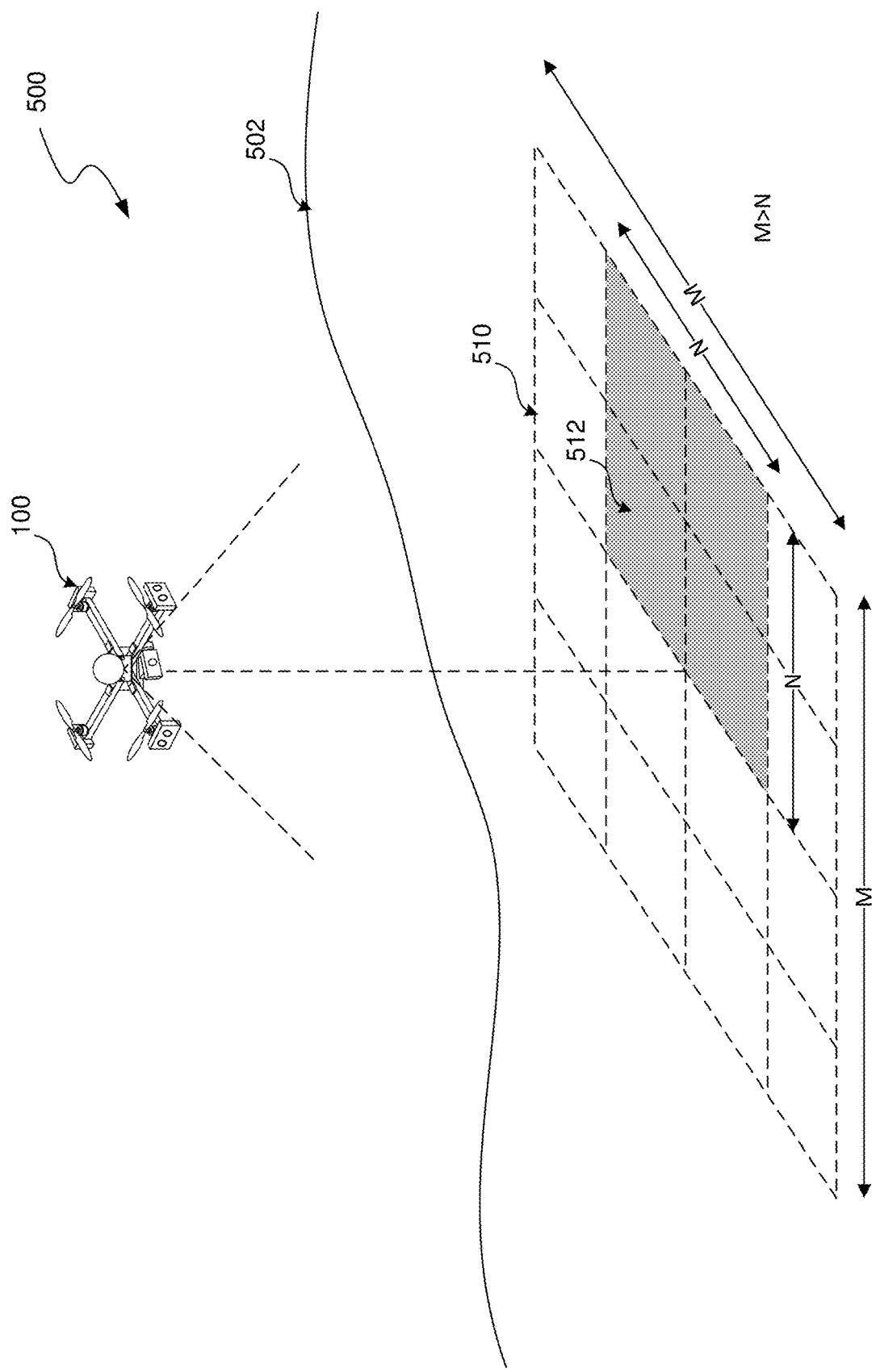
FIG. 5B shows an example footprint included in the ground map of FIG. 5A.

The example footprint 512 depicted in FIG. 5B comprises a rectangular arrangement of cells that is N cells wide by N cells long, where M is greater than N; however, the actual arrangement of cells comprising the footprint may differ depending on several factors. For example, the size and/or shape of the UAV 100 along with the accuracy of its navigation systems will impact the type of area needed on the ground in order to execute a safe landing. As a specific illustrative example, if the UAV 100 has dimensions of 2 feet wide by 2 feet long, the area on the ground will have to be greater, by some safety factor, than 4 square feet. The safety factor may vary, for example, based on the abilities of the landing system 150, weather conditions, other navigational objectives, user preferences, etc. For example, in response to perceiving high winds, the landing system 150 may increase the safety factor, thereby increasing a size of the footprint needed to safely land on the surface.

Further, while the arrangement of cells comprising the example footprint 512 is depicted as rectangular, other embodiments that employ a ground map with a higher resolution may identify footprints with more irregular shapes that more closely correspond with the actual shape of the UAV 100. This may increase the required computing resources needed to evaluate multiple candidate footprints, but may enable landing in tight spaces or uneven terrain.

As mentioned above, the step of identifying a footprint may involve evaluating characteristic data associated with that footprint against one or more specified landing criteria. For example, if the characteristic data is related to height statistics, the step of evaluating a footprint may include aggregating height values for multiple cells in the ground map 510 and identifying an arrangement of cells that have height statistics that are within some threshold level of variance (e.g., indicating relatively level ground). Similarly, if the characteristic data is related to semantic information regarding detected objects, the step of evaluating a footprint may include identifying an arrangement of cells that do not include semantic information indicative of a hazardous object such as a body of water, a tree, a rock, etc. The step of evaluating a footprint may also include identifying an arrangement of cells that include semantic information indicative of a safe landing location such as a designated landing pad, an area of pavement, or grass.

In some embodiments, the step of identifying a footprint may include evaluating multiple candidate footprints (e.g., in parallel or sequentially), where each of the multiple candidate footprints includes a different subset of the cells in the ground map 510 and is offset from each other by at least one cell (in an x and/or y direction), and selecting a particular candidate footprint from the multiple candidate footprints. In some embodiments, the selected footprint may just be the first candidate foot print evaluated by the landing system 150 that satisfies the one or more specified landing criteria. Alternatively, the landing system 150 may evaluate a particular number of candidate footprints and select a best footprint from the candidates as long as it satisfies the one or more specified landing criteria. For example, in the case of height variance, the landing system 150 may select a candidate footprint with a lowest height variance from among the multiple candidates as long as that height variance is below a threshold variance level.

Similar to steps 402 and 404, the process of identifying a footprint at step 406 may be performed continually as the UAV 100 is in flight over the physical environment 502. In other words, as the ground map is updated based on new sensor data while the UAV is in flight, the landing system 150 may continually evaluate and re-evaluate the various candidate footprints against the specified one or more landing criteria. Again, "continually," in this context, may refer to re-performance of a given step at short intervals such as every millisecond.

Once a footprint is identified, example process 400 continues at step 408 with designating a landing area on the surface in the physical environment based on the identified footprint and at step 410 with causing the UAV 100 to autonomously land on the designated landing area.

Causing the UAV 100 to land on the designated landing area may involve, for example, generating control commands configured to cause the UAV 100 to maneuver to autonomously land on the designated landing area. In some embodiments, this step may include a landing system 150 generating a landing objective sets certain parameters (e.g., landing location, descent speed, etc.) and inputting or otherwise communicating the generated landing objective into a motion planner 130 which then processes the landing objective along with one or more other behavioral objectives to generate a planned trajectory that can then be utilized by a flight controller 160 to generate the control commands.

Geometric Smart Landing

Figure 6:
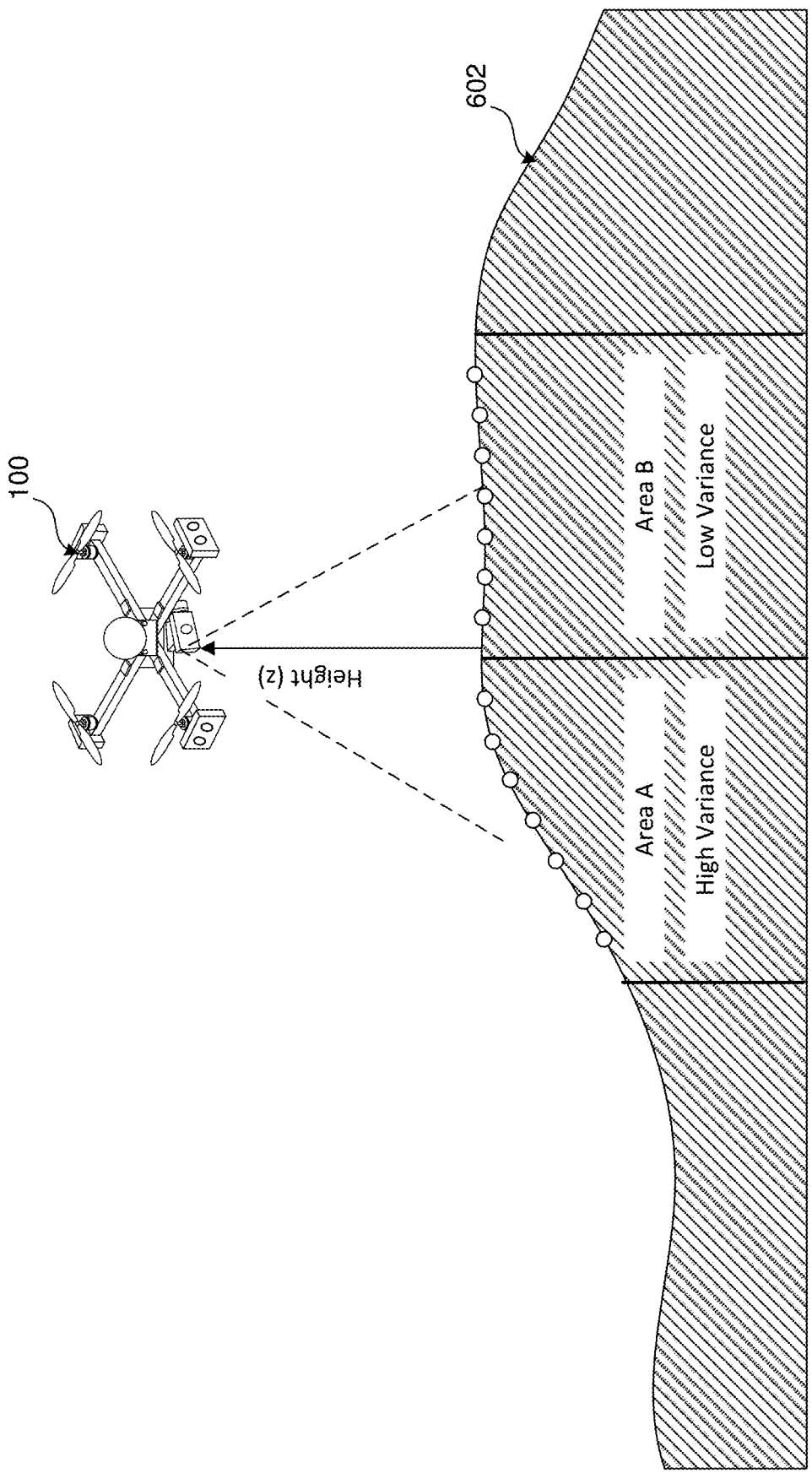
FIG. 6 shows an elevation view of a UAV in flight above the ground.

As previously alluded to, in certain embodiments, the landing system 150 may be configured to choose the flattest area on the ground in response to determining landing is requested or necessary. The technique described below is referred to as geometric smart landing and relies on the premise that the variance in height (z) for all points observed in a given area is inversely proportional to the flatness of that area. For example, FIG. 6 shows an elevation view of a UAV 100 in flight above the ground 602. As shown in FIG. 6, the variance in height (z) of various points along the ground in Area A is higher than the variance in height (z) of various points along the ground in Area B due to the slope of the ground in Area A. Based on this observation, Area B can be assumed to be preferable over area A for landing the UAV 100. The geometric smart landing technique described below may be performed alternatively or in addition to the semantic smart landing technique that is discussed later.

Geometric Smart Landing—Calculating and Maintaining Variance Data

As previously discussed, characteristic data such as height statistics can be generated and maintained for multiple cells in a continually updated ground map based on sensor data received from one or more sensors, for example, as described with respect to FIGS. 5A-5B. Using the height statistics for the various cells in the ground map, a landing system 150 may identify a footprint with a height variance that satisfies some specified criterion (e.g., below a threshold level).

Figure 7A:
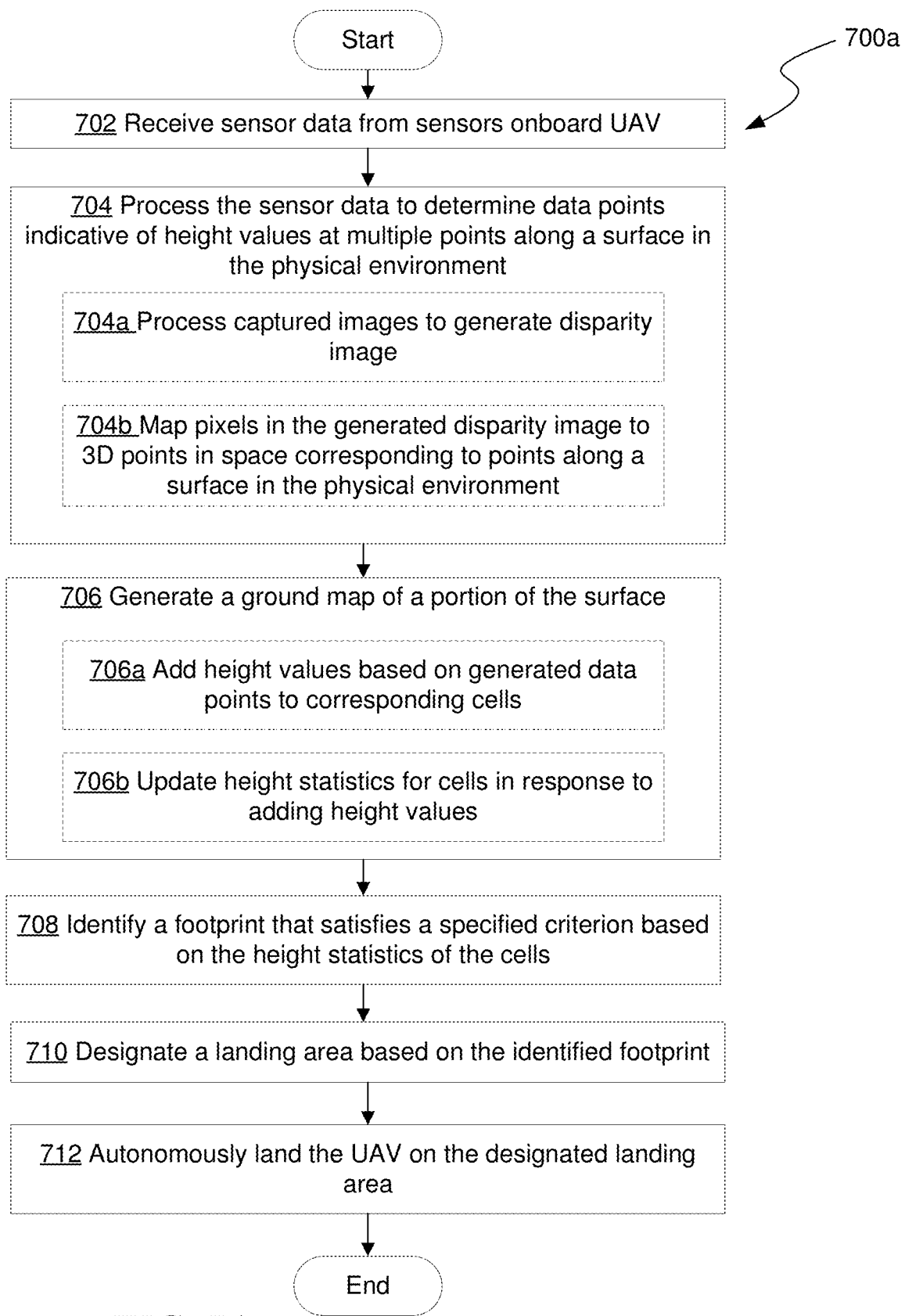
FIG. 7A is a flow chart of an example process for autonomous landing by a UAV using a geometric smart landing technique.

FIG. 7A shows a flow chart of an example process 700a for autonomous landing by a UAV using the geometric smart landing technique. As with the example process 400 in FIG. 4, one or more steps of the example process 700a may be performed by any one or more of the components of the example navigation system 120 depicted in FIG. 2. For example, process 700a may be performed by a landing system 150 component of the navigation system 120. Further, performance of process 700a may involve any of the computing components of the example computer systems of FIG. 21 or 22. For example, the process 700a may be represented in instructions stored in memory that are then executed by a processing unit. The process 700a described with respect to FIG. 7A is an example provided for illustrative purposes and is not to be construed as limiting. Other processes may include more or fewer steps than depicted while remaining within the scope of the present disclosure. Further, the steps depicted in example process may be performed in a different order than is shown.

Example process 700a begins at step 702 with receiving sensor data from sensors onboard the UAV 100, for example, as described in step 402 of example process 400. In an illustrative example, the sensors onboard the UAV 100 include a downward facing stereoscopic camera configured to capture images of the ground while the UAV 100 is in flight through a physical environment. The downward facing stereoscopic camera may, for example, be part of an array of stereoscopic navigation cameras that comprise the previously described image capture device 114.

At step 704, the received sensor data is processed to determine (i.e., generate) data points that are indicative of height values at multiple points along a surface (e.g., the ground) in the physical environment. Height values in this context may refer to a relative vertical distance between a point along the surface and a position of the UAV 100. Height values may also refer to vertical position of a point along the surface relative to some other frame of reference such as sea level (i.e., elevation).

Steps 704a and 704b describe an example subprocess for determining the data points based on images captured from a downward facing stereoscopic camera. At step 704, images captured by an image capture device (e.g., a stereoscopic camera) are processed to generate a disparity image. As used herein, a "disparity image" is an image representative of a disparity between two or more corresponding images. For example, a stereo pair of images (e.g., left image and right image) captured by a stereoscopic image capture device will exhibit an inherent offset due to the slight difference in position of the two or more cameras associated with the stereoscopic image capture device. Despite the offset, at least some of the objects appearing in one image should also appear in the other image; however, the image locations of pixels corresponding to such objects will differ. By matching pixels in one image with corresponding pixels in the other and calculating the distance between these corresponding pixels, a disparity image can be generated with pixel values that are based on the distance calculations. In other words, each pixel in the disparity image may be associated with a value (e.g., a height value) that is indicative of a distance from the image capture device to a captured physical object such a surface in the physical environment.

In some embodiments, the subprocess may continue at step 706b with mapping pixels in the generated disparity image to 3D points in space that correspond to points along a surface (e.g., on the ground) in the physical environment to resolve a height (z) value associated with the point. Although preferred embodiments rely on capturing height information using visual sensors such as stereoscopic cameras, other types of sensors may similarly be employed. For example, a UAV 100 may be equipped with downward facing range sensors such as LIDAR to continually scan the ground below the UAV to collect height data.

Example process 700a continues at step 706 with generating a ground map, for example, similar to as described with respect to step 404 in process 400. Steps 706a and 706b describe an example subprocess for adding height values to particular cells to generate and continually update the ground map as the UAV 100 is in flight through the physical environment. For example, at step 706a, height values based on the generated data points are "added" to corresponding cells in the ground map. In some embodiments, this step of adding height values may include determining which cell in the ground map a particular data point is associated, for example, by determining which cell overlaps a 3D point in space corresponding to the data point (i.e., binning the data point in an x and y direction).

Once the particular cell is identified, the height value for the particular point is added to that cell. Specifically, in some embodiments, this process of adding height data to a cell may include, at step 706b, updating the height statistics for the cell such as, the number of data points collected, the mean height value, the median height value, minimum height value, maximum height value, the sum of the squared differences in height values, or any other type of statistic based on the aggregation of data points for a particular cell.

This aggregation of data points through the updating of height statistics may reduce overall memory usage as the landing system 150 is only required to store information on maintained statistics instead of entries for each of the multiple data points collected. In some embodiments, similar height statistics may be continually updated for each of a plurality of candidate footprints based on the height statistics for cells included in each footprint. Alternatively, the height statistics for each candidate footprint may be calculated based on the individual points included per footprint, although this may be more computationally expensive. In either case, the variance in height values for a given footprint can be calculated at any time as the sum of the squared differences in height values divided by the number of points in that area.

As previously discussed, the ground map may be continually updated based on sensor data as the sensor data is received while the UAV 100 is in flight. In other words, at least steps 702, 704, and 706 (including relevant substeps) may be continually performed to generate and continually update the ground map. Again, "continually," in this context, may refer to re-performance of a given step at short intervals such as every millisecond.

Example process 700a continues at step 708 with identifying a footprint that satisfies one or more specified criteria, for example, similar to step 406 in example process 400. In some embodiments, a landing criterion is satisfied if the height statistics associated with a candidate footprint have a variance that is below a threshold variance level. Again, the variance may be calculated based on the height statistics for the one or more cells included in a given candidate footprint. In some embodiments, the landing criterion is satisfied if the height statistics associated with a particular candidate footprint have a lowest variance compared to other candidate footprints and if the height statistics are below the threshold variance level.

Once a footprint is identified, example process 700a continues at step 710 with designating a landing area on the surface in the physical environment based on the identified footprint and at step 712 with causing the UAV 100 to autonomously land on the designated landing area, for example, similar to steps 408 and 410 of process 400.

Geometric Smart Landing—Accounting for Uncertainty in Stereo

Where stereo vision is applied, the geometric smart landing technique may be configured to account for uncertainty in estimated/measured height values. In stereo vision, as disparity gets larger, the uncertainty of the range (distance from the cameras) of that point also grows. The expected variance of a point scales with the range of that point to the fourth power. To account for this, the landing system 150 may adjust certain height values by an appropriate correction factor. For example, in some embodiments, the landing system 150 may divide the increment to the sum of squared differences in height for a given point by its range to the fourth power.

Geometric Smart Landing—Down-Weighting Older Points

To enable the ground map to be more responsive to moving objects, the landing system 150 may be configured to limit the number of data points that contribute to the statistics for each cell or otherwise favor more recently gathered data points. For example, if a data point based on a measured height at a particular point is added to a cell that already has the maximum number of points, the system may be configured to calculate the average of the sum of the squared differences in height values and then subtract that calculated average value from the overall sum of the squared differences in height values before updating the statistics for the cell. In this way, the number of points collected for the cell does not increment. Down-weighting older data can also be performed based on mean height by freezing the number of data points. For example, a typical mean height incremental can be calculated based on the following: mean[n+

1]=(x−mean[n])/(n+1), where "n" represents both the number of points and the number of updates. This then becomes mean[n+1]=(x−mean[n])/min(n+1, n_max) where a maximum number of points "n_max" is set for a given cell. This has a similar effect of down-weighting older data.

Figure 7B:
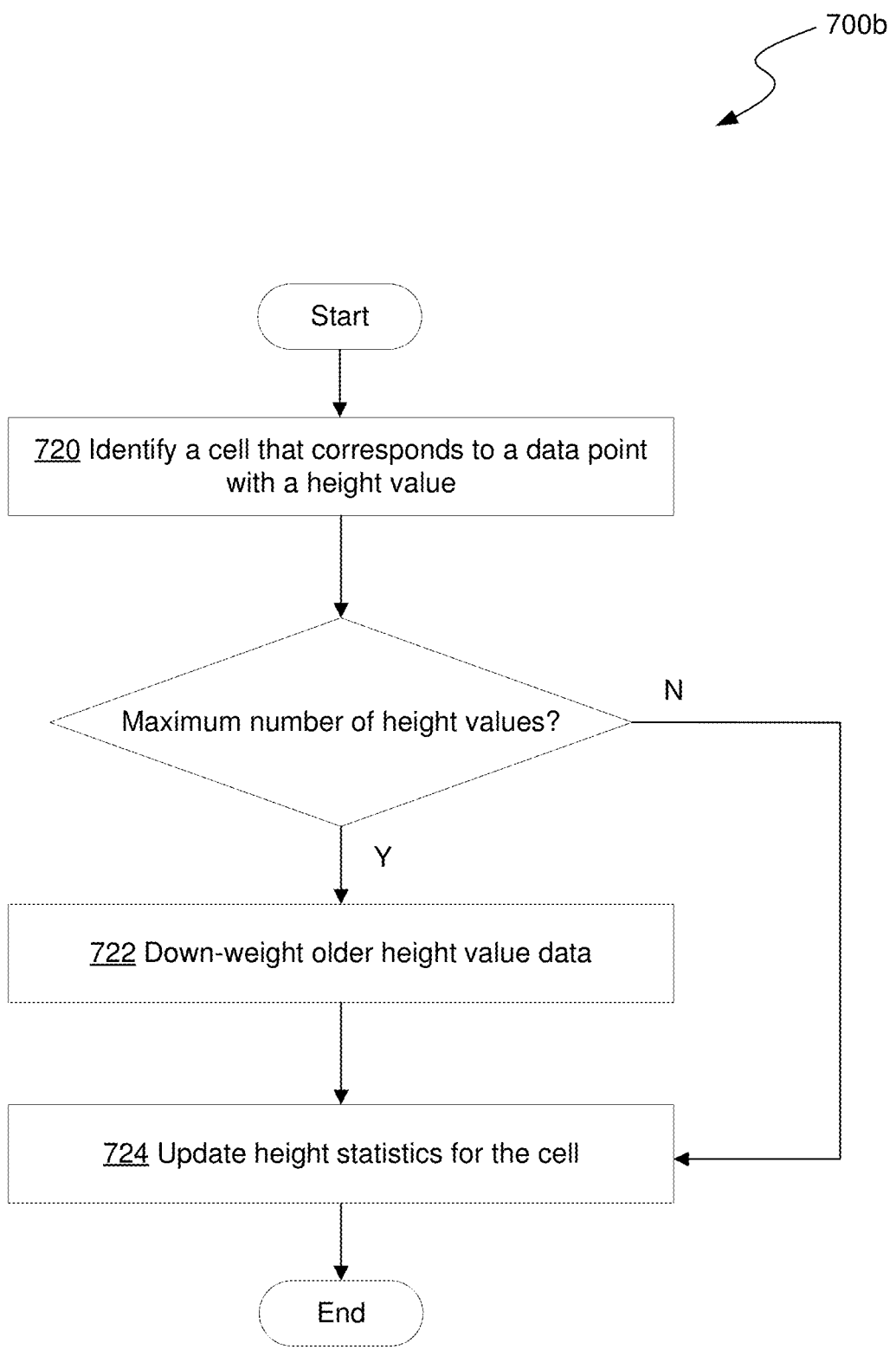
FIG. 7B is a flow chart of an example process for down-weighting older points in a cell when updating the statistics for a given cell based on new points.

FIG. 7B shows a flow chart of an example process 700b for down-weighting older points in a cell when updating the statistics for a given cell based on new points. At step 720, a cell in the ground map is identified that corresponds to a given data point with a height value (i.e., as generated at step 704 in process 700a). As previously described, the landing system 150 maintains statistics for each of the cells in the ground map. One of these statistics may include the total number of data points added to that cell. If the total number of data points has not yet reached some specified maximum threshold, the process may continue to step 724 with adding the data point to the cell and updating the height statistics for that cell. If the maximum number of data points has already been added to that cell, example process 700b may instead proceed to step 722 to down-weight the other height value data, for example as described in the previous paragraph, before updating the height statistics for the cell at step 724.

The maximum number of data points for each cell may be static or may dynamically change over time based on various factors such as operation requirements of the UAV 100, available computing resources at any given moment, environmental conditions, etc. Further, the maximum number of points for each cell may be uniform across the ground map or vary between cells. In some embodiments, the maximum number of points may be user-specified.

Geometric Smart Landing—Selecting a Landing Spot

Assuming the UAV 100 needs to land (either in response to a user command or in response to an event such as low battery), the landing system 150 can utilize the calculated variance for each footprint in the ground map to identify a footprint that satisfies some specified criterion in order to select an area on the physical ground for landing (i.e., as described with respect to steps 708 and 710 in process 700a). This criterion may specify selection of the footprint with the lowest variance in the ground map for landing. Alternatively, or in addition, the criterion may specify some maximum allowable variance. In some embodiments, footprint cells that include too few data may be avoided regardless of the calculated variance in height since the height statistics for such footprints may be unreliable. Such criterion may be user-specified, fixed, or dynamically changed in response to certain conditions. For example, if the UAV 100 battery is low and immediate landing is required, the landing system 150 may simply select a footprint in the immediate vicinity with the lowest variance in height values. Conversely, if landing is in request to a user command, and there is no immediate danger of power loss, the landing system 150 may afford to be more selective of the footprint. In such a scenario, the UAV 100 may continue flying until a footprint is identified that has a height variance that falls below some maximum allowable variance.

In some embodiments, the UAV 100 may be configured to more effectively position itself before selecting a footprint for landing. For example, in an embodiment in response to determining that it needs to land, the landing system 150 may cause the UAV 100 to autonomously maneuver to some specified height above the ground in order to better evaluate the situation before landing. For example, a height of at least approximately two meters away from the lowest point observed and at most approximately four meters away from the highest point observed has been found to effectively balance between being able to see a significant area of ground, not wasting battery on ascending too high, and being close enough to be able to detect smaller obstacles.

One key edge case observed during testing is the case of two similarly flat areas of ground at different heights. For example, if the UAV 100 is flying near a cliff, the top and bottom of the cliff might both be flat (i.e., exhibit similar height variance). However, one landing area may still be preferable over another, at least from the point of view of user access to the UAV 100 once landed. To account for this, the landing system 150 may be configured with a heuristic to prefer a footprint that is closest to a last known position (e.g., altitude) of some object, such as the user when selecting a footprint for landing. For example, in the above-mentioned scenario involving a cliff, the landing system 150 may determine (e.g., based on information from the tracking system 140) that the last known position of the tracked user is at an elevation consistent with an identified footprint at the top of the cliff. The landing system 150 may, therefore, cause the UAV 100 to land at the footprint at the top of the cliff instead of the bottom of the cliff to avoid having the user climb down the cliff to retrieve the UAV 100 once landed.

Other heuristics can be added manually or learned based on use cases, ensuring that the UAV 100 is configured to land in the most intuitive and convenient (i.e., preferable) location. For example, the UAV 100 can be configured to prefer landing at its original takeoff height when performing a roof inspection. As another example, the UAV 100 can be configured to prefer landing on a path of a tracked subject (as opposed to landing in a nearby bush or tree). As another example, the UAV 100 can be configured to prefer landing in an area of ground where few people or machines have traversed to avoid inadvertent contact. Conversely the UAV 100 may also be configured to prefer landing in more heavily trafficked areas to avoid landing in an area that is too remote or inaccessible to a user. As another example, the UAV 100 can be configured to prefer landing close to a building or other structure (as opposed to landing in the middle of a field) when operating in an agricultural/farming setting. These are only a few example heuristics that may be implemented to guide the landing system 150 in selecting an appropriate landing area. Other heuristics can similarly be implemented based on the specific use requirements of the UAV 100.

Semantic Smart Landing

Geometric smart landing may be effective in some situations, but is limited in its ability to discern certain real world scenarios. For example, using a geometric smart landing technique, a landing system 150 may identify the surface of a body of water, a flat top of a tree, or a road as having a sufficiently low variance in height to be effective for landing. Such surfaces may not represent desirable landing areas for several reasons. Further, some smaller obstacles (e.g., small bushes, thin tree branches, small rocks, etc.) may not impact the variance in height values in a given cell so as to prevent the landing system from selecting the footprint that includes that cell. In all, this can lead undesirable landing area selections.

Figure 8A:
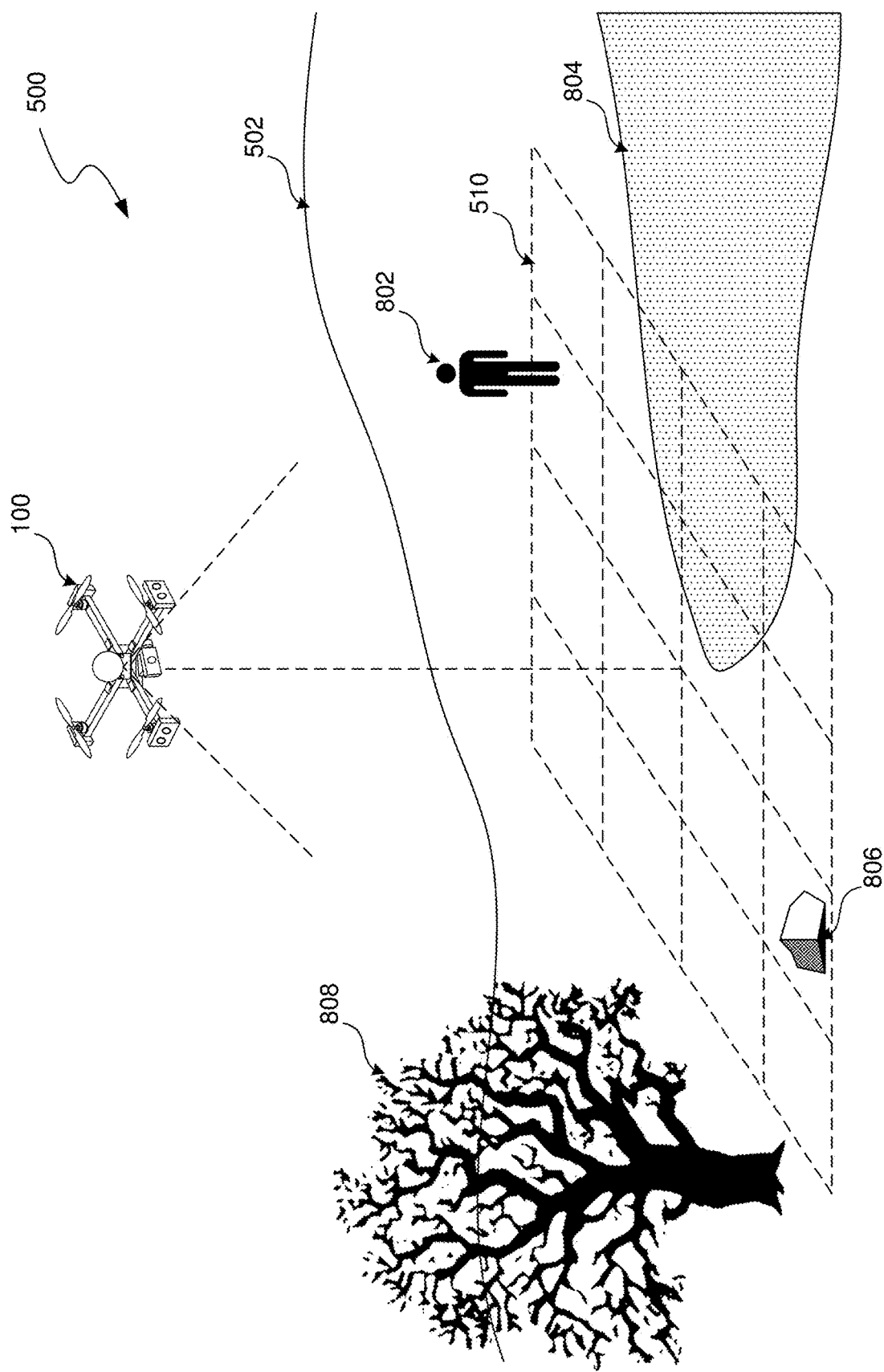
FIG. 8A shows a UAV in flight over a physical environment populated with various objects.

To avoid such situations, in some embodiments, semantic information associated with objects in the surrounding environment can be extracted (e.g., based on analysis of images captured of the surrounding physical environment) and incorporated into the previously mentioned ground map to assist in the landing process. For example, FIG. 8A depicts a UAV 100 in flight over a physical environment similar to that depicted in FIGS. 5A-5B. As shown in FIG. 8A, the environment 500 is populated with various objects such as a person 802, a lake 804, a rock 806, and a tree 808. In some embodiments, semantic knowledge of these objects, for example, extracted by processing images captured by image capture devices 114/115, can be added to corresponding cells of the ground map 510, for example as a label or tag or by updating a cost factor associated with the cell. For example, one or more cells that overlap the lake 804 may be labeled "water." In some embodiments, the landing system 150 may be configured to avoid landing at any footprint including cells (or at least a certain number of cells) that include the water label. Similarly, cells can be labeled with more specific information such as walkable or traversable ground. The semantic smart landing technique described below may be performed alternatively or in addition to the previously described geometric smart landing technique. For example, characteristic data associated with height values and/or semantic information may be added to the same ground map or to separate overlapping ground maps. In either case, the landing system may perform certain steps of the geometric and semantic smart landing technique in parallel to evaluate candidate footprints and to identify a footprint that satisfies specified landing criteria based on both height statistics and semantic information.

Figure 9:
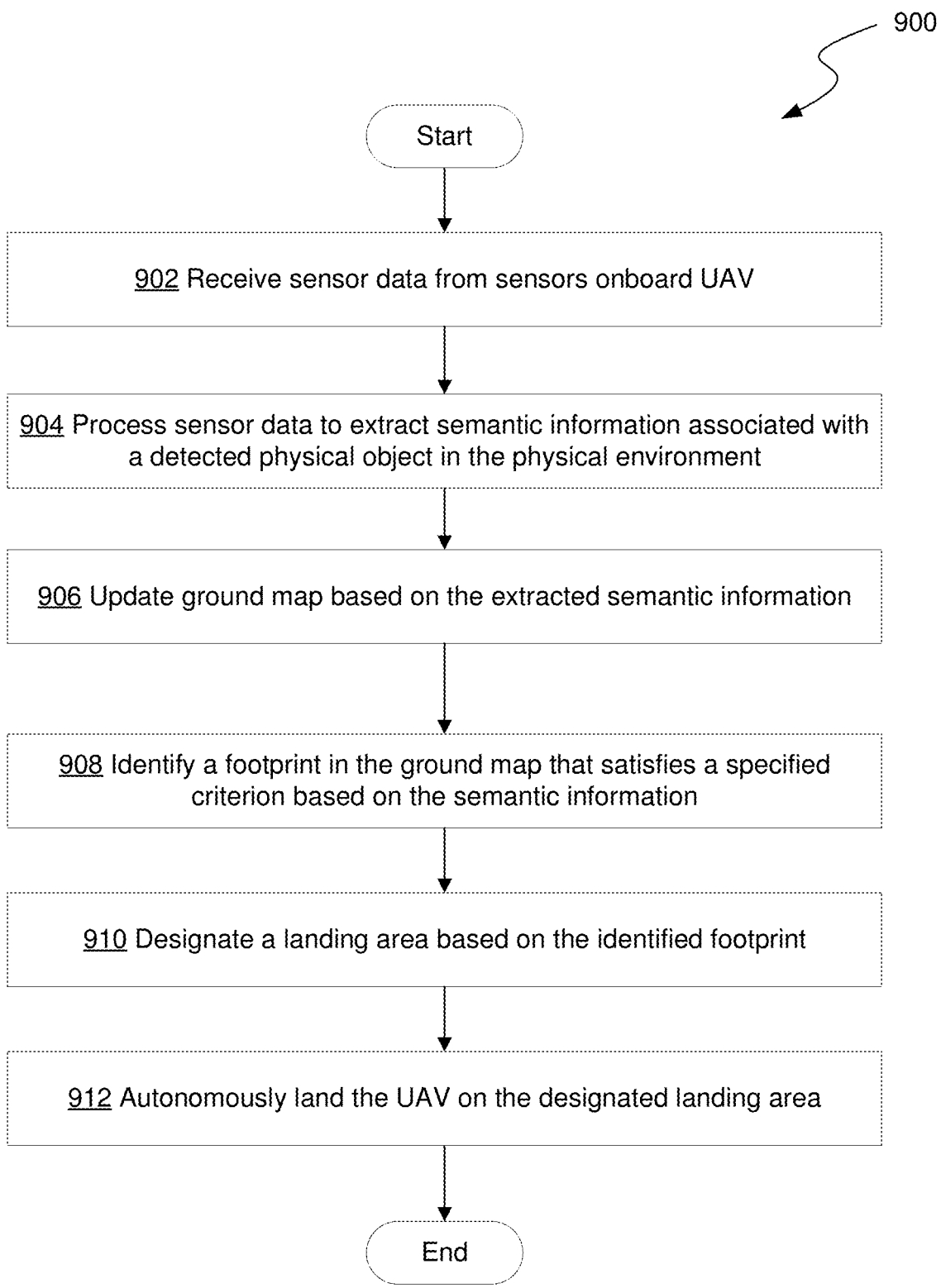
FIG. 9 is a flow chart of an example process for autonomous landing by a UAV using a semantic smart landing technique.

FIG. 9 shows a flow chart of an example process for extracting semantic information regarding objects and inputting the semantic information to the ground map to guide landing of the UAV 100. One or more steps of the example process 900 may be performed by any one or more of the components of the example navigation system 120 depicted in FIG. 2. For example, process 900 may be performed by a landing system 150 component of the navigation system 120. Further, performance of process 900 may involve any of the computing components of the example computer systems of FIG. 21 or 22. For example, the process 900 may be represented in instructions stored in memory that are then executed by a processing unit. The process 900 described with respect to FIG. 9 is an example provided for illustrative purposes and is not to be construed as limiting. Other processes may include more or fewer steps than depicted while remaining within the scope of the present disclosure. Further, the steps depicted in example process may be performed in a different order than is shown.

Example process 900 begins at step 902 with receiving sensor data from sensors onboard the UAV 100, for example, as described in step 402 of example process 400. In an illustrative example, the sensors onboard the UAV 100 include a downward facing stereoscopic camera configured to capture images of the ground while the UAV 100 is in flight through a physical environment. The downward facing stereoscopic camera may, for example, be part of an array of stereoscopic navigation cameras that comprise the previously described image capture device 114.

At step 904, the received sensor data is processed to detect one or more physical objects in the physical environment and extract semantic information associated with the detected one or more physical objects. In an illustrative example, the landing system 150 may extract semantic information regarding certain objects captured in the images based on an analysis of the pixels in the images. Semantic information regarding a captured object can include information such as an object's category (i.e., class), location, shape, size, scale, pixel segmentation, orientation, inter-class appearance, activity, and pose. For example, techniques for detecting objects and extracting semantic information associated with the detected objects are described in more detail later under the section titled "Object Detection" and with reference to FIGS. 15-20. The processes for detecting objects in the physical environment are described in later sections as being performed by a separate tracking system 140 to facilitate subject tracking; however, such processes may similarly be performed by a landing system 150 as part of smart landing process. In some embodiments, the landing system 150 may communicate with the tracking system 140 to receive semantic information regarding objects detected by the tracking system 140. Alternatively, or in addition, the landing system 150 may perform certain processes independent of, and in parallel with, the tracking system 140.

Figure 8B:
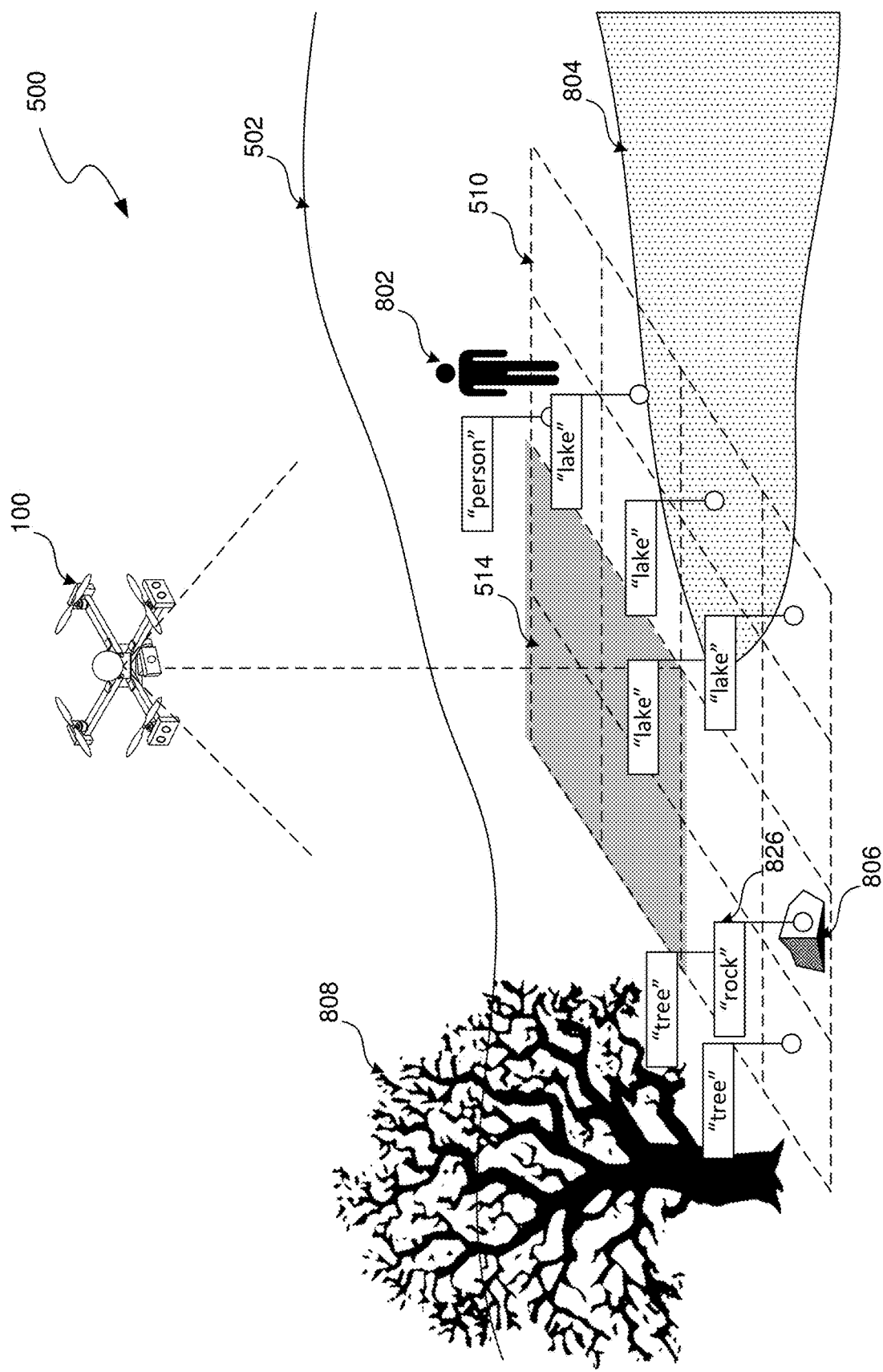
FIG. 8B shows an example ground map with added semantic information based on the various objects depicted in FIG. 8A.

At step 906, the ground map is updated based on the extracted semantic information regarding the detected physical objects in the physical environment. As previously mentioned, semantic information may include a label, tag, or any other data indicative of the detected object. For example, semantic information associated with the rock 806 in FIG. 8 may include a "rock" label. The "rock" label may include additional information regarding the rock such as a type, shape, size, orientation, instance identifier, etc. In the case of mobile objects such as person 802, an associated label may include information about a current activity of the object such as "running," "walking," "standing," etc. Accordingly, in such embodiments, step 906 may include adding a data point in the form of a label to a particular cell in the ground map that corresponds to a location of the detected object. For example, FIG. 8B shows another view of the physical environment 500 with various elements indicative of semantic labels added to cells such as element 826 indicative of a semantic label "rock" added to a cell that corresponds to a location of the rock 806.

In some embodiments, the ground map can be updated based on the semantic information by calculating a cost value associated with the detected object and adding that cost value to a cell that corresponds with a location of the detected object. The "cost value" in this context may be indicative of a level of risk, for example, of damage to person or property, collision with the object, unsuccessful landing, etc. Certain objects such as the tree 808 and/or lake 804 may be associated with higher cost values since they pose a greater risk than other objects such as the rock 806. In some embodiments, cost values for multiple detected objects in a given cell can be aggregated, for example, similar to the previously discussed height values to generate cost statistics such as mean cost value, median cost value, minimum cost value, maximum cost value, etc. Such cost values can be added to cells in addition to or instead of the semantic labels.

Returning to FIG. 9, example process 900 continues at step 908 with identifying a footprint that satisfies one or more specified criteria, for example, similar to step 406 in example process 400. In some embodiments, a landing criterion is satisfied if the one or more cells in a candidate footprint do not include semantic labels indicative of known hazardous objects such as trees, bodies of water, rocks, etc. As an illustrative example, FIG. 8B shows a footprint 514 that may satisfy a specified landing criterion because the arrangement of cells within the footprint do not include any semantic labels for certain known hazardous objects such as trees, rocks, people, bodies of water, etc.

In some embodiments, certain characteristics of a detected object may impact the evaluation of a candidate footprint against the landing criteria. For example, a candidate footprint may satisfy the landing criteria even if the footprint includes cells associated with certain detected objects as long as the detected objects satisfy certain parameter thresholds (e.g., based on size, type, motion, etc.). As an illustrative example, a candidate footprint may satisfy a specified landing criterion even if the footprint includes a cell with a "rock" label as long as the detected rock is below a threshold size. Again, certain parameters such as size may be indicated in the label.

In some embodiments, the landing criterion is satisfied if calculated cost statistics for the footprint are below a threshold cost level and/or are lower than other candidate footprints. Again, the cost statistics may be calculated based on the detected objects that are at locations corresponding to cells within the footprint. For example, each of the semantic labels depicted in FIG. 8B may be associated with a corresponding cost value that is based on a relative risk of landing in an area where the corresponding object is located. The cost value may be a numerical value on a scale of 0 to 1, with 0 indicating no risk and 1 indicating maximum risk. As an illustrative example, the semantic labels for "lake" may be associated with a cost value of 0.7 since landing in water presents a heightened risk of damage to the UAV 100. Conversely, the semantic label "rock" may be associated with a cost value of 0.3 (assuming the rock is relatively small) since the landing near the rock presents relatively lower risk of damage to the UAV 100.

The one or more landing criteria utilized to evaluate candidate footprints based on cost statistics can remain static or can dynamically change, for example, based on user input, changing environmental conditions, operation status of the UAV 100, etc. For example, threshold cost levels may be gradually increased, or object cost values decreased as the battery nears zero charge to enable the UAV 100 to land in an area that may have hazardous objects instead of crashing. However, certain primary behavioral objectives such as avoiding collision with a person may still have precedence over performing a safe landing.

Once a footprint is identified, example process 900 continues at step 910 with designating a landing area on the surface in the physical environment based on the identified footprint and at step 912 with causing the UAV 100 to autonomously land on the designated landing area, for example, similar to steps 408 and 410 of process 400.

Learned Smart Landing

In some embodiments, users may be provided an option, for example via an interface presented at a mobile device 104, to select a location for the UAV 100 to land. In an embodiment, a user may interact with a view of the physical environment captured by the UAV 100 and displayed via a touch screen display of the mobile device 104. The user can select a location to land by touching a portion of the displayed view corresponding to the location on the physical ground that the UAV is to land on. This type of selection by the user and other types of instructions or guidance regarding landing (including monitoring fully remote-controlled landing by a user) can be monitored by the landing system 150 for the purpose of training the internal landing selection and motion planning processes. Users may be provided the option to opt in to such information gathering. If users opt in, information can be collected on any of: the pixel in the view selected by the user for landing; a subject camera 115 image, gimbaled downward to look at the ground; a downward facing navigation camera 114 or any of the other navigation cameras 114; the position of the UAV 100; the most recent tracked subject position; the location of the mobile device 104; etc.

This collected information may be used to learn where users prefer to land the UAV to inform autonomous smart landing. In some embodiments, data is collected from a plurality of user UAVs to train and update the core smart landing algorithms. Updates to the landing algorithms may then be transmitted as software updates, for example via a network, to the various UAVs. Alternatively, data collection and training may be local to a particular UAV 100. A landing system 150 within a given UAV 100 may monitor landing to identify the preferences of the particular user without sharing this information with a central data collection facility. The landing system 150 of the UAV 100 can then use the collected information to train its internal landing algorithms.

Handling Edge Cases

Autonomous smart landing (and navigation in general) may present a variety of edge cases that require special handling. Special handling may include, for example, warnings issued to the user and/or specific actions to mitigate potential hazards.

Handling Edge Cases—Warnings

Warnings generated in response to detecting certain conditions can be displayed or otherwise presented (e.g., through an audible alarm) to a user via a connected mobile device 104.

In an example edge case, the UAV 100 may detect an obstruction to a planned path for takeoff (e.g., from the ground or the user's hand) by checking a planned trajectory for takeoff against an obstacle map (e.g., a voxel-based occupancy map). In response to detecting the potential for obstructed takeoff, the system may cause a warning regarding the obstruction to be presented to the user via the mobile device 104. The system may further be configured to restrict takeoff until the detected obstruction is no longer there.

Another example edge case involves a UAV 100 following a tracked subject through a tight area. At some point the UAV 100 may determine that the limited clearance in the area will prevent it from satisfying its objective to follow the tracked subject. In this situation, the system may cause a warning regarding potential loss of acquisition to be presented to the user via the mobile device 104. The warning may include instructions for traveling a different path and/or an option to manually control the UAV.

Another example edge case involves a UAV 100 operating in low lighting conditions. As previously discussed, the UAV 100 may, in certain embodiments, rely on images captured by one or more image capture devices to guide autonomous flight. If the lighting conditions fall below a certain threshold level, the system may cause a warning regarding the poor lighting conditions to be presented to the user via the mobile device 104.

Handling Edge Cases—Mitigating Actions

As previously mentioned, the UAV 100 may communicate with a user's mobile device 104 via a wireless communication link such as Wi-Fi. At greater distances, the wireless signal weakens and sometimes the connection is lost. In some embodiments, the navigation system 120 is configured to cause the UAV 100 to automatically and autonomously return to a last known location (e.g., a GPS location) of the mobile device 104 in response to detecting a weak wireless communication signal or total loss of the wireless communication link. By returning to (or at least traveling in a direction towards) a last known position of the mobile device 104, the UAV 100 can more easily re-establish the wireless communication link with the mobile device 104. Alternatively, or in addition, the system may allow a user to set a predefined location for the UAV to return to in the event of loss of signal. This location may be a waypoint along a trajectory, a pin on a virtual map, its takeoff location, the user's house, etc. Information regarding remaining battery life can also help to inform the UAV's response. For example, the UAV may select from one of a plurality of predefined return locations (e.g., those listed above) based on remaining battery life and may transmit an indication to the user (e.g., via the mobile device 104) of its intended return position. The above described feature may also be employed if, for whatever reason, the UAV 100 loses visual tracking of the subject.

In some situations, the navigation system 120 may determine that it is no longer safe to continue following a tracked subject. In particular, situations may arise in which the operation of one or more components of the UAV 100 are impaired. For example, if any of the image capture devices 114 stop capturing images, the navigation system 120 can no longer trust the perception inputs for obstacle avoidance. As another example, if a processing component (e.g., a CPU) gets too hot, it can lead to throttling by the processing component and lower processing performance. This can drastically impact execution of the software stack and lead to errors in autonomous navigation, most notably, collisions. In such situations, the navigation system 120 may cause the UAV 100 to stop following the tracked subject and cause the UAV 100 to autonomously land to avoid any damage due to collision.

Figure 10:
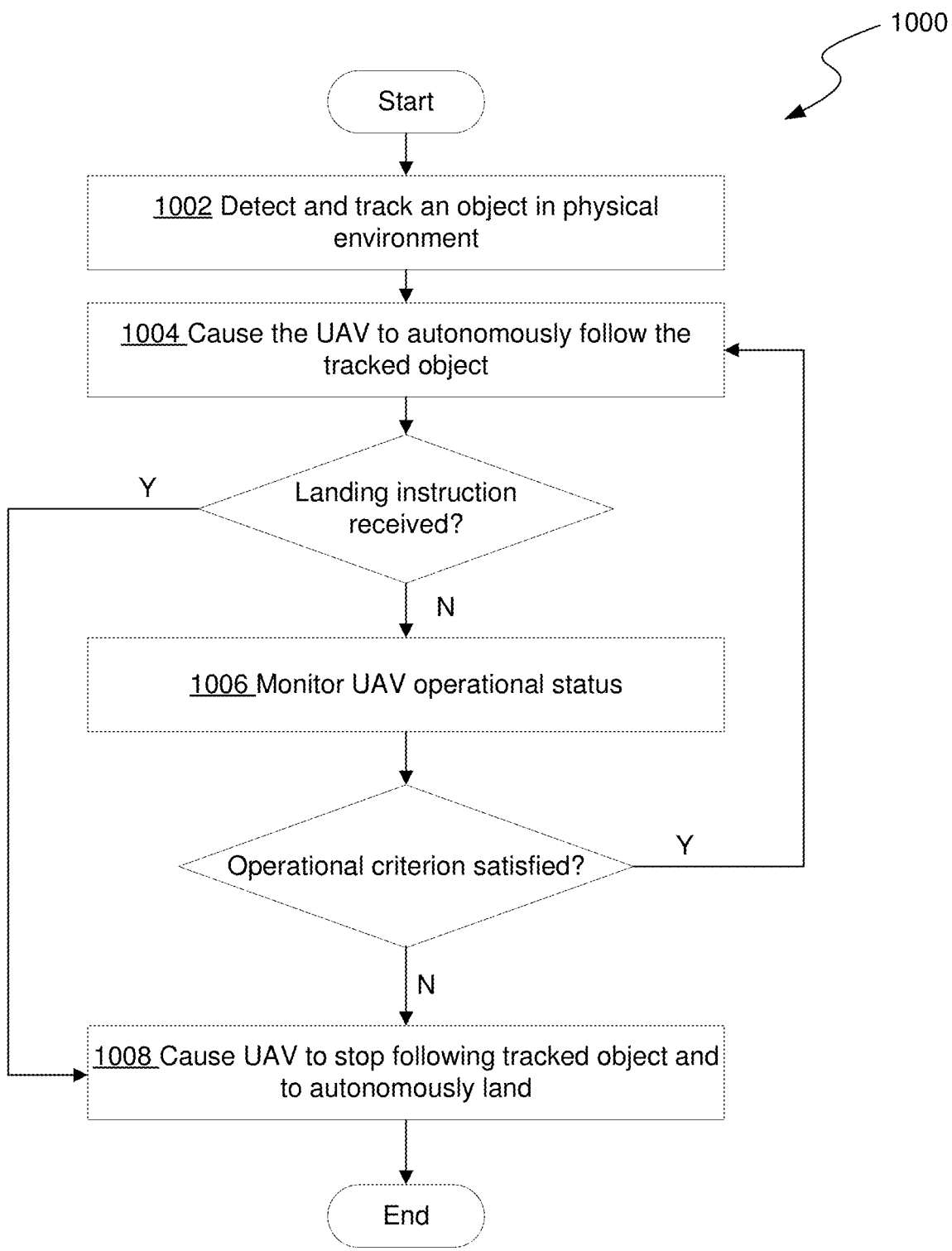
FIG. 10 is a flow chart of an example process for landing a UAV based on an operational status of the UAV.

FIG. 10 shows a flow chart of an example process 1000 for landing a UAV 100 based on an operational status of the UAV 100. One or more steps of the example process 1000 may be performed by any one or more of the components of the example navigation system 120 depicted in FIG. 2. For example, process 1000 may be performed by a tracking system 140 and landing system 150 component of the navigation system 120. Further, performance of process 1000 may involve any of the computing components of the example computer systems of FIG. 21 or 22. For example, the process 1000 may be represented in instructions stored in memory that are then executed by a processing unit. The process 1000 described with respect to FIG. 10 is an example provided for illustrative purposes and is not to be construed as limiting. Other processes may include more or fewer steps than depicted while remaining within the scope of the present disclosure. Further, the steps depicted in example process may be performed in a different order than is shown.

Example process 1000 begins at step 1002 with detecting and tracking a physical object in the physical environment and at step 1004 causing the UAV 100 to autonomously follow the tracked object. Steps 1002 and 1004 may be performed by the tracking system 140, for example, based on images captured from one or more image capture devices 114/115. The tracking system 140 may cause the UAV 100 to autonomously follow the tracked object by generating a tracking objective that is input or otherwise communicated to the motion planner 130 which then processes the tracking objective along with one or more other behavioral objectives to generate a planned trajectory for the UAV 100.

At step 1006, the operational status of the UAV is monitored. In some embodiments, the operational status is monitored continually while the UAV 100 is in flight and autonomously following the tracked object. In some embodiments, the landing system 150 performs step 1006 to monitor the operational status of the UAV 100, although this may be performed by any other onboard systems. Monitoring the operational status may include, for example, actively querying various onboard systems for status updates, passively receiving notifications from various onboard systems with status updates, or any combination thereof.

As part of monitoring the operational status at step 1006, the landing system 150 may determine whether the operational status satisfies one or more operational criteria. If the operational status of the UAV 100 does not satisfy the one or more operational criteria, the landing system 150 will at step 1008 cause the UAV 100 to stop following the tracked object and perform an autonomous smart landing, for example, in accordance with the introduced technique.

Examples of situations where the operational status may not satisfy an operational criterion include when a power source (e.g., a battery) onboard the UAV 100 is below a threshold power level, when a storage device (e.g., for storing captured video) onboard the UAV 100 is below a threshold available storage level, when any of the systems onboard the UAV 100 are malfunctioning or overheating, when a wireless communication link with the mobile device 104 is lost or otherwise of poor quality, or when visual contact with the tracked object has been lost. Other operational criteria can similarly be implemented to guide the decision on when to initiate a smart landing process.

In some embodiments, causing the UAV 100 to stop following the tracked object may include the landing system 150 communicating with the tracking system to cancel or otherwise modify the previously generated tracking objective. Alternatively, or in addition, the landing system 150 may communicate an instruction to the motion planner 130 to cancel or otherwise modify the previously input tracking objective. In any case, the landing system 150 can cause the UAV 100 to perform a smart landing process by generating a landing objective and communicating the landing objective to the motion planner 130, as previously described.

In some rare cases, the UAV 100 may need to land without time or the ability to perform a smart landing using any of the aforementioned techniques. For example, if state estimation by the navigation system 120 fails, the system may not be able to control the position of the UAV 100 to the extent necessary in order to maintain a hover. The best course of action in such a situation may be to immediately begin a controlled descent while checking to determine if the UAV has landed until the UAV 100 is safely on the ground.

Figure 11A:
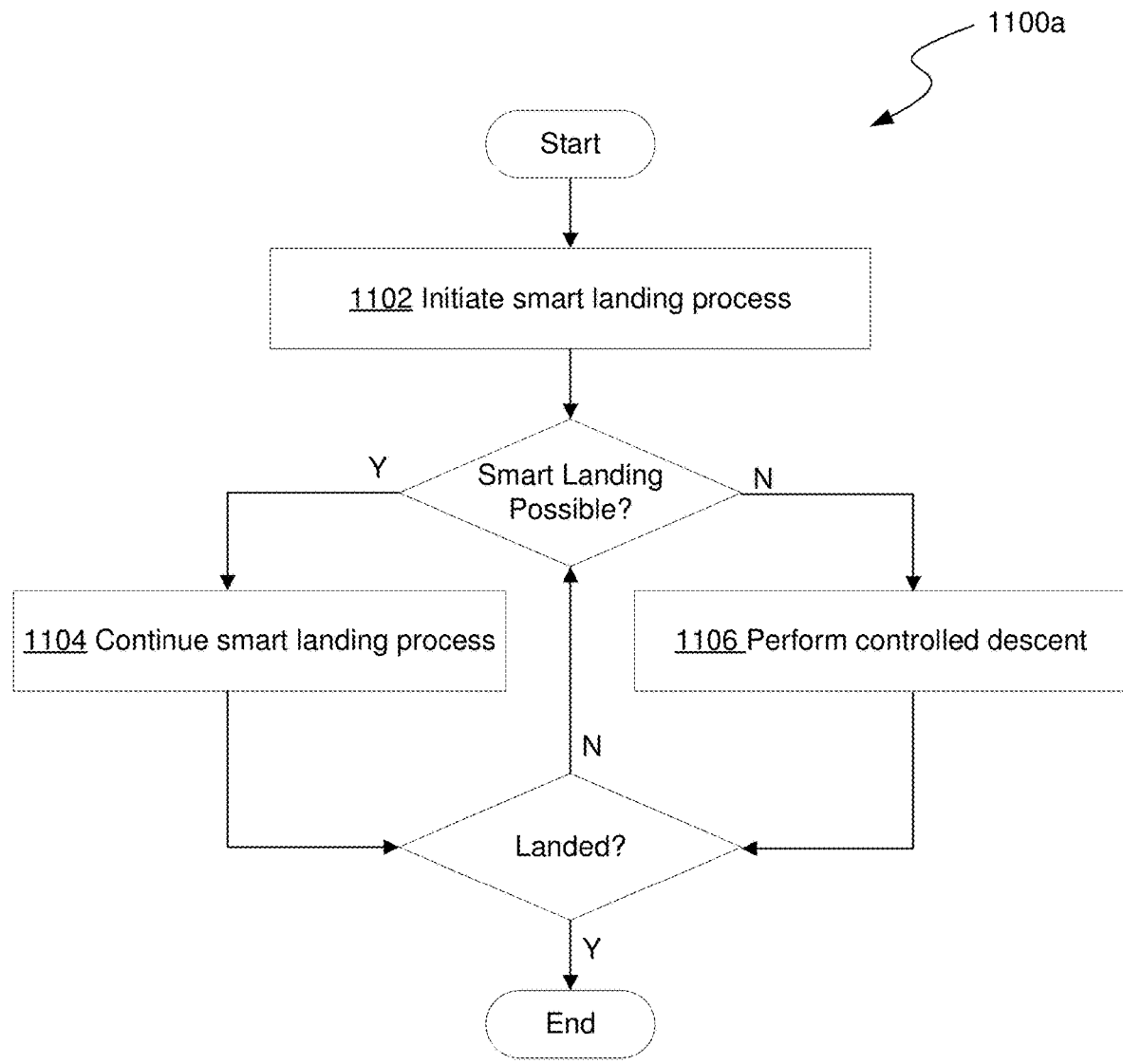
FIGS. 11A and 11B are a flow charts of example processes for initiating a controlled descent in response to determining that smart landing is not possible.
Figure 11B:
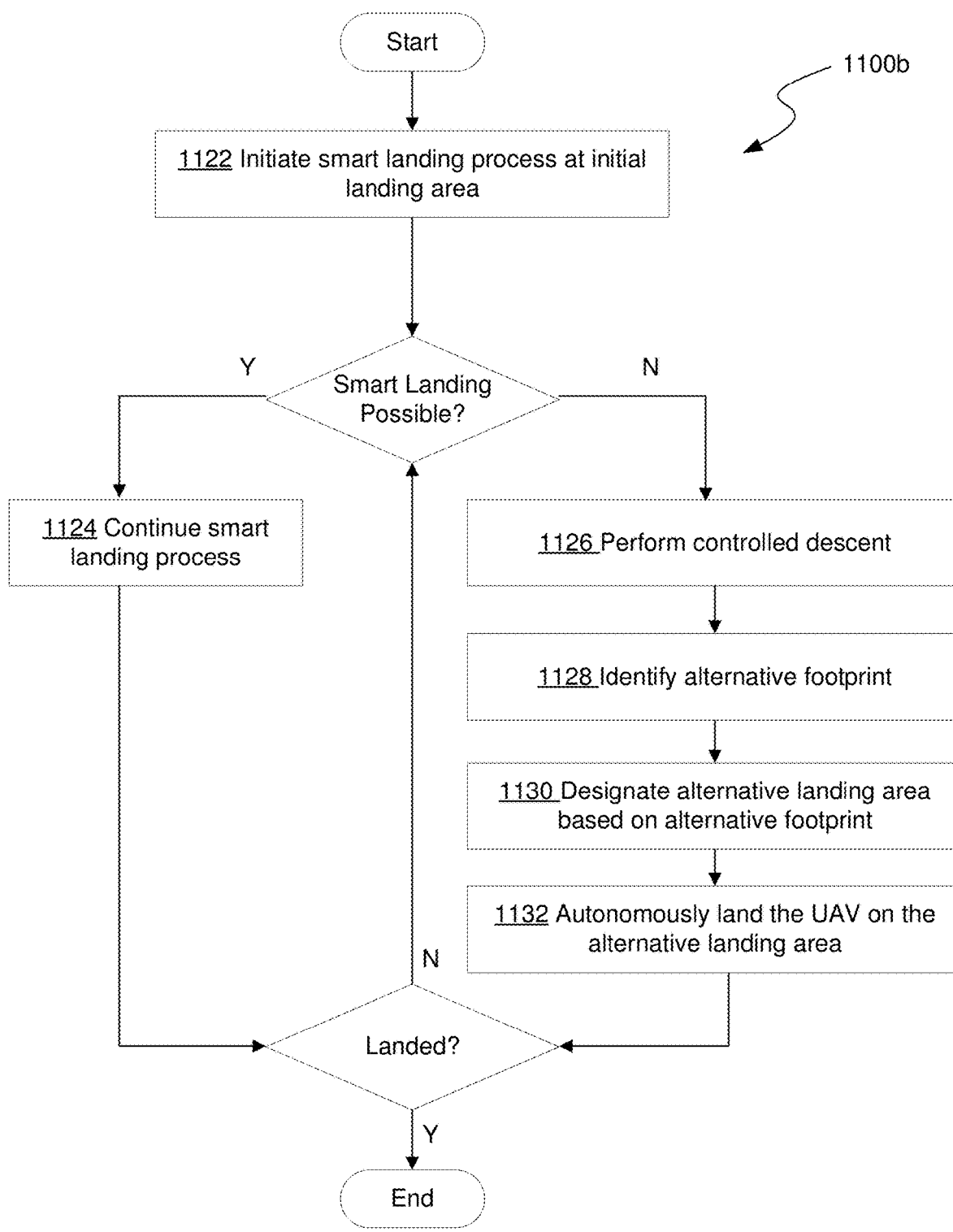

FIGS. 11A-11B show flow charts of example processes 1100*a-b* for initiating a controlled descent in response to determining that smart landing is not possible. One or more steps of the example processes 1100*a-b* may be performed by any one or more of the components of the example navigation system 120 depicted in FIG. 2. For example, processes 1100*a-b* may be performed by the landing system 150 component of the navigation system 120. Further, performance of processes 1100*a-b* may involve any of the computing components of the example computer systems of FIG. 21 or 22. For example, the processes 1100*a-b* may be represented in instructions stored in memory that are then executed by a processing unit. The processes 1100*a-b* described with respect to FIGS. 11A-11B are examples provided for illustrative purposes and are not to be construed as limiting. Other processes may include more or fewer steps than depicted while remaining within the scope of the present disclosure. Further, the steps depicted in the example processes may be performed in a different order than is shown.

Example process 1100*a* begins at step 1102 with initiating a smart landing process, for example, in accordance with the example process 400 described with respect to FIG. 4. During the smart landing process, the landing system 150 will continually monitor the operational status of the UAV 100 to determine whether a smart landing is possible. If the landing system 150 determines that a smart landing is possible, it will at step 1104 continue with the smart landing process until the UAV 100 has safely landed.

On the other hand, if, during the smart landing process, the system determines that a smart landing process is no longer possible, the landing system 150 will, at step 1106, cause the UAV 100 to perform a controlled descent until the UAV 100 is in contact with the ground. Causing the UAV 100 to perform a controlled descent may include generating a controlled descent objective and communicating the objective to the motion planner 130. Alternatively, if the trajectory generation by the motion planner 130 is inoperative or otherwise compromised, the landing system may transmit an instruction to the flight controller 160 that causes the flight controller to generate control commands configured to cause the UAV 100 to descend in a controlled manner. This may include balancing and gradually reducing power output to each of the one or more rotors of the UAV 100 to keep the UAV 100 substantially level as it descends. If available, certain sensor data, for example from onboard gyroscopes and/or accelerometers, may be utilized by the flight controller 160 to adjust power to the rotors to null any rotation and/or lateral acceleration during the controlled descent even if the actual position and/or orientation of the UAV 100 is not known.

In some embodiments, the landing system 150 may attempt to find an alternative landing area if the smart landing at the initial landing area is not possible. For example, the process 1100b depicted in FIG. 11B begins with initiating a smart landing process to land at an initial landing area, for example, similar to step 1102 in process 1100a. Also similar to process 1100a, example process 1100b will process to step 1124 to continue with the landing smart landing process if the landing system 150 determines that a smart landing at the initial landing area is possible.

However, if the landing system determines that a smart landing at the initial landing area is not possible, process 1100b will proceed to step 1126 where the landing system 150 will cause the UAV 100 to initiate a controlled descent. During the controlled descent, the landing system will attempt to identify an alternative landing area by, for example, identifying an alternative footprint at step 1128, designating an alternative landing area based on the alternative footprint at step 1130, and causing the UAV 100 to autonomously land at the alternative landing area at step 1132. This process of searching for an alternative landing area may be performed continually during the controlled descent until the UAV 100 has landed.

Although not depicted in FIG. 11A or 11B, in some embodiments, the landing system 150 may cause the UAV 100 to perform the controlled descent up to a particular height above the ground, if such a maneuver is possible given a current operational status of the UAV 100. The landing system 150 may then reattempt to initiate the smart landing process if such a landing is possible. If a smart landing is still not possible, the landing system 150 will cause the UAV 100 to continue the controlled descent until the UAV 100 has landed.

Localization

Figure 12:
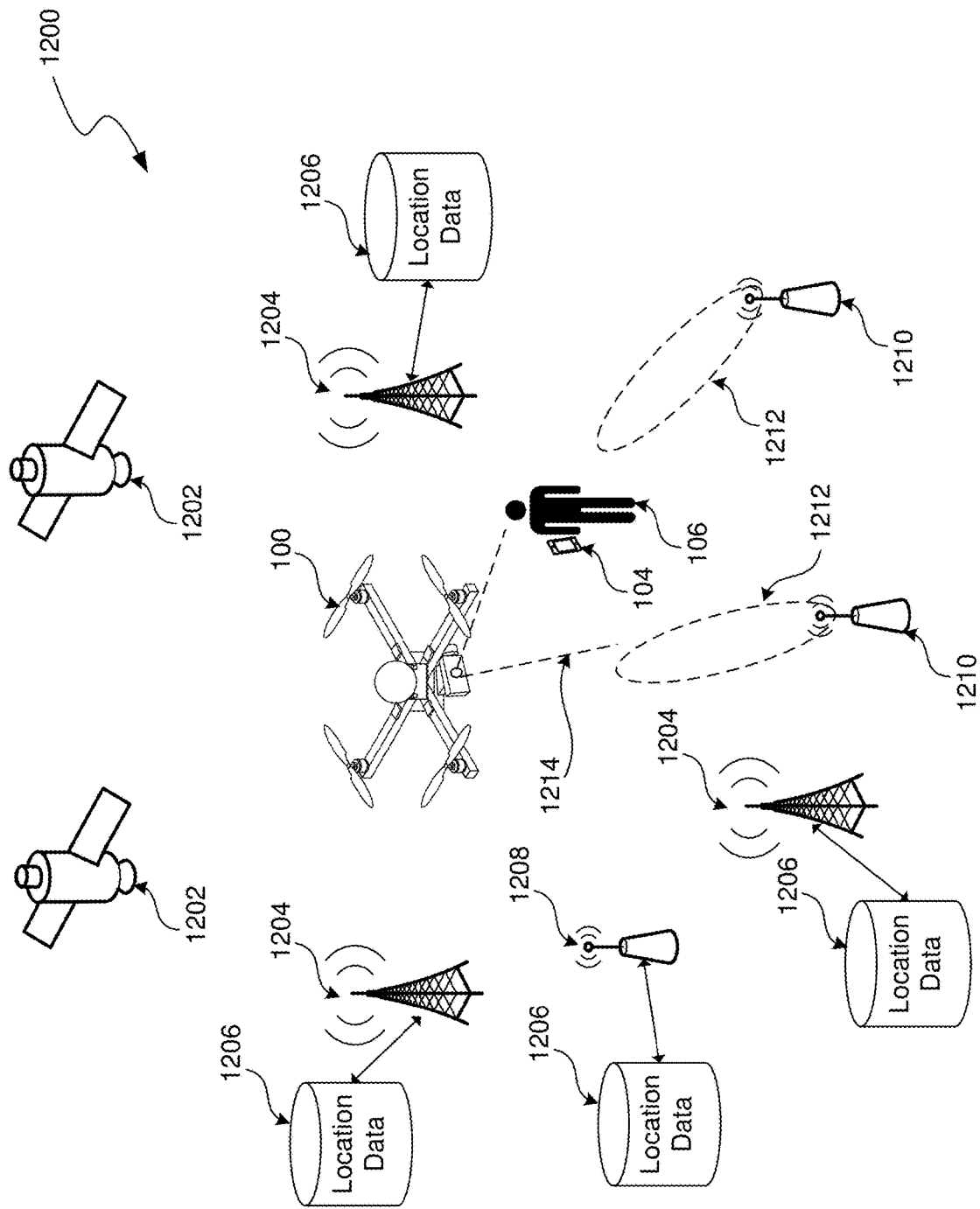
FIG. 12 is a diagram of an example localization system with which at least some operations described in this disclosure can be implemented.

A navigation system 120 of a UAV 100 may employ any number of systems and techniques for localization. FIG. 12 shows an illustration of an example localization system 1200 that may be utilized to guide autonomous navigation of a vehicle such as a UAV 100. In some embodiments, the positions and/or orientations of the UAV 100 and various other physical objects in the physical environment can be estimated using any one or more of the subsystems illustrated in FIG. 12. By tracking changes in the positions and/or orientations over time (continuously or at regular or irregular time intervals (i.e., continually)), the motions (e.g., velocity, acceleration, etc.) of UAV 100 and other objects may also be estimated. Accordingly, any systems described herein for determining position and/or orientation may similarly be employed for estimating motion.

As shown in FIG. 12, the example localization system 1200 may include the UAV 100, a global positioning system (GPS) comprising multiple GPS satellites 1202, a cellular system comprising multiple cellular antennae 1204 (with access to sources of localization data 1206), a Wi-Fi system comprising multiple Wi-Fi access points 1208 (with access to sources of localization data 1206), and/or a mobile device 104 operated by a user 106.

Satellite-based positioning systems such as GPS can provide effective global position estimates (within a few meters) of any device equipped with a receiver. For example, as shown in FIG. 12, signals received at a UAV 100 from satellites of a GPS system 1202 can be utilized to estimate a global position of the UAV 100. Similarly, positions relative to other devices (e.g., a mobile device 104) can be determined by communicating (e.g., over a wireless communication link 116) and comparing the global positions of the other devices.

Localization techniques can also be applied in the context of various communications systems that are configured to transmit communication signals wirelessly. For example, various localization techniques can be applied to estimate a position of UAV 100 based on signals transmitted between the UAV 100 and any of cellular antennae 1204 of a cellular system or Wi-Fi access points 1208, 1210 of a Wi-Fi system. Known positioning techniques that can be implemented include, for example, time of arrival (ToA), time difference of arrival (TDoA), round trip time (RTT), angle of Arrival (AoA), and received signal strength (RSS). Moreover, hybrid positioning systems implementing multiple techniques such as TDoA and AoA, ToA and RSS, or TDoA and RSS can be used to improve the accuracy.

Some Wi-Fi standards, such as 802.11ac, allow for RF signal beamforming (i.e., directional signal transmission using phased-shifted antenna arrays) from transmitting Wi-Fi routers. Beamforming may be accomplished through the transmission of RF signals at different phases from spatially distributed antennas (a "phased antenna array") such that constructive interference may occur at certain angles while destructive interference may occur at others, thereby resulting in a targeted directional RF signal field. Such a targeted field is illustrated conceptually in FIG. 12 by dotted lines 1212 emanating from Wi-Fi routers 1210.

An inertial measurement unit (IMU) may be used to estimate position and/or orientation of a device. An IMU is a device that measures a vehicle's angular velocity and linear acceleration. These measurements can be fused with other sources of information (e.g., those discussed above) to accurately infer velocity, orientation, and sensor calibrations. As described herein, a UAV 100 may include one or more IMUs. Using a method commonly referred to as "dead reckoning," an IMU (or associated systems) may estimate a current position based on previously measured positions using measured accelerations and the time elapsed from the previously measured positions. While effective to an extent, the accuracy achieved through dead reckoning based on measurements from an IMU quickly degrades due to the cumulative effect of errors in each predicted current position. Errors are further compounded by the fact that each predicted position is based on a calculated integral of the measured velocity. To counter such effects, an embodiment utilizing localization using an IMU may include localization data from other sources (e.g., the GPS, Wi-Fi, and cellular systems described above) to continually update the last known position and/or orientation of the object. Further, a nonlinear estimation algorithm (one embodiment being an "extended Kalman filter") may be applied to a series of measured positions and/or orientations to produce a real-time optimized prediction of the current position and/or orientation based on assumed uncertainties in the observed data. Kalman filters are commonly applied in the area of aircraft navigation, guidance, and controls.

Computer vision may be used to estimate the position and/or orientation of a capturing camera (and by extension a device to which the camera is coupled), as well as other objects in the physical environment. The term, "computer vision" in this context may generally refer to any method of acquiring, processing, analyzing and "understanding" captured images. Computer vision may be used to estimate position and/or orientation using a number of different methods. For example, in some embodiments, raw image data received from one or more image capture devices (onboard or remote from the UAV 100) may be received and processed to correct for certain variables (e.g., differences in camera orientation and/or intrinsic parameters (e.g., lens variations)). As previously discussed with respect to FIG. 1, the UAV 100 may include two or more image capture devices 114/115. By comparing the captured image from two or more vantage points (e.g., at different time steps from an image capture device in motion), a system employing computer vision may calculate estimates for the position and/or orientation of a vehicle on which the image capture device is mounted (e.g., UAV 100) and/or of captured objects in the physical environment (e.g., a tree, building, etc.).

Figure 13:
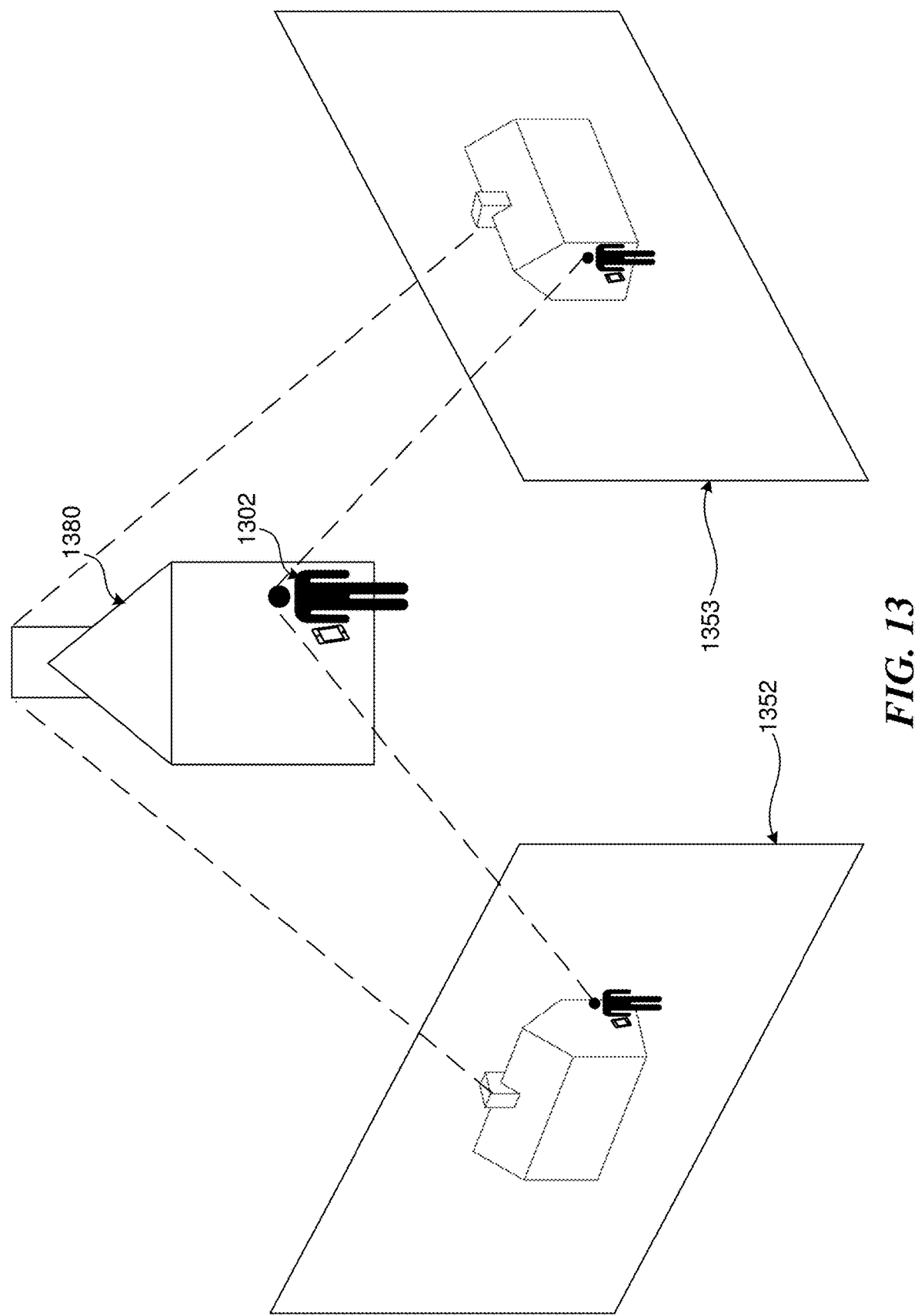
FIG. 13 is a diagram illustrating the concept of visual odometry based on captured images.

Computer vision can be applied to estimate position and/or orientation using a process referred to as "visual odometry." FIG. 13 illustrates the working concept behind visual odometry at a high level. A plurality of images are captured in sequence as an image capture device moves through space. Due to the movement of the image capture device, the images captured of the surrounding physical environment change from frame to frame. In FIG. 13, this is illustrated by initial image capture FOV 1352 and a subsequent image capture FOV 1354 captured as the image capture device has moved from a first position to a second position over a period of time. In both images, the image capture device may capture real world physical objects, for example, the house 1380 and/or the person 1302. Computer vision techniques are applied to the sequence of images to detect and match features of physical objects captured in the FOV of the image capture device. For example, a system employing computer vision may search for correspondences in the pixels of digital images that have overlapping FOV. The correspondences may be identified using a number of different methods such as correlation-based and feature-based methods. As shown in FIG. 13, features such as the head of a human subject 1302 or the corner of the chimney on the house 1380 can be identified, matched, and thereby tracked. By incorporating sensor data from an IMU (or accelerometer(s) or gyroscope(s)) associated with the image capture device to the tracked features of the image capture, estimations may be made for the position and/or orientation of the image capture relative to the objects 1380, 1302 captured in the images. Further, these estimates can be used to calibrate various other systems, for example, through estimating differences in camera orientation and/or intrinsic parameters (e.g., lens variations) or IMU biases and/or orientation. Visual odometry may be applied at both the UAV 100 and any other computing device, such as a mobile device 104, to estimate the position and/or orientation of the UAV 100 and/or other objects. Further, by communicating the estimates between the systems (e.g., via a wireless communication link 116) estimates may be calculated for the respective positions and/or orientations relative to each other. Position and/or orientation estimates based in part on sensor data from an onboard IMU may introduce error propagation issues. As previously stated, optimization techniques may be applied to such estimates to counter uncertainties. In some embodiments, a nonlinear estimation algorithm (one embodiment being an "extended Kalman filter") may be applied to a series of measured positions and/or orientations to produce a real-time optimized prediction of the current position and/or orientation based on assumed uncertainties in the observed data. Such estimation algorithms can be similarly applied to produce smooth motion estimations.

In some embodiments, data received from sensors onboard the UAV 100 can be processed to generate a 3D map of the surrounding physical environment while estimating the relative positions and/or orientations of the UAV 100 and/or other objects within the physical environment. This process is sometimes referred to as simultaneous localization and mapping (SLAM). In such embodiments, using computer vision processing, a system in accordance with the present teaching, can search for dense correspondence between images with overlapping FOV (e.g., images taken during sequential time steps and/or stereoscopic images taken at the same time step). The system can then use the dense correspondences to estimate a depth or distance to each pixel represented in each image. These depth estimates can then be used to continually update a generated 3D model of the physical environment taking into account motion estimates for the image capture device (i.e., UAV 100) through the physical environment.

Figure 14:
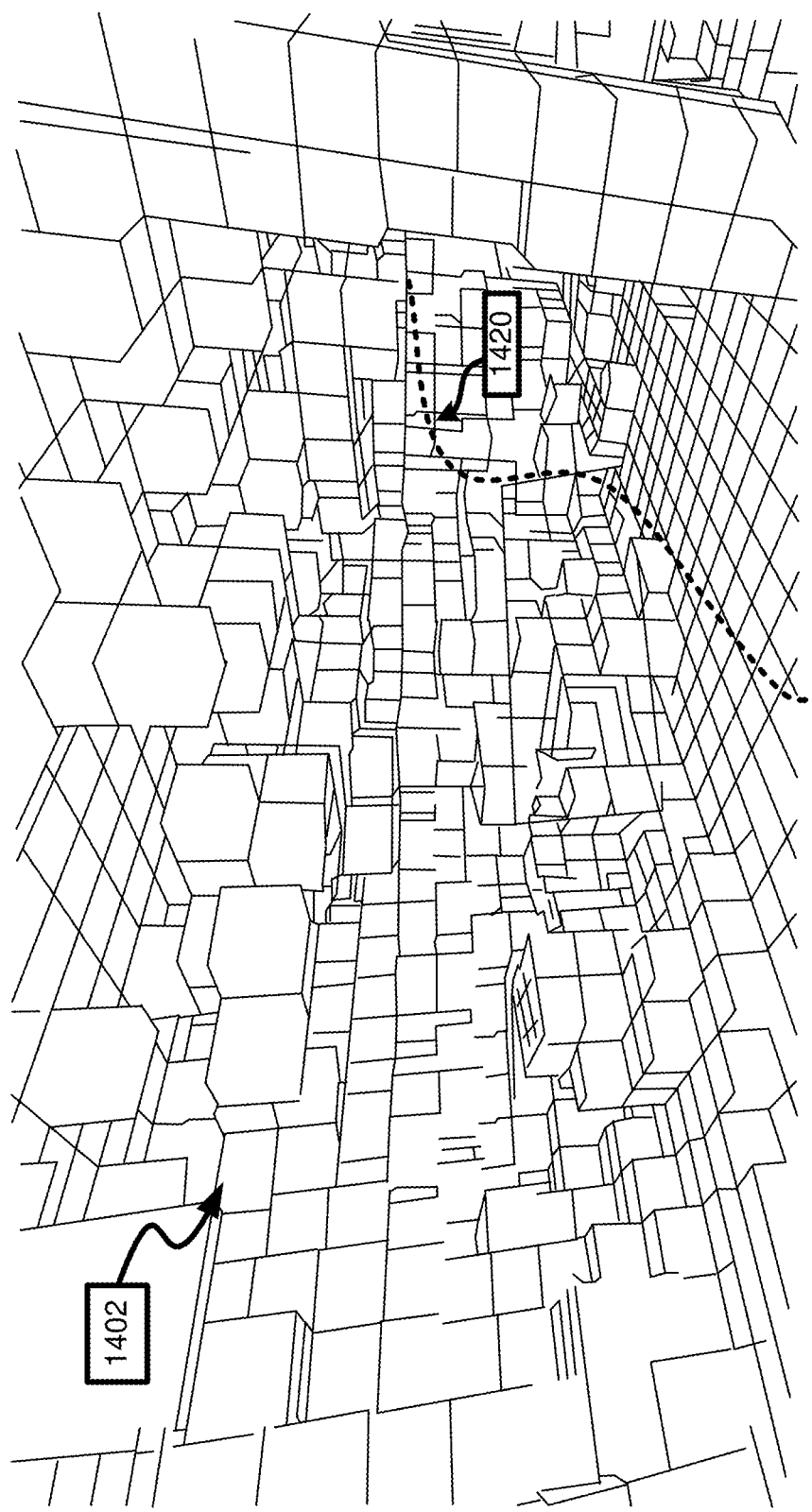
FIG. 14 is an example view of a three-dimensional (3D) occupancy map of a physical environment.

In some embodiments, a 3D model of the surrounding physical environment may be generated as a 3D occupancy map that includes multiple voxels with each voxel corresponding to a 3D volume of space in the physical environment that is at least partially occupied by a physical object. For example, FIG. 14 shows an example view of a 3D occupancy map 1402 of a physical environment including multiple cubical voxels. Each of the voxels in the 3D occupancy map 1402 corresponds to a space in the physical environment that is at least partially occupied by a physical object. A navigation system 120 of a UAV 100 can be configured to navigate the physical environment by planning a 3D trajectory 1420 through the 3D occupancy map 1402 that avoids the voxels. In some embodiments, this 3D trajectory 1420 plan using the 3D occupancy map 1402 can be optimized by applying an image space motion planning process. In such an embodiment, the planned 3D trajectory 1420 of the UAV 100 is projected into an image space of captured images for analysis relative to certain identified high cost regions (e.g., regions having invalid depth estimates).

Computer vision may also be applied using sensing technologies other than cameras, such as light detection and ranging (LIDAR) technology. For example, a UAV 100 equipped with LIDAR may emit one or more laser beams in a scan up to 360 degrees around the UAV 100. Light received by the UAV 100 as the laser beams reflect off physical objects in the surrounding physical world may be analyzed to construct a real time 3D computer model of the surrounding physical world. Depth sensing through the use of LIDAR may in some embodiments augment depth sensing through pixel correspondence as described earlier. Further, images captured by cameras (e.g., as described earlier) may be combined with the laser constructed 3D models to form textured 3D models that may be further analyzed in real time or near real time for physical object recognition (e.g., by using computer vision algorithms).

The computer vision-aided localization techniques described above may calculate the position and/or orientation of objects in the physical world in addition to the position and/or orientation of the UAV 100. The estimated positions and/or orientations of these objects may then be fed into a motion planner 130 of the navigation system 120 to plan paths that avoid obstacles while satisfying certain objectives (e.g., as previously described). In addition, in some embodiments, a navigation system 120 may incorporate data from proximity sensors (e.g., electromagnetic, acoustic, and/or optics-based) to estimate obstacle positions with more accuracy. Further refinement may be possible with the use of stereoscopic computer vision with multiple cameras, as described earlier.

The localization system 1200 of FIG. 12 (including all of the associated subsystems as previously described) is only one example of a system configured to estimate positions and/or orientations of a UAV 100 and other objects in the physical environment. A localization system 1200 may include more or fewer components than shown, may combine two or more components, or may have a different configuration or arrangement of the components. Some of the various components shown in FIG. 12 may be implemented in hardware, software or a combination of both hardware and software, including one or more signal processing and/or application specific integrated circuits.

Object Tracking

A UAV 100 can be configured to track one or more objects, for example, to enable intelligent autonomous flight. The term "objects" in this context can include any type of physical object occurring in the physical world. Objects can include dynamic objects such as people, animals, and other vehicles. Objects can also include static objects such as landscape features, buildings, and furniture. Further, certain descriptions herein may refer to a "subject" (e.g., human subject 102). The terms "subject" as used in this disclosure may simply refer to an object being tracked using any of the disclosed techniques. The terms "object" and "subject" may, therefore, be used interchangeably.

With reference to FIG. 2, a tracking system 140 associated with a UAV 100 can be configured to track one or more physical objects based on images of the objects captured by image capture devices (e.g., image capture devices 114 and/or 115) onboard the UAV 100. While a tracking system 140 can be configured to operate based only on input from image capture devices, the tracking system 140 can also be configured to incorporate other types of information to aid in the tracking. For example, various other techniques for measuring, estimating, and/or predicting the relative positions and/or orientations of the UAV 100 and/or other objects are described with respect to FIGS. 12-20.

Figure 15:
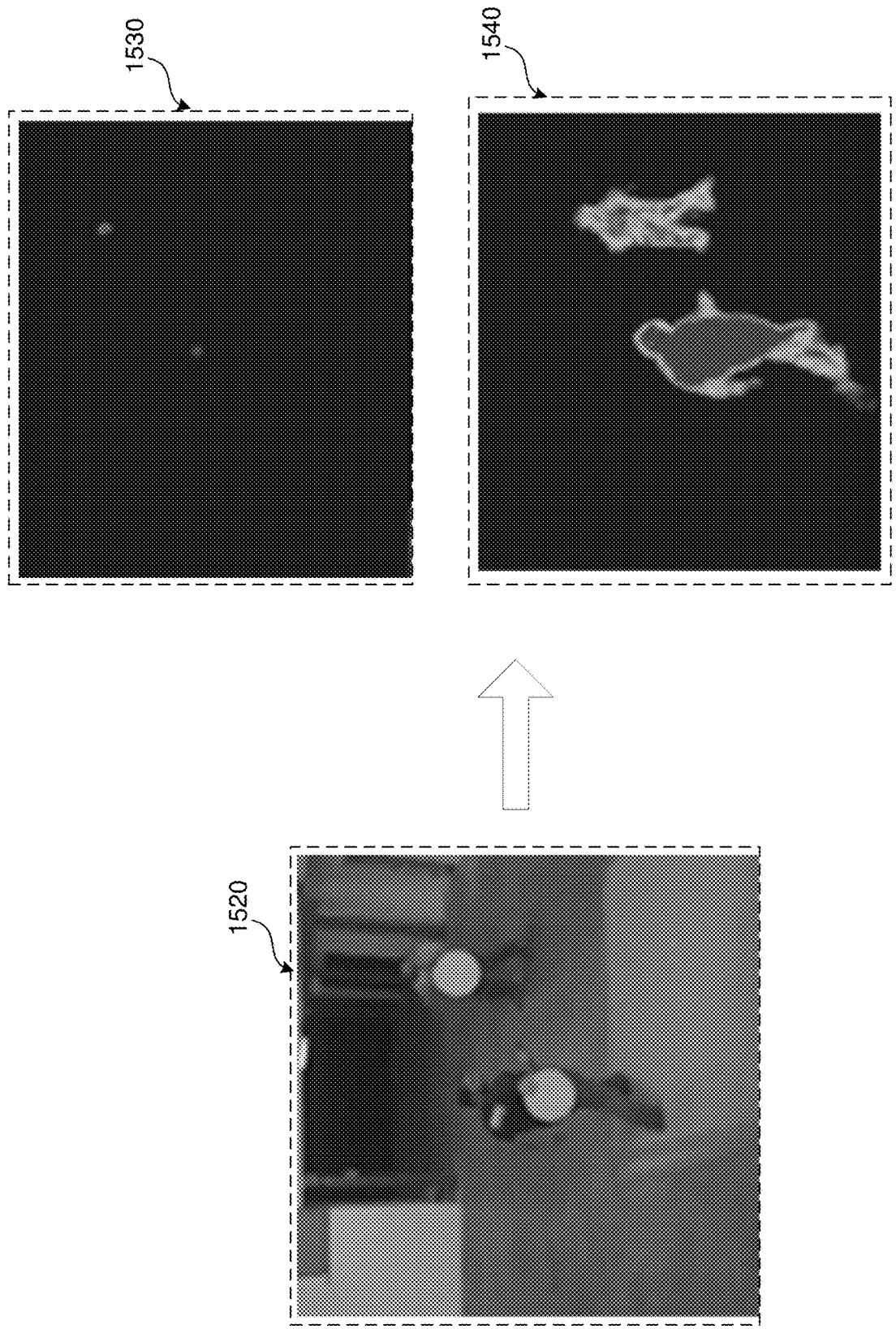
FIG. 15 is an example image captured by a UAV in flight through a physical environment with associated visualizations of data regarding tracked objects based on processing of the captured image.

In some embodiments, a tracking system 140 can be configured to fuse information pertaining to two primary categories: semantics and 3D geometry. As images are received, the tracking system 140 may extract semantic information regarding certain objects captured in the images based on an analysis of the pixels in the images. Semantic information regarding a captured object can include information such as an object's category (i.e., class), location, shape, size, scale, pixel segmentation, orientation, inter-class appearance, activity, and pose. In an example embodiment, the tracking system 140 may identify general locations and categories of objects based on captured images and then determine or infer additional detailed information about individual instances of objects based on further processing. Such a process may be performed as a sequence of discrete operations, a series of parallel operations, or as a single operation. For example, FIG. 15 shows an example image 1520 captured by a UAV in flight through a physical environment. As shown in FIG. 15, the example image 1520 includes captures of two physical objects, specifically, two people present in the physical environment. The example image 1520 may represent a single frame in a series of frames of video captured by the UAV. A tracking system 140 may first identify general locations of the captured objects in the image 1520. For example, pixel map 1530 shows two dots corresponding to the general locations of the captured objects in the image. These general locations may be represented as image coordinates. The tracking system 140 may further process the captured image 1520 to determine information about the individual instances of the captured objects. For example, pixel map 1540 shows a result of additional processing of image 1520 identifying pixels corresponding to the individual object instances (i.e., people in this case). Semantic cues can be used to locate and identify objects in captured images as well as associate identified objects occurring in multiple images. For example, as previously mentioned, the captured image 1520 depicted in FIG. 15 may represent a single frame in a sequence of frames of a captured video. Using semantic cues, a tracking system 140 may associate regions of pixels captured in multiple images as corresponding to the same physical object occurring in the physical environment.

In some embodiments, a tracking system 140 can be configured to utilize 3D geometry of identified objects to associate semantic information regarding the objects based on images captured from multiple views in the physical environment. Images captured from multiple views may include images captured by multiple image capture devices having different positions and/or orientations at a single time instant. For example, each of the image capture devices 114 shown mounted to a UAV 100 in FIG. 1 may include cameras at slightly offset positions (to achieve stereoscopic capture). Further, even if not individually configured for stereoscopic image capture, the multiple image capture devices 114 may be arranged at different positions relative to the UAV 100, for example, as shown in FIG. 1. Images captured from multiple views may also include images captured by an image capture device at multiple time instants as the image capture device moves through the physical environment. For example, any of the image capture devices 114 and/or 115 mounted to UAV 100 will individually capture images from multiple views as the UAV 100 moves through the physical environment.

Figure 16:
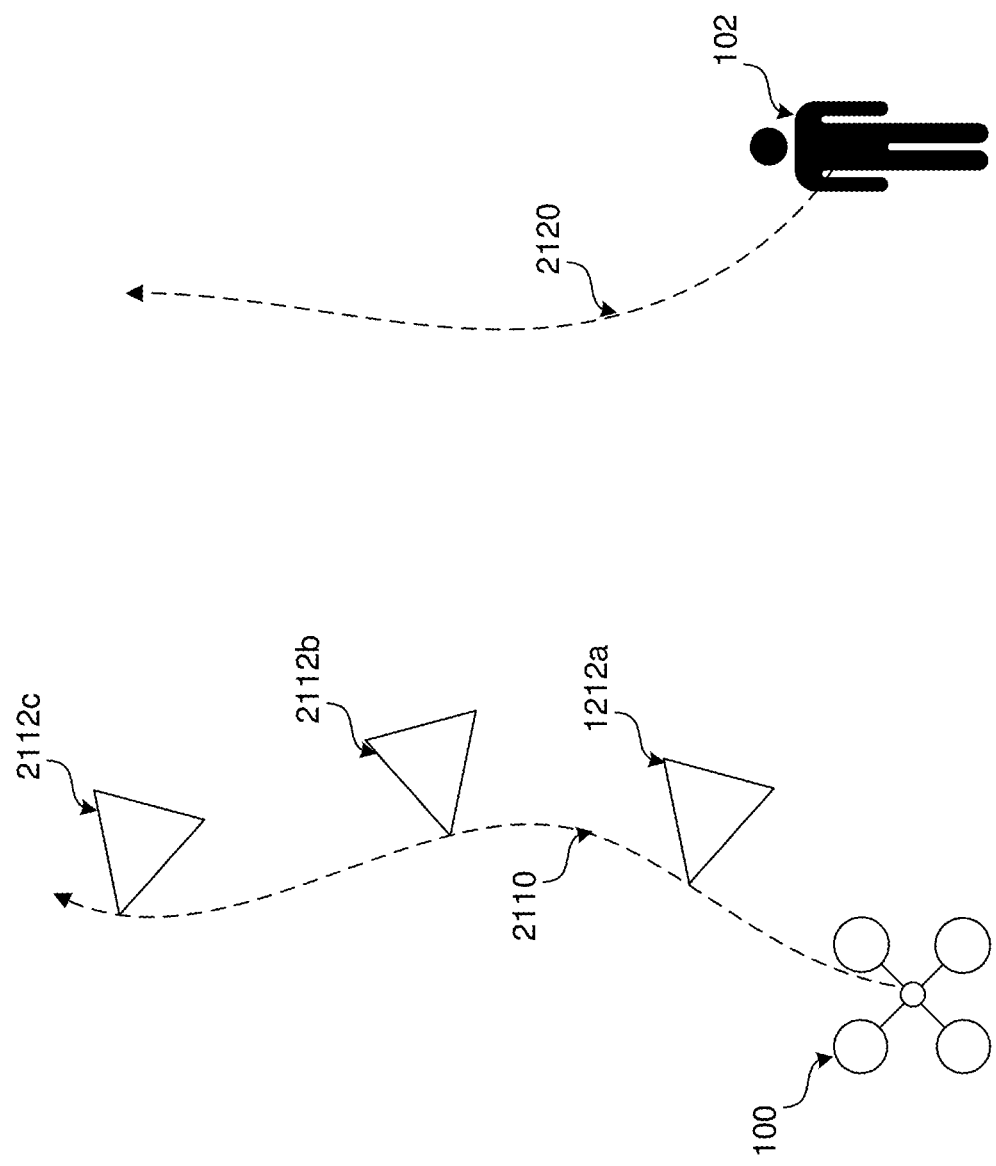
FIG. 16 is a diagram illustrating an example process for estimating a trajectory of an object based on multiple images captured by a UAV.

Using an online visual-inertial state estimation system, a tracking system 140 can determine or estimate a trajectory of the UAV 100 as it moves through the physical environment. Thus, the tracking system 140 can associate semantic information in captured images, such as locations of detected objects, with information about the 3D trajectory of the objects, using the known or estimated 3D trajectory of the UAV 100. For example, FIG. 16 shows a trajectory 1610 of a UAV 100 moving through a physical environment. As the UAV 100 moves along trajectory 1610, the one or more image capture devices (e.g., devices 114 and/or 115) capture images of the physical environment at multiple views 1612a-c. Included in the images at multiple views 1612a-c are captures of an object such as a human subject 102. By processing the captured images at multiple views 1612a-c, a trajectory 1620 of the object can also be resolved.

Object detections in captured images create rays from a center position of a capturing camera to the object along which the object lies, with some uncertainty. The tracking system 140 can compute depth measurements for these detections, creating a plane parallel to a focal plane of a camera along which the object lies, with some uncertainty. These depth measurements can be computed by a stereo vision algorithm operating on pixels corresponding with the object between two or more camera images at different views. The depth computation can look specifically at pixels that are labeled to be part of an object of interest (e.g., a subject 102). The combination of these rays and planes over time can be fused into an accurate prediction of the 3D position and velocity trajectory of the object over time.

While a tracking system 140 can be configured to rely exclusively on visual data from image capture devices onboard a UAV 100, data from other sensors (e.g., sensors on the object, on the UAV 100, or in the environment) can be incorporated into this framework when available. Additional sensors may include GPS, IMU, barometer, magnetometer, and cameras or other devices such as a mobile device 104. For example, a GPS signal from a mobile device 104 held by a person can provide rough position measurements of the person that are fused with the visual information from image capture devices onboard the UAV 100. An IMU sensor at the UAV 100 and/or a mobile device 104 can provide acceleration and angular velocity information, a barometer can provide relative altitude, and a magnetometer can provide heading information. Images captured by cameras on a mobile device 104 held by a person can be fused with images from cameras onboard the UAV 100 to estimate relative pose between the UAV 100 and the person by identifying common features captured in the images. Various other techniques for measuring, estimating, and/or predicting the relative positions and/or orientations of the UAV 100 and/or other objects are described with respect to FIGS. 12-20.

Figure 17:
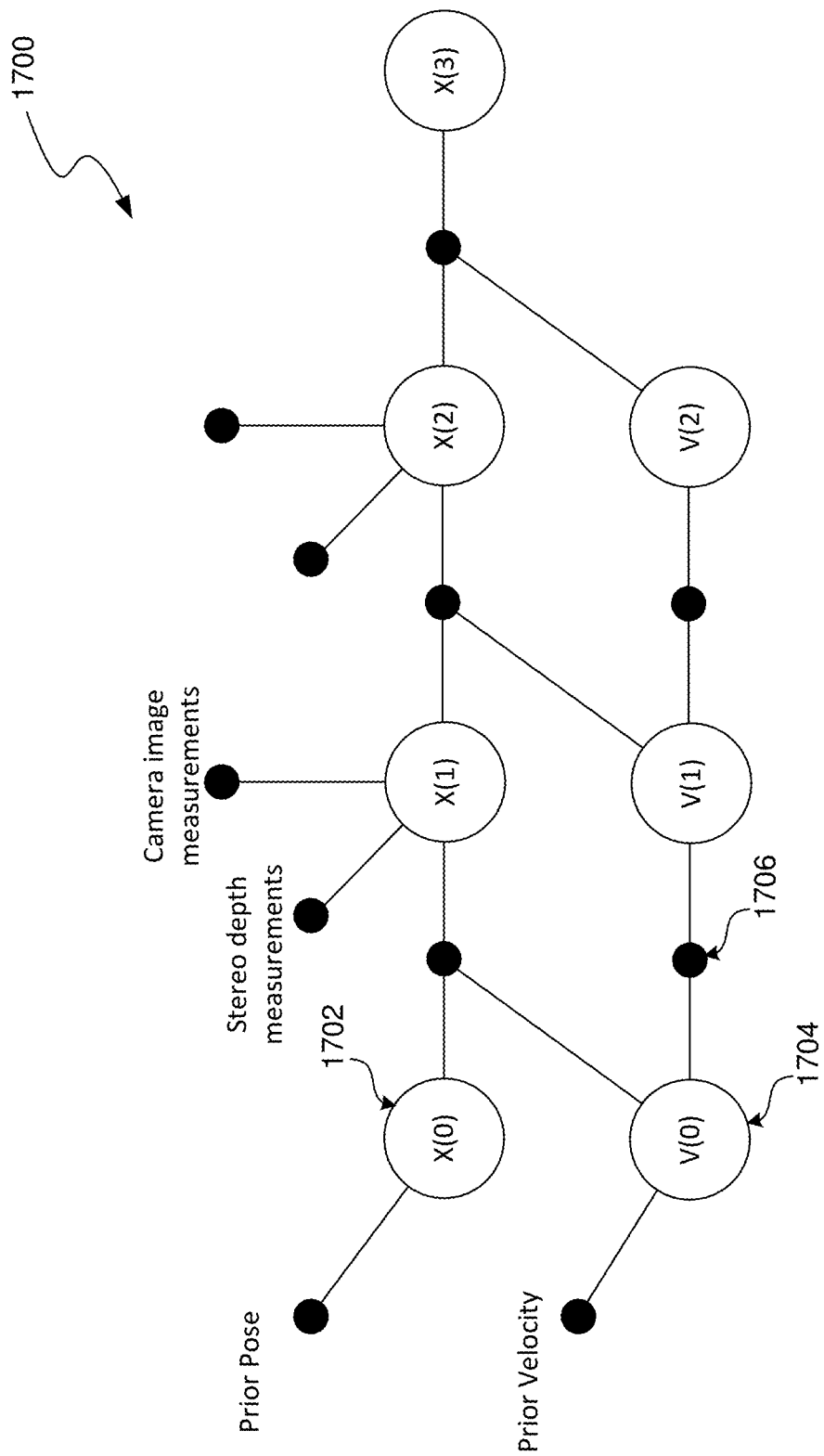
FIG. 17 is a diagrammatic representation of an example spatiotemporal factor graph.

In some embodiments, data from various sensors are input into a spatiotemporal factor graph to probabilistically minimize total measurement error using non-linear optimization. FIG. 17 shows a diagrammatic representation of an example spatiotemporal factor graph 1700 that can be used to estimate a 3D trajectory of an object (e.g., including pose and velocity over time). In the example, spatiotemporal factor graph 1700 depicted in FIG. 17, variable values such as the pose and velocity (represented as nodes (1702 and 1704 respectively)) are connected by one or more motion model processes (represented as nodes 1706 along connecting edges). For example, an estimate or prediction for the pose of the UAV 100 and/or other object at time step 1 (i.e., variable X(1)) may be calculated by inputting estimated pose and velocity at a prior time step (i.e., variables X(0) and V(0)) as well as various perception inputs such as stereo depth measurements and camera image measurements via one or more motion models. A spatiotemporal factor model can be combined with an outlier rejection mechanism wherein measurements deviating too far from an estimated distribution are thrown out. In order to estimate a 3D trajectory from measurements at multiple time instants, one or more motion models (or process models) are used to connect the estimated variables between each time step in the factor graph. Such motion models can include any one of constant velocity, zero velocity, decaying velocity, and decaying acceleration. Applied motion models may be based on a classification of a type of object being tracked and/or learned using machine learning techniques. For example, a cyclist is likely to make wide turns at speed, but is not expected to move sideways. Conversely, a small animal such as a dog may exhibit a more unpredictable motion pattern.

Figure 18:
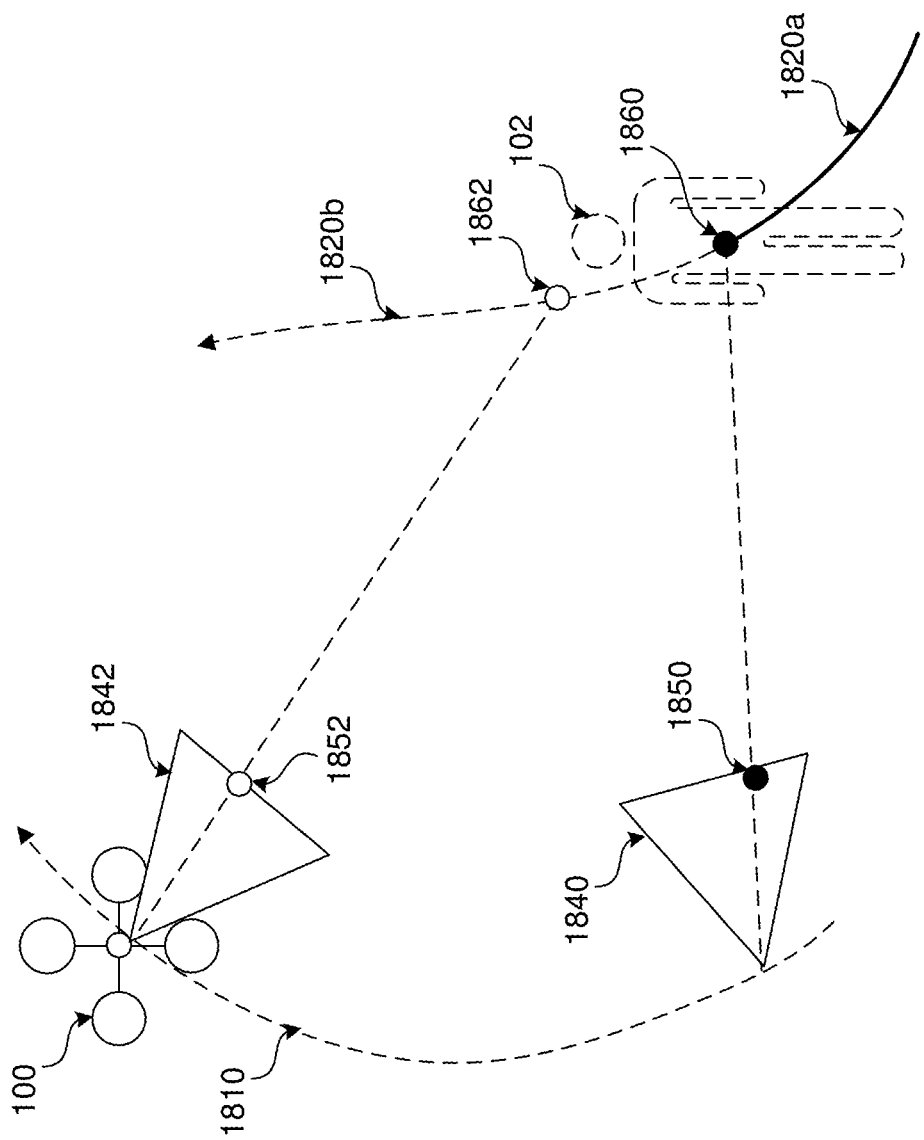
FIG. 18 is a diagram that illustrates an example process of generating an intelligent initial estimate for where a tracked object will appear in a subsequently captured image.

In some embodiments, a tracking system 140 can generate an intelligent initial estimate for where a tracked object will appear in a subsequently captured image based on a predicted 3D trajectory of the object. FIG. 18 shows a diagram that illustrates this concept. As shown in FIG. 18, a UAV 100 is moving along a trajectory 1810 while capturing images of the surrounding physical environment, including of a human subject 102. As the UAV 100 moves along the trajectory 1810, multiple images (e.g., frames of video) are captured from one or more mounted image capture devices 114/115. FIG. 18 shows a first FOV of an image capture device at a first pose 1840 and a second FOV of the image capture device at a second pose 1842. In this example, the first pose 1840 may represent a previous pose of the image capture device at a time instant t(0) while the second pose 1842 may represent a current pose of the image capture device at a time instant t(1). At time instant t(0), the image capture device captures an image of the human subject 102 at a first 3D position 1860 in the physical environment. This first position 1860 may be the last known position of the human subject 102. Given the first pose 1840 of the image capture device, the human subject 102 while at the first 3D position 1860 appears at a first image position 1850 in the captured image. An initial estimate for a second (or current) image position 1852 can therefore be made based on projecting a last known 3D trajectory 1820*a* of the human subject 102 forward in time using one or more motion models associated with the object. For example, predicted trajectory 1820*b* shown in FIG. 18 represents this projection of the 3D trajectory 1820*a* forward in time. A second 3D position 1862 (at time t(1)) of the human subject 102 along this predicted trajectory 1820*b* can then be calculated based on an amount of time elapsed from t(0) to t(1). This second 3D position 1862 can then be projected into the image plane of the image capture device at the second pose 1842 to estimate the second image position 1852 that will correspond to the human subject 102. Generating such an initial estimate for the position of a tracked object in a newly captured image narrows down the search space for tracking and enables a more robust tracking system, particularly in the case of a UAV 100 and/or tracked object that exhibits rapid changes in position and/or orientation.

In some embodiments, the tracking system 140 can take advantage of two or more types of image capture devices onboard the UAV 100. For example, as previously described with respect to FIG. 1, the UAV 100 may include image capture device 114 configured for visual navigation, as well as an image capture device 115 for capturing images that are to be viewed. The image capture devices 114 may be configured for low-latency, low-resolution, and high FOV, while the image capture device 115 may be configured for high resolution. An array of image capture devices 114 about a perimeter of the UAV 100 can provide low-latency information about objects up to 360 degrees around the UAV 100 and can be used to compute depth using stereo vision algorithms. Conversely, the other image capture device 115 can provide more detailed images (e.g., high resolution, color, etc.) in a limited FOV.

Combining information from both types of image capture devices 114 and 115 can be beneficial for object tracking purposes in a number of ways. First, the high-resolution color information from an image capture device 115 can be fused with depth information from the image capture devices 114 to create a 3D representation of a tracked object. Second, the low-latency of the image capture devices 114 can enable more accurate detection of objects and estimation of object trajectories. Such estimates can be further improved and/or corrected based on images received from a high-latency, high resolution image capture device 115. The image data from the image capture devices 114 can either be fused with the image data from the image capture device 115, or can be used purely as an initial estimate.

By using the image capture devices 114, a tracking system 140 can achieve tracking of objects up to 360 degrees around the UAV 100. The tracking system 140 can fuse measurements from any of the image capture devices 114 or 115 when estimating a relative position and/or orientation of a tracked object as the positions and orientations of the image capture devices 114 and 115 change over time. The tracking system 140 can also orient the image capture device 115 to get more accurate tracking of specific objects of interest, fluidly incorporating information from both image capture modalities. Using knowledge of where all objects in the scene are, the UAV 100 can exhibit more intelligent autonomous flight.

As previously discussed, the high-resolution image capture device 115 may be mounted to an adjustable mechanism such as a gimbal that allows for one or more degrees of freedom of motion relative to the body of the UAV 100. Such a configuration is useful in stabilizing image capture as well as tracking objects of particular interest. An active gimbal mechanism configured to adjust an orientation of a higher-resolution image capture device 115 relative to the UAV 100 so as to track a position of an object in the physical environment may allow for visual tracking at greater distances than may be possible through use of the lower-resolution image capture devices 114 alone. Implementation of an active gimbal mechanism may involve estimating the orientation of one or more components of the gimbal mechanism at any given time. Such estimations may be based on any of hardware sensors coupled to the gimbal mechanism (e.g., accelerometers, rotary encoders, etc.), visual information from the image capture devices 114/115, or a fusion based on any combination thereof.

Figure 19:
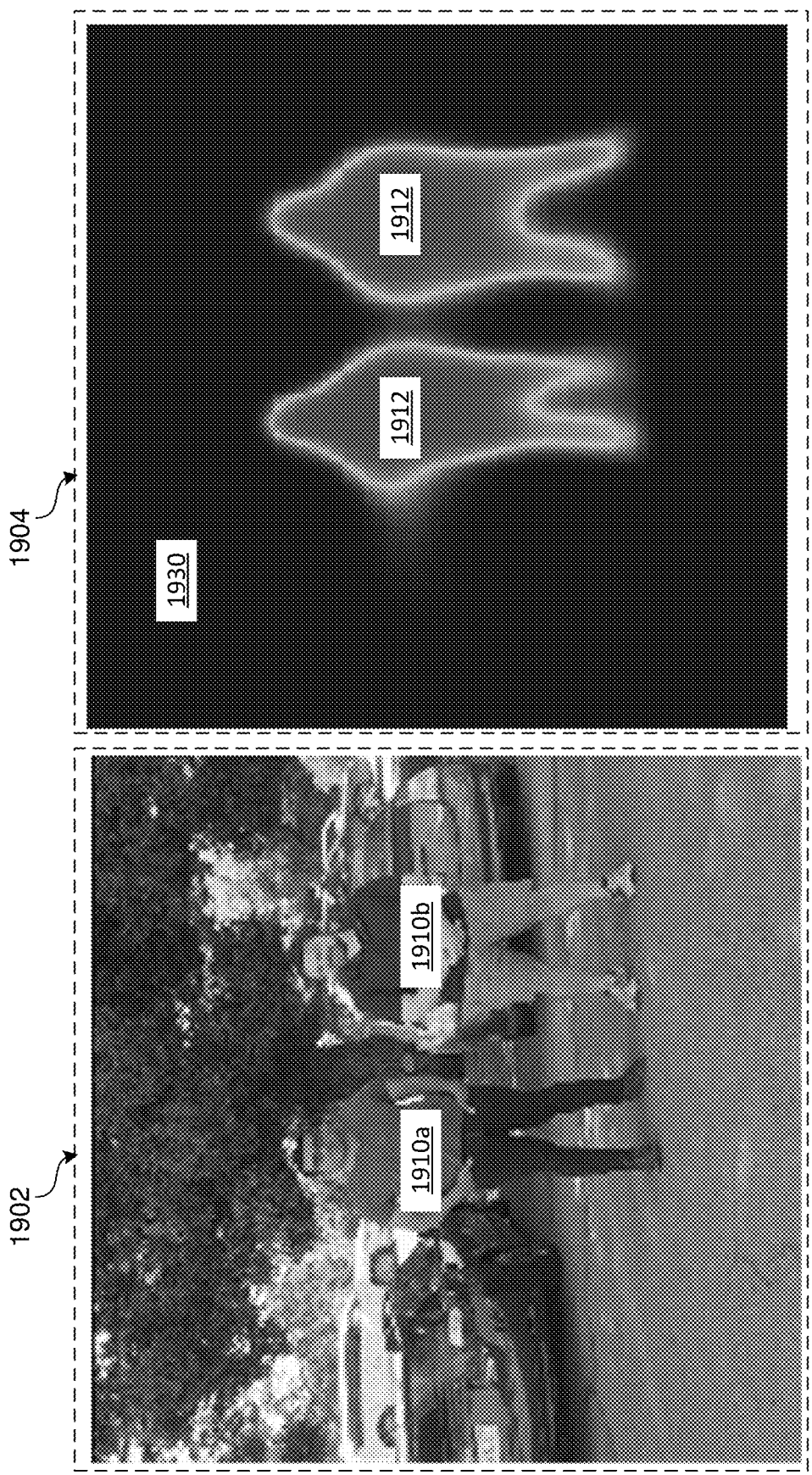
FIG. 19 shows a visualization representative of a dense per-pixel segmentation of a captured image.

A tracking system 140 may include an object detection system for detecting and tracking various objects. Given one or more classes of objects (e.g., humans, buildings, cars, animals, etc.), the object detection system may identify instances of the various classes of objects occurring in captured images of the physical environment. Outputs by the object detection system can be parameterized in a few different ways. In some embodiments, the object detection system processes received images and outputs a dense per-pixel segmentation, where each pixel is associated with a value corresponding to either an object class label (e.g., human, building, car, animal, etc.) and/or a likelihood of belonging to that object class. For example, FIG. 19 shows a visualization 1904 of a dense per-pixel segmentation of a captured image 1902 where pixels corresponding to detected objects 1910a-b classified as humans are set apart from all other pixels in the image 1902. Another parameterization may include resolving the image location of a detected object to a particular image coordinate (e.g., as shown at map 1530 in FIG. 15), for example, based on the centroid of the representation of the object in a received image.

In some embodiments, the object detection system can utilize a deep convolutional neural network for object detection. For example, the input may be a digital image (e.g., image 1902), and the output may be a tensor with the same spatial dimension. Each slice of the output tensor may represent a dense segmentation prediction, where each pixel's value is proportional to the likelihood of that pixel belonging to the class of object corresponding to the slice. For example, the visualization 1904 shown in FIG. 19 may represent a particular slice of the aforementioned tensor where each pixel's value is proportional to the likelihood that the pixel corresponds with a human. In addition, the same deep convolutional neural network can also predict the centroid locations for each detected instance, as described in the following section.

A tracking system 140 may also include an instance segmentation system for distinguishing between individual instances of objects detected by the object detection system. In some embodiments, the process of distinguishing individual instances of detected objects may include processing digital images captured by the UAV 100 to identify pixels belonging to one of a plurality of instances of a class of physical objects present in the physical environment and captured in the digital images. As previously described with respect to FIG. 19, a dense per-pixel segmentation algorithm can classify certain pixels in an image as corresponding to one or more classes of objects. This segmentation process output may allow a tracking system 140 to distinguish the objects represented in an image and the rest of the image (i.e., a background). For example, the visualization 1904 distinguishes pixels that correspond to humans (e.g., included in region 1912) from pixels that do not correspond to humans (e.g., included in region 1930). However, this segmentation process does not necessarily distinguish between individual instances of the detected objects. A human viewing the visualization 1904 may conclude that the pixels corresponding to humans in the detected image actually correspond to two separate humans; however, without further analysis, a tracking system 140 may be unable to make this distinction.

Figure 20:
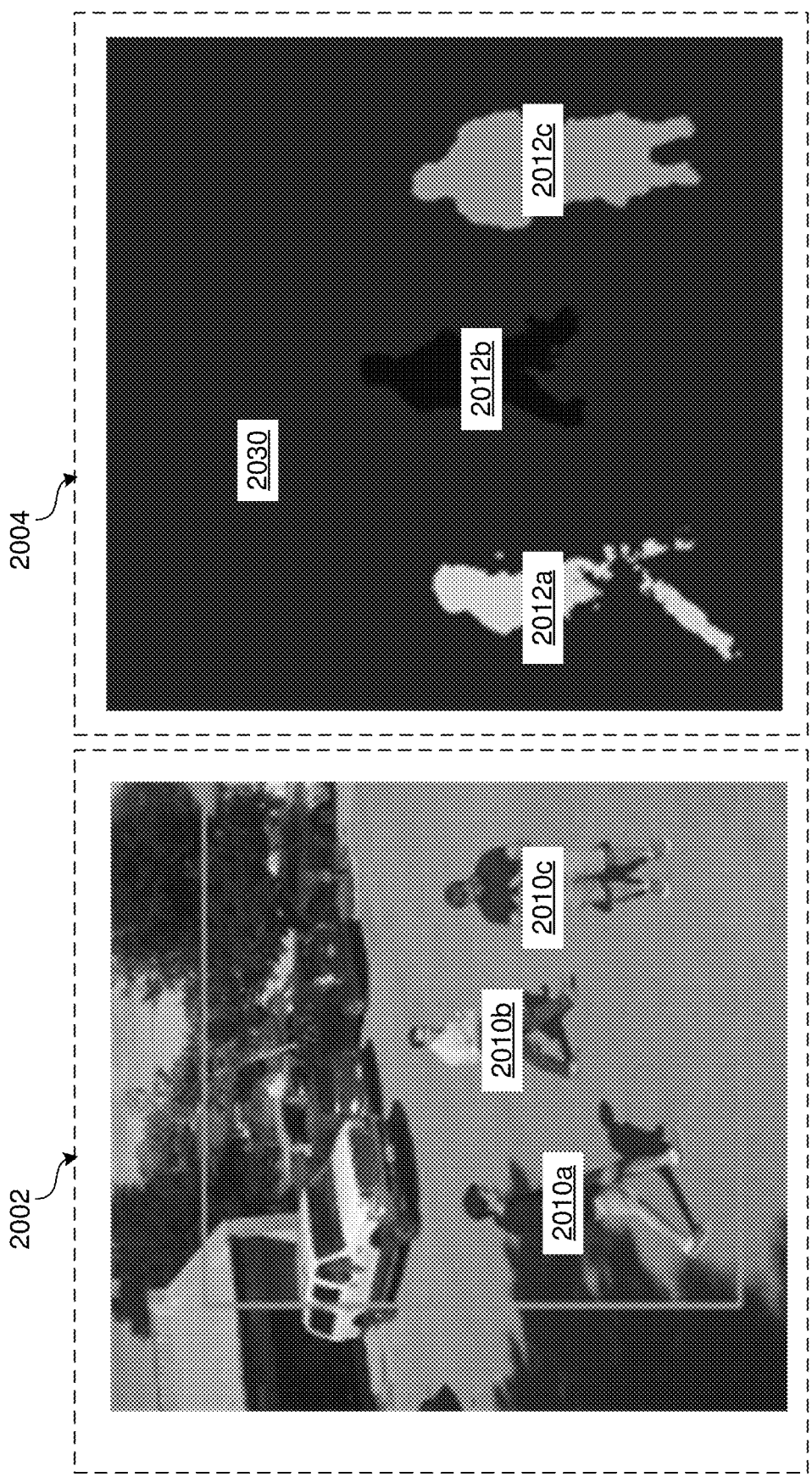
FIG. 20 shows a visualization representative of an instance segmentation of a captured image.

Effective object tracking may involve distinguishing pixels that correspond to distinct instances of detected objects. This process is known as "instance segmentation." FIG. 20 shows an example visualization 2004 of an instance segmentation output based on a captured image 2002. Similar to the dense per-pixel segmentation process described with respect to FIG. 19, the output represented by visualization 2004 distinguishes pixels (e.g., included in regions 2012a-c) that correspond to detected objects 2010a-c of a particular class of objects (in this case humans) from pixels that do not correspond to such objects (e.g., included in region 2030). Notably, the instance segmentation process goes a step further to distinguish pixels corresponding to individual instances of the detected objects from each other. For example, pixels in region 2012a correspond to a detected instance of a human 2010a, pixels in region 2012b correspond to a detected instance of a human 2010b, and pixels in region 2012c correspond to a detected instance of a human 2010c.

Distinguishing between instances of detected objects may be based on an analysis of pixels corresponding to detected objects. For example, a grouping method may be applied by the tracking system 140 to associate pixels corresponding to a particular class of object to a particular instance of that class by selecting pixels that are substantially similar to certain other pixels corresponding to that instance, pixels that are spatially clustered, pixel clusters that fit an appearance-based model for the object class, etc. Again, this process may involve applying a deep convolutional neural network to distinguish individual instances of detected objects.

Instance segmentation may associate pixels corresponding to particular instances of objects; however, such associations may not be temporally consistent. Consider again, the example described with respect to FIG. 20. As illustrated in FIG. 20, a tracking system 140 has identified three instances of a certain class of objects (i.e., humans) by applying an instance segmentation process to a captured image 2002 of the physical environment. This example captured image 2002 may represent only one frame in a sequence of frames of captured video. When a second frame is received, the tracking system 140 may not be able to recognize newly identified object instances as corresponding to the same three people 2010a-c as captured in image 2002.

To address this issue, the tracking system 140 can include an identity recognition system. An identity recognition system may process received inputs (e.g., captured images) to learn the appearances of instances of certain objects (e.g., of particular people). Specifically, the identity recognition system may apply a machine-learning appearance-based model to digital images captured by one or more image capture devices 114/115 associated with a UAV 100. Instance segmentations identified based on processing of captured images can then be compared against such appearance-based models to resolve unique identities for one or more of the detected objects.

Identity recognition can be useful for various different tasks related to object tracking. As previously alluded to, recognizing the unique identities of detected objects allows for temporal consistency. Further, identity recognition can enable the tracking of multiple different objects (as will be described in more detail). Identity recognition may also facilitate object persistence that enables re-acquisition of previously tracked objects that fell out of view due to limited FOV of the image capture devices, motion of the object, and/or occlusion by another object. Identity recognition can also be applied to perform certain identity-specific behaviors or actions, such as recording video when a particular person is in view.

In some embodiments, an identity recognition process may employ a deep convolutional neural network to learn one or more effective appearance-based models for certain objects. In some embodiments, the neural network can be trained to learn a distance metric that returns a low distance value for image crops belonging to the same instance of an object (e.g., a person), and a high distance value otherwise.

In some embodiments, an identity recognition process may also include learning appearances of individual instances of objects such as people. When tracking humans, a tracking system 140 may be configured to associate identities of the humans, either through user-input data or external data sources such as images associated with individuals available on social media. Such data can be combined with detailed facial recognition processes based on images received from any of the one or more image capture devices 114/115 onboard the UAV 100. In some embodiments, an identity recognition process may focus on one or more key individuals. For example, a tracking system 140 associated with a UAV 100 may specifically focus on learning the identity of a designated owner of the UAV 100 and retain and/or improve its knowledge between flights for tracking, navigation, and/or other purposes such as access control.

In some embodiments, a tracking system 140 may be configured to focus tracking on a specific object detected in captured images. In such a single-object tracking approach, an identified object (e.g., a person) is designated for tracking while all other objects (e.g., other people, trees, buildings, landscape features, etc.) are treated as distractors and ignored. While useful in some contexts, a single-object tracking approach may have some disadvantages. For example, an overlap in trajectory, from the point of view of an image capture device, of a tracked object and a distractor object may lead to an inadvertent switch in the object being tracked such that the tracking system 140 begins tracking the distractor instead. Similarly, spatially close false positives by an object detector can also lead to inadvertent switches in tracking.

A multi-object tracking approach addresses these shortcomings and introduces a few additional benefits. In some embodiments, a unique track is associated with each object detected in the images captured by the one or more image capture devices 114/115. In some cases, it may not be practical, from a computing standpoint, to associate a unique track with every single object that is captured in the images. For example, a given image may include hundreds of objects, including minor features such as rocks or leaves or trees. Instead, unique tracks may be associated with certain classes of objects that may be of interest from a tracking standpoint. For example, the tracking system 140 may be configured to associate a unique track with every object detected that belongs to a class that is generally mobile (e.g., people, animals, vehicles, etc.).

Each unique track may include an estimate for the spatial location and movement of the object being tracked (e.g., using the spatiotemporal factor graph described earlier) as well as its appearance (e.g., using the identity recognition feature). Instead of pooling together all other distractors (i.e., as may be performed in a single object tracking approach), the tracking system 140 can learn to distinguish between the multiple individual tracked objects. By doing so, the tracking system 140 may render inadvertent identity switches less likely. Similarly, false positives by the object detector can be more robustly rejected as they will tend to not be consistent with any of the unique tracks.

An aspect to consider when performing multi-object tracking includes the association problem. In other words, given a set of object detections based on captured images (including parameterization by 3D location and regions in the image corresponding to segmentation), an issue arises regarding how to associate each of the set of object detections with corresponding tracks. To address the association problem, the tracking system 140 can be configured to associate one of a plurality of detected objects with one of a plurality of estimated object tracks based on a relationship between a detected object and an estimate object track. Specifically, this process may involve computing a "cost" value for one or more pairs of object detections and estimate object tracks. The computed cost values can take into account, for example, the spatial distance between a current location (e.g., in 3D space and/or image space) of a given object detection and a current estimate of a given track (e.g., in 3D space and/or in image space), an uncertainty of the current estimate of the given track, a difference between a given detected object's appearance and a given track's appearance estimate, and/or any other factors that may tend to suggest an association between a given detected object and given track. In some embodiments, multiple cost values are computed based on various different factors and fused into a single scalar value that can then be treated as a measure of how well a given detected object matches a given track. The aforementioned cost formulation can then be used to determine an optimal association between a detected object and a corresponding track by treating the cost formulation as an instance of a minimum cost perfect bipartite matching problem, which can be solved using, for example, the Hungarian algorithm.

In some embodiments, effective object tracking by a tracking system 140 may be improved by incorporating information regarding a state of an object. For example, a detected object such as a human may be associated with any one or more defined states. A state in this context may include an activity by the object such as sitting, standing, walking, running, or jumping. In some embodiments, one or more perception inputs (e.g., visual inputs from image capture devices 114/115) may be used to estimate one or more parameters associated with detected objects. The estimated parameters may include an activity type, motion capabilities, trajectory heading, contextual location (e.g., indoors vs. outdoors), interaction with other detected objects (e.g., two people walking together, a dog on a leash held by a person, a trailer pulled by a car, etc.), and any other semantic attributes.

Generally, object state estimation may be applied to estimate one or more parameters associated with a state of a detected object based on perception inputs (e.g., images of the detected object captured by one or more image capture devices 114/115 onboard a UAV 100 or sensor data from any other sensors onboard the UAV 100). The estimated parameters may then be applied to assist in predicting the motion of the detected object and thereby assist in tracking the detected object. For example, future trajectory estimates may differ for a detected human depending on whether the detected human is walking, running, jumping, riding a bicycle, riding in a car, etc. In some embodiments, deep convolutional neural networks may be applied to generate the parameter estimates based on multiple data sources (e.g., the perception inputs) to assist in generating future trajectory estimates and thereby assist in tracking.

As previously alluded to, a tracking system 140 may be configured to estimate (i.e., predict) a future trajectory of a detected object based on past trajectory measurements and/or estimates, current perception inputs, motion models, and any other information (e.g., object state estimates). Predicting a future trajectory of a detected object is particularly useful for autonomous navigation by the UAV 100. Effective autonomous navigation by the UAV 100 may depend on anticipation of future conditions just as much as current conditions in the physical environment. Through a motion planning process, a navigation system of the UAV 100 may generate control commands configured to cause the UAV 100 to maneuver, for example, to avoid a collision, maintain separation with a tracked object in motion, and/or satisfy any other navigation objectives.

Predicting a future trajectory of a detected object is generally a relatively difficult problem to solve. The problem can be simplified for objects that are in motion according to a known and predictable motion model. For example, an object in free fall is expected to continue along a previous trajectory while accelerating at rate based on a known gravitational constant and other known factors (e.g., wind resistance). In such cases, the problem of generating a prediction of a future trajectory can be simplified to merely propagating past and current motion according to a known or predictable motion model associated with the object. Objects may of course deviate from a predicted trajectory generated based on such assumptions for a number of reasons (e.g., due to collision with another object). However, the predicted trajectories may still be useful for motion planning and/or tracking purposes.

Dynamic objects, such as people and animals, present a more difficult challenge when predicting future trajectories because the motion of such objects is generally based on the environment and their own free will. To address such challenges, a tracking system 140 may be configured to take accurate measurements of the current position and motion of an object and use differentiated velocities and/or accelerations to predict a trajectory a short time (e.g., seconds) into the future and continually update such prediction as new measurements are taken. Further, the tracking system 140 may also use semantic information gathered from an analysis of captured images as cues to aid in generating predicted trajectories. For example, a tracking system 140 may determine that a detected object is a person on a bicycle traveling along a road. With this semantic information, the tracking system 140 may form an assumption that the tracked object is likely to continue along a trajectory that roughly coincides with a path of the road. As another related example, the tracking system 140 may determine that the person has begun turning the handlebars of the bicycle to the left. With this semantic information, the tracking system 140 may form an assumption that the tracked object will likely turn to the left before receiving any positional measurements that expose this motion. Another example, particularly relevant to autonomous objects such as people or animals is to assume that that the object will tend to avoid collisions with other objects. For example, the tracking system 140 may determine a tracked object is a person heading on a trajectory that will lead to a collision with another object such as a light pole. With this semantic information, the tracking system 140 may form an assumption that the tracked object is likely to alter its current trajectory at some point before the collision occurs. A person having ordinary skill will recognize that these are only examples of how semantic information may be utilized as a cue to guide prediction of future trajectories for certain objects.

In addition to performing an object detection process in one or more captured images per time frame, the tracking system 140 may also be configured to perform a frame-to-frame tracking process, for example, to detect motion of a particular set or region of pixels in images at subsequent time frames (e.g., video frames). Such a process may involve applying a mean-shift algorithm, a correlation filter, and/or a deep network. In some embodiments, frame-to-frame tracking may be applied by a system that is separate from an object detection system wherein results from the frame-to-frame tracking are fused into a spatiotemporal factor graph. Alternatively, or in addition, an object detection system may perform frame-to-frame tracking if, for example, the system has sufficient available computing resources (e.g., memory). For example, an object detection system may apply frame-to-frame tracking through recurrence in a deep network and/or by passing in multiple images at a time. A frame-to-frame tracking process and object detection process can also be configured to complement each other, with one resetting the other when a failure occurs.

As previously discussed, the tracking system 140 may be configured to process images (e.g., the raw pixel data) received from one or more image capture devices 114/115 onboard a UAV 100. Alternatively, or in addition, the tracking system 140 may also be configured to operate by processing disparity images. Such a disparity image will tend to highlight regions of an image that correspond to objects in the physical environment since the pixels corresponding to the object will have similar disparities due to the object's 3D location in space. Accordingly, a disparity image, that may have been generated by processing two or more images according to a separate stereo algorithm, may provide useful cues to guide the tracking system 140 in detecting objects in the physical environment. In many situations, particularly where harsh lighting is present, a disparity image may actually provide stronger cues about the location of objects than an image captured from the image capture devices 114/115. As mentioned, disparity images may be computed with a separate stereo algorithm. Alternatively, or in addition, disparity images may be output as part of the same deep network applied by the tracking system 140. Disparity images may be used for object detection separately from the images received from the image capture devices 114/115, or they may be combined into a single network for joint inference.

In general, a tracking system 140 (e.g., including an object detection system and/or an associated instance segmentation system) may be primarily concerned with determining which pixels in a given image correspond to each object instance. However, these systems may not consider portions of a given object that are not actually captured in a given image. For example, pixels that would otherwise correspond with an occluded portion of an object (e.g., a person partially occluded by a tree) may not be labeled as corresponding to the object. This can be disadvantageous for object detection, instance segmentation, and/or identity recognition because the size and shape of the object may appear in the captured image to be distorted due to the occlusion. To address this issue, the tracking system 140 may be configured to imply a segmentation of an object instance in a captured image even if that object instance is occluded by other object instances. The object tracking system 140 may additionally be configured to determine which of the pixels associated with an object instance correspond with an occluded portion of that object instance. This process is generally referred to as "amodal segmentation" in that the segmentation process takes into consideration the whole of a physical object even if parts of the physical object are not necessarily perceived, for example, received images captured by the image capture devices 114/115. Amodal segmentation may be particularly advantageous when performing identity recognition and in a tracking system 140 configured for multi-object tracking.

Loss of visual contact is to be expected when tracking an object in motion through a physical environment. A tracking system 140 based primarily on visual inputs (e.g., images captured by image capture devices 114/115) may lose a track on an object when visual contact is lost (e.g., due to occlusion by another object or by the object leaving a FOV of image capture devices 114/115). In such cases, the tracking system 140 may become uncertain of the object's location and thereby declare the object lost. Human pilots generally do not have this issue, particularly in the case of momentary occlusions, due to the notion of object permanence. Object permanence assumes that, given certain physical constraints of matter, an object cannot suddenly disappear or instantly teleport to another location. Based on this assumption, if it is clear that all escape paths would have been clearly visible, then an object is likely to remain in an occluded volume. This situation is most clear when there is single occluding object (e.g., boulder) on flat ground with free space all around. If a tracked object in motion suddenly disappears in the captured image at a location of another object (e.g., the bolder), then it can be assumed that the object remains at a position occluded by the other object and that the tracked object will emerge along one of one or more possible escape paths. In some embodiments, the tracking system 140 may be configured to implement an algorithm that bounds the growth of uncertainty in the tracked object's location given this concept. In other words, when visual contact with a tracked object is lost at a particular position, the tracking system 140 can bound the uncertainty in the object's position to the last observed position and one or more possible escape paths given a last observed trajectory. A possible implementation of this concept may include generating, by the tracking system 140, an occupancy map that is carved out by stereo and the segmentations with a particle filter on possible escape paths.

Unmanned Aerial Vehicle—Example System

A UAV 100, according to the present teachings, may be implemented as any type of UAV. A UAV, sometimes referred to as a drone, is generally defined as any aircraft capable of controlled flight without a human pilot onboard. UAVs may be controlled autonomously by onboard computer processors or via remote control by a remotely located human pilot. Similar to an airplane, UAVs may utilize fixed aerodynamic surfaces along with a propulsion system (e.g., propeller, jet, etc.) to achieve lift. Alternatively, similar to helicopters, UAVs may directly use a propulsion system (e.g., propeller, jet, etc.) to counter gravitational forces and achieve lift. Propulsion-driven lift (as in the case of helicopters) offers significant advantages in certain implementations, for example, as a mobile filming platform, because it allows for controlled motion along all axes.

Multi-rotor helicopters, in particular quadcopters, have emerged as a popular UAV configuration. A quadcopter (also known as a quadrotor helicopter or quadrotor) is a multi-rotor helicopter that is lifted and propelled by four rotors. Unlike most helicopters, quadcopters use two sets of two fixed-pitch propellers. A first set of rotors turns clockwise, while a second set of rotors turns counter-clockwise. In turning opposite directions, a first set of rotors may counter the angular torque caused by the rotation of the other set, thereby stabilizing flight. Flight control is achieved through variation in the angular velocity of each of the four fixed-pitch rotors. By varying the angular velocity of each of the rotors, a quadcopter may perform precise adjustments in its position (e.g., adjustments in altitude and level flight left, right, forward and backward) and orientation, including pitch (rotation about a first lateral axis), roll (rotation about a second lateral axis), and yaw (rotation about a vertical axis). For example, if all four rotors are spinning (two clockwise, and two counter-clockwise) at the same angular velocity, the net aerodynamic torque about the vertical yaw axis is zero. Provided the four rotors spin at sufficient angular velocity to provide a vertical thrust equal to the force of gravity, the quadcopter can maintain a hover. An adjustment in yaw may be induced by varying the angular velocity of a subset of the four rotors thereby mismatching the cumulative aerodynamic torque of the four rotors. Similarly, an adjustment in pitch and/or roll may be induced by varying the angular velocity of a subset of the four rotors, but in a balanced fashion such that lift is increased on one side of the craft and decreased on the other side of the craft. An adjustment in altitude from hover may be induced by applying a balanced variation in all four rotors, thereby increasing or decreasing the vertical thrust. Positional adjustments left, right, forward, and backward may be induced through combined pitch/roll maneuvers with balanced applied vertical thrust. For example, to move forward on a horizontal plane, the quadcopter would vary the angular velocity of a subset of its four rotors in order to perform a pitch forward maneuver. While pitching forward, the total vertical thrust may be increased by increasing the angular velocity of all the rotors. Due to the forward pitched orientation, the acceleration caused by the vertical thrust maneuver will have a horizontal component and will, therefore, accelerate the craft forward on a horizontal plane.

Figure 21:
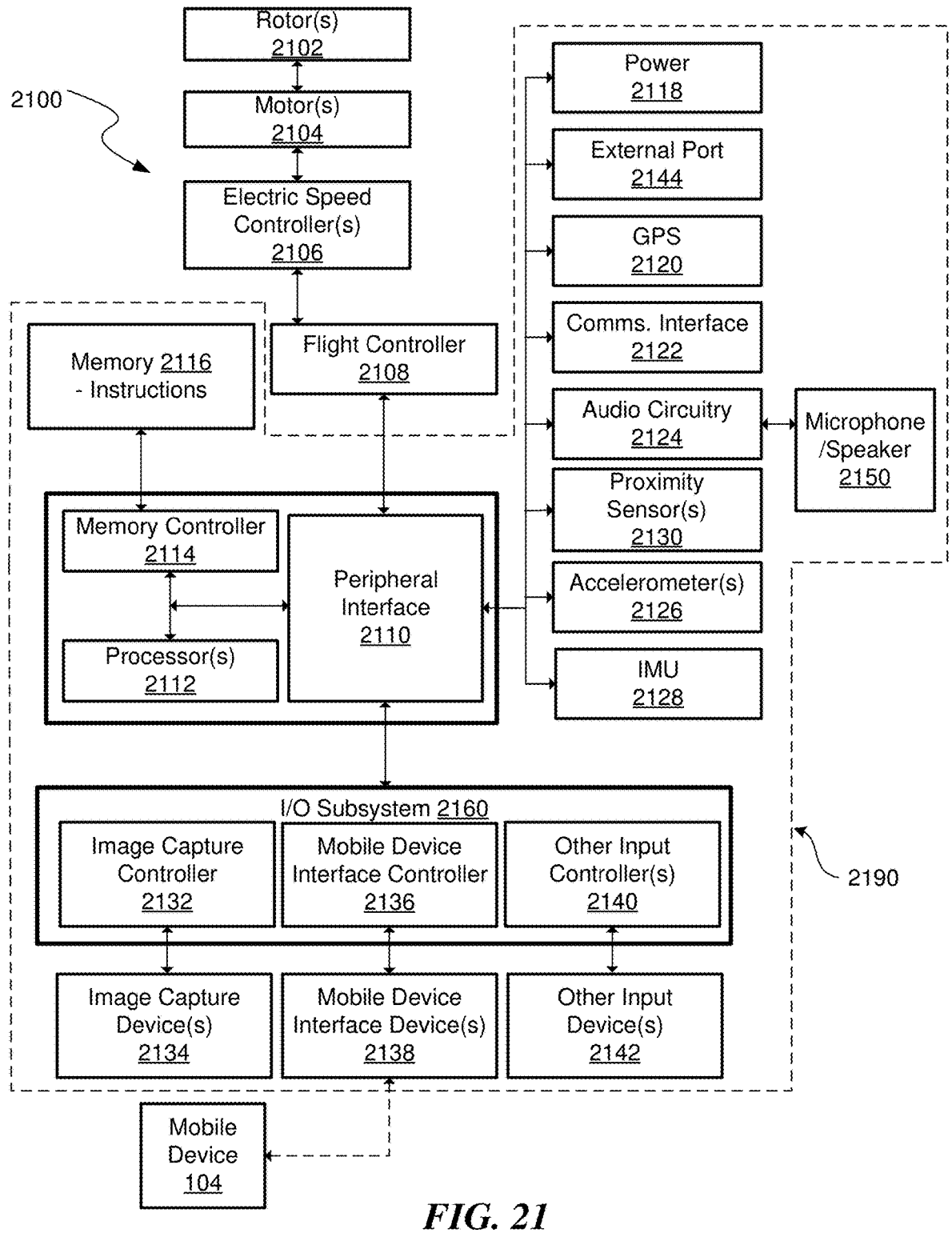
FIG. 21 is a block diagram of an example UAV system including various functional system components with which at least some operations described in this disclosure can be implemented.

FIG. 21 shows a diagram of an example UAV system 2100 including various functional system components that may be part of a UAV 100, according to some embodiments. UAV system 2100 may include one or more propulsion systems (e.g., rotors 2102 and motor(s) 2104), one or more electronic speed controllers 2106, a flight controller 2108, a peripheral interface 2110, processor(s) 2112, a memory controller 2114, a memory 2116 (which may include one or more computer-readable storage media), a power module 2118, a GPS module 2120, a communications interface 2122, audio circuitry 2124, an accelerometer 2126 (including subcomponents, such as gyroscopes), an IMU 2128, a proximity sensor 2130, an optical sensor controller 2132 and associated optical sensor(s) 2134, a mobile device interface controller 2136 with associated interface device(s) 2138, and any other input controllers 2140 and input device(s) 2142, for example, display controllers with associated display device(s). These components may communicate over one or more communication buses or signal lines as represented by the arrows in FIG. 21.

UAV system 2100 is only one example of a system that may be part of a UAV 100. A UAV 100 may include more or fewer components than shown in system 2100, may combine two or more components as functional units, or may have a different configuration or arrangement of the components. Some of the various components of system 2100 shown in FIG. 21 may be implemented in hardware, software or a combination of both hardware and software, including one or more signal processing and/or application specific integrated circuits. Also, UAV 100 may include an off-the-shelf UAV (e.g., a currently available remote-controlled quadcopter) coupled with a modular add-on device (for example, one including components within outline 2190) to perform the innovative functions described in this disclosure.

A propulsion system (e.g., comprising components 2102-2104) may comprise fixed-pitch rotors. The propulsion system may also include variable-pitch rotors (for example, using a gimbal mechanism), a variable-pitch jet engine, or any other mode of propulsion having the effect of providing force. The propulsion system may vary the applied thrust, for example, by using an electronic speed controller 2106 to vary the speed of each fixed-pitch rotor.

Flight controller 2108 may include a combination of hardware and/or software configured to receive input data (e.g., sensor data from image capture devices 2134, generated trajectories from an autonomous navigation system 120, or any other inputs), interpret the data and output control commands to the propulsion systems 2102-2106 and/or aerodynamic surfaces (e.g., fixed wing control surfaces) of the UAV 100. Alternatively, or in addition, a flight controller 2108 may be configured to receive control commands generated by another component or device (e.g., processors 2112 and/or a separate computing device), interpret those control commands and generate control signals to the propulsion systems 2102-2106 and/or aerodynamic surfaces (e.g., fixed wing control surfaces) of the UAV 100. In some embodiments, the previously mentioned navigation system 120 of the UAV 100 may comprise the flight controller 2108 and/or any one or more of the other components of system 2100. Alternatively, the flight controller 2108 shown in FIG. 21 may exist as a component separate from the navigation system 120, for example, similar to the flight controller 160 shown in FIG. 2.

Memory 2116 may include high-speed random access memory and may also include non-volatile memory, such as one or more magnetic disk storage devices, flash memory devices, or other non-volatile solid-state memory devices. Access to memory 2116 by other components of system 2100, such as the processors 2112 and the peripherals interface 2110, may be controlled by the memory controller 2114.

The peripherals interface 2110 may couple the input and output peripherals of system 2100 to the processor(s) 2112 and memory 2116. The one or more processors 2112 run or execute various software programs and/or sets of instructions stored in memory 2116 to perform various functions for the UAV 100 and to process data. In some embodiments, processors 2112 may include general central processing units (CPUs), specialized processing units such as graphical processing units (GPUs) particularly suited to parallel processing applications, or any combination thereof. In some embodiments, the peripherals interface 2110, the processor(s) 2112, and the memory controller 2114 may be implemented on a single integrated chip. In some other embodiments, they may be implemented on separate chips.

The network communications interface 2122 may facilitate transmission and reception of communications signals often in the form of electromagnetic signals. The transmission and reception of electromagnetic communications signals may be carried out over physical media such as copper wire cabling or fiber optic cabling, or may be carried out wirelessly, for example, via a radiofrequency (RF) transceiver. In some embodiments, the network communications interface may include RF circuitry. In such embodiments, RF circuitry may convert electrical signals to/from electromagnetic signals and communicate with communications networks and other communications devices via the electromagnetic signals. The RF circuitry may include well-known circuitry for performing these functions, including, but not limited to, an antenna system, an RF transceiver, one or more amplifiers, a tuner, one or more oscillators, a digital signal processor, a CODEC chipset, a subscriber identity module (SIM) card, memory, and so forth. The RF circuitry may facilitate transmission and receipt of data over communications networks (including public, private, local, and wide area). For example, communication may be over a wide area network (WAN), a local area network (LAN), or a network of networks such as the Internet. Communication may be facilitated over wired transmission media (e.g., via Ethernet) or wirelessly. Wireless communication may be over a wireless cellular telephone network, a wireless local area network (LAN) and/or a metropolitan area network (MAN), and other modes of wireless communication. The wireless communication may use any of a plurality of communications standards, protocols and technologies, including, but not limited to, Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11n and/or IEEE 802.11ac), voice over Internet Protocol (VoIP), Wi-MAX, or any other suitable communication protocols.

The audio circuitry 2124, including the speaker and microphone 2150, may provide an audio interface between the surrounding environment and the UAV 100. The audio circuitry 2124 may receive audio data from the peripherals interface 2110, convert the audio data to an electrical signal, and transmit the electrical signal to the speaker 2150. The speaker 2150 may convert the electrical signal to human-audible sound waves. The audio circuitry 2124 may also receive electrical signals converted by the microphone 2150 from sound waves. The audio circuitry 2124 may convert the electrical signal to audio data and transmit the audio data to the peripherals interface 2110 for processing. Audio data may be retrieved from and/or transmitted to memory 2116 and/or the network communications interface 2122 by the peripherals interface 2110.

The I/O subsystem 2160 may couple input/output peripherals of UAV 100, such as an optical sensor system 2134, the mobile device interface 2138, and other input/control devices 2142, to the peripherals interface 2110. The I/O subsystem 2160 may include an optical sensor controller 2132, a mobile device interface controller 2136, and other input controller(s) 2140 for other input or control devices. The one or more input controllers 2140 receive/send electrical signals from/to other input or control devices 2142.

The other input/control devices 2142 may include physical buttons (e.g., push buttons, rocker buttons, etc.), dials, touch screen displays, slider switches, joysticks, click wheels, and so forth. A touch screen display may be used to implement virtual or soft buttons and one or more soft keyboards. A touch-sensitive touch screen display may provide an input interface and an output interface between the UAV 100 and a user. A display controller may receive and/or send electrical signals from/to the touch screen. The touch screen may display visual output to a user. The visual output may include graphics, text, icons, video, and any combination thereof (collectively termed "graphics"). In some embodiments, some or all of the visual output may correspond to user-interface objects, further details of which are described below.

A touch sensitive display system may have a touch-sensitive surface, sensor or set of sensors that accepts input from the user based on haptic and/or tactile contact. The touch sensitive display system and the display controller (along with any associated modules and/or sets of instructions in memory 2116) may detect contact (and any movement or breaking of the contact) on the touch screen and convert the detected contact into interaction with user-interface objects (e.g., one or more soft keys or images) that are displayed on the touch screen. In an exemplary embodiment, a point of contact between a touch screen and the user corresponds to a finger of the user.

The touch screen may use liquid crystal display (LCD) technology, or light emitting polymer display (LPD) technology, although other display technologies may be used in other embodiments. The touch screen and the display controller may detect contact and any movement or breaking thereof using any of a plurality of touch sensing technologies now known or later developed, including, but not limited to, capacitive, resistive, infrared, and surface acoustic wave technologies, as well as other proximity sensor arrays or other elements for determining one or more points of contact with a touch screen.

The mobile device interface device 2138 along with mobile device interface controller 2136 may facilitate the transmission of data between a UAV 100 and other computing devices such as a mobile device 104. According to some embodiments, communications interface 2122 may facilitate the transmission of data between UAV 100 and a mobile device 104 (for example, where data is transferred over a Wi-Fi network).

UAV system 2100 also includes a power system 2118 for powering the various components. The power system 2118 may include a power management system, one or more power sources (e.g., battery, alternating current (AC), etc.), a recharging system, a power failure detection circuit, a power converter or inverter, a power status indicator (e.g., a light-emitting diode (LED)) and any other components associated with the generation, management and distribution of power in computerized device.

UAV system 2100 may also include one or more image capture devices 2134. Image capture devices 2134 may be the same as the image capture devices 114/115 of UAV 100 described with respect to FIG. 1. FIG. 21 shows an image capture device 2134 coupled to an image capture controller 2132 in I/O subsystem 2160. The image capture device 2134 may include one or more optical sensors. For example, image capture device 2134 may include a charge-coupled device (CCD) or complementary metal-oxide semiconductor (CMOS) phototransistors. The optical sensors of image capture devices 2134 receive light from the environment, projected through one or more lenses (the combination of an optical sensor and lens can be referred to as a "camera") and converts the light to data representing an image. In conjunction with an imaging module located in memory 2116, the image capture device 2134 may capture images (including still images and/or video). In some embodiments, an image capture device 2134 may include a single fixed camera. In other embodiments, an image capture device 2140 may include a single adjustable camera (adjustable using a gimbal mechanism with one or more axes of motion). In some embodiments, an image capture device 2134 may include a camera with a wide-angle lens providing a wider FOV. In some embodiments, an image capture device 2134 may include an array of multiple cameras providing up to a full 360 degree view in all directions. In some embodiments, an image capture device 2134 may include two or more cameras (of any type as described herein) placed next to each other in order to provide stereoscopic vision. In some embodiments, an image capture device 2134 may include multiple cameras of any combination as described above. In some embodiments, the cameras of an image capture device 2134 may be arranged such that at least two cameras are provided with overlapping FOV at multiple angles around the UAV 100, thereby allowing for stereoscopic (i.e., 3D) image/video capture and depth recovery (e.g., through computer vision algorithms) at multiple angles around UAV 100. For example, UAV 100 may include four sets of two cameras each positioned so as to provide a stereoscopic view at multiple angles around the UAV 100. In some embodiments, a UAV 100 may include some cameras dedicated for image capture of a subject and other cameras dedicated for image capture for visual navigation (e.g., through visual inertial odometry).

UAV system 2100 may also include one or more proximity sensors 2130. FIG. 21 shows a proximity sensor 2130 coupled to the peripherals interface 2110. Alternately, the proximity sensor 2130 may be coupled to an input controller 2140 in the I/O subsystem 2160. Proximity sensors 2130 may generally include remote sensing technology for proximity detection, range measurement, target identification, etc. For example, proximity sensors 2130 may include radar, sonar, and LIDAR.

UAV system 2100 may also include one or more accelerometers 2126. FIG. 21 shows an accelerometer 2126 coupled to the peripherals interface 2110. Alternately, the accelerometer 2126 may be coupled to an input controller 2140 in the I/O subsystem 2160.

UAV system 2100 may include one or more IMU 2128. An IMU 2128 may measure and report the UAV's velocity, acceleration, orientation, and gravitational forces using a combination of gyroscopes and accelerometers (e.g., accelerometer 2126).

UAV system 2100 may include a global positioning system (GPS) receiver 2120. FIG. 21 shows a GPS receiver 2120 coupled to the peripherals interface 2110. Alternately, the GPS receiver 2120 may be coupled to an input controller 2140 in the I/O subsystem 2160. The GPS receiver 2120 may receive signals from GPS satellites in orbit around the earth, calculate a distance to each of the GPS satellites (through the use of GPS software), and thereby pinpoint a current global position of UAV 100.

In some embodiments, the software components stored in memory 2116 may include an operating system, a communication module (or set of instructions), a flight control module (or set of instructions), a localization module (or set of instructions), a computer vision module (or set of instructions), a graphics module (or set of instructions), and other applications (or sets of instructions). For clarity, one or more modules and/or applications may not be shown in FIG. 21.

An operating system (e.g., Darwin™, RTXC, Linux™, Unix™, Apple™ OS X, Microsoft Windows™, or an embedded operating system such as VxWorks™) includes various software components and/or drivers for controlling and managing general system tasks (e.g., memory management, storage device control, power management, etc.) and facilitates communication between various hardware and software components.

A communications module may facilitate communication with other devices over one or more external ports 2144 and may also include various software components for handling data transmission via the network communications interface 2122. The external port 2144 (e.g., Universal Serial Bus (USB), FIREWIRE, etc.) may be adapted for coupling directly to other devices or indirectly over a network (e.g., the Internet, wireless LAN, etc.).

A graphics module may include various software components for processing, rendering and displaying graphics data. As used herein, the term "graphics" may include any object that can be displayed to a user, including, without limitation, text, still images, videos, animations, icons (such as user-interface objects including soft keys), and the like. The graphics module in conjunction with a graphics processing unit (GPU) 2112 may process in real time or near real time, graphics data captured by optical sensor(s) 2134 and/or proximity sensors 2130.

A computer vision module, which may be a component of a graphics module, provides analysis and recognition of graphics data. For example, while UAV 100 is in flight, the computer vision module along with a graphics module (if separate), GPU 2112, and image capture devices(s) 2134 and/or proximity sensors 2130 may recognize and track the captured image of an object located on the ground. The computer vision module may further communicate with a localization/navigation module and flight control module to update a position and/or orientation of the UAV 100 and to provide course corrections to fly along a planned trajectory through a physical environment.

A localization/navigation module may determine the location and/or orientation of UAV 100 and provide this information for use in various modules and applications (e.g., to a flight control module in order to generate commands for use by the flight controller 2108).

Image capture devices(s) 2134, in conjunction with an image capture device controller 2132 and a graphics module, may be used to capture images (including still images and video) and store them into memory 2116.

The above identified modules and applications each correspond to a set of instructions for performing one or more functions described above. These modules (i.e., sets of instructions) need not be implemented as separate software programs, procedures or modules, and, thus, various subsets of these modules may be combined or otherwise re-arranged in various embodiments. In some embodiments, memory 2116 may store a subset of the modules and data structures identified above. Furthermore, memory 2116 may store additional modules and data structures not described above.

Example Computer Processing System

Figure 22:
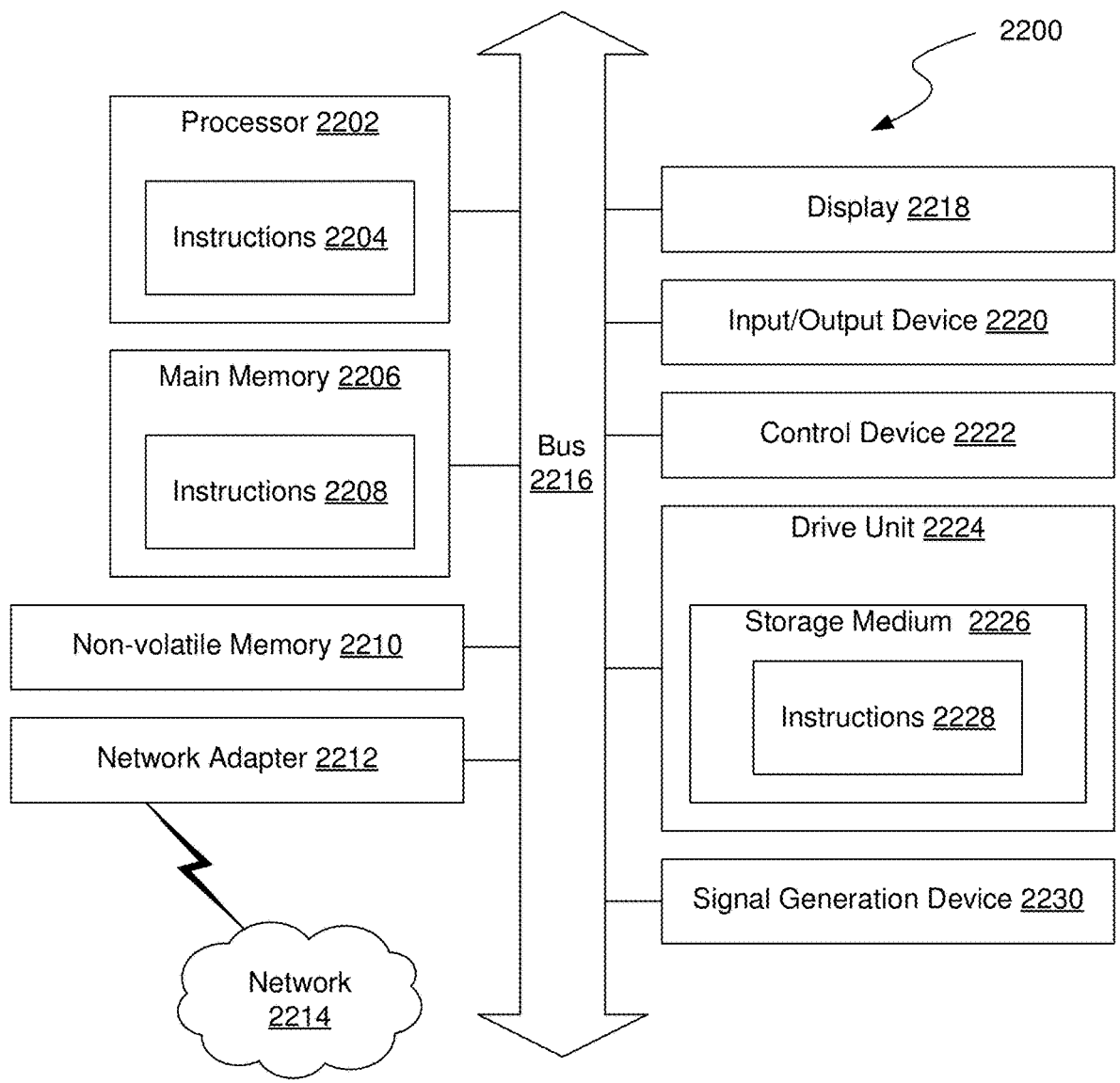
FIG. 22 is a block diagram of an example of a processing system in which at least some operations described in this disclosure can be implemented.

FIG. 22 is a block diagram illustrating an example of a computer processing system 2200 in which at least some operations described in this disclosure can be implemented. The example computer processing system 2200 may be part of any of the aforementioned devices including, but not limited to, UAV 100 and mobile device 104. The processing system 2200 may include one or more central processing units ("processors") 2202, main memory 2206, non-volatile memory 2210, network adapter 2212 (e.g., network interfaces), display 2218, input/output devices 2220, control device 2222 (e.g., keyboard and pointing devices), drive unit 2224 including a storage medium 2226, and signal generation device 2230 that are communicatively connected to a bus 2216. The bus 2216 is illustrated as an abstraction that represents any one or more separate physical buses, point-to-point connections, or both connected by appropriate bridges, adapters, or controllers. The bus 2216, therefore, can include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus (also called "Firewire"). A bus may also be responsible for relaying data packets (e.g., via full or half duplex wires) between components of the network appliance, such as the switching fabric, network port(s), tool port(s), etc.

While the main memory 2206, non-volatile memory 2210, and storage medium 2226 (also called a "machine-readable medium") are shown to be a single medium, the term "machine-readable medium" and "storage medium" should be taken to include a single medium or multiple media (e.g., a centralized or distributed database, and/or associated caches and servers) that store one or more sets of instructions 2228. The term "machine-readable medium" and "storage medium" shall also be taken to include any medium that is capable of storing, encoding, or carrying a set of instructions for execution by the computing system and that cause the computing system to perform any one or more of the methodologies of the presently disclosed embodiments.

In general, the routines executed to implement the embodiments of the disclosure may be implemented as part of an operating system or a specific application, component, program, object, module, or sequence of instructions referred to as "computer programs." The computer programs typically comprise one or more instructions (e.g., instructions 2204, 2208, 2228) set at various times in various memory and storage devices in a computer, and that, when read and executed by one or more processing units or processors 2202, cause the processing system 2200 to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include recordable type media such as volatile and non-volatile memory devices 2210, floppy and other removable disks, hard disk drives, optical discs (e.g., Compact Disk Read-Only Memory (CD-ROMS), Digital Versatile Disks (DVDs)), and transmission type media such as digital and analog communication links.

The network adapter 2212 enables the computer processing system 2200 to mediate data in a network 2214 with an entity that is external to the computer processing system 2200, such as a network appliance, through any known and/or convenient communications protocol supported by the computer processing system 2200 and the external entity. The network adapter 2212 can include one or more of a network adaptor card, a wireless network interface card, a router, an access point, a wireless router, a switch, a multi-layer switch, a protocol converter, a gateway, a bridge, a bridge router, a hub, a digital media receiver, and/or a repeater.

The network adapter 2212 can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including, for example, the access and operation rights of an object by an individual, a machine, and/or an application, and the circumstances under which the permission rights stand.

As indicated above, the techniques introduced here may be implemented by, for example, programmable circuitry (e.g., one or more microprocessors), programmed with software and/or firmware, entirely in special-purpose hardwired (i.e., non-programmable) circuitry, or in a combination or such forms. Special-purpose circuitry can be in the form of, for example, one or more application-specific integrated circuits (ASICs), programmable logic devices (PLDs), field-programmable gate arrays (FPGAs), etc.

Note that any of the embodiments described above can be combined with another embodiment, except to the extent that it may be stated otherwise above, or to the extent that any such embodiments might be mutually exclusive in function and/or structure.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method of operating an aerial vehicle for autonomous landing, the method comprising:
    generating, based on images captured by a camera mounted to the aerial vehicle, a multi-cell ground map of a portion of a surface in a physical environment, the ground map including multiple cells each having characteristic data derived from a plurality of image-based features associated with the respective cell;
    identifying, based on the ground map, a landing footprint comprising a subset of the multiple cells that have characteristic data satisfying a specified landing criterion;
    designating a landing area on a surface in the physical environment corresponding to the identified landing footprint; and
    causing the aerial vehicle to autonomously land on the designated landing area.

2. The method of claim 1, further comprising:
    processing the images captured by the camera to determine multiple data points indicative of height values at multiple points;
    setting or updating the characteristic data for cells in the ground map based on one or more of the multiple data points that correspond to the cells.

3. The method of claim 2, wherein processing the images captured by the camera to determine multiple data points comprises:
    processing the images to generate a disparity image; and
    mapping pixels in the disparity image to three-dimensional (3D) points in space corresponding to the points along the surface in the physical environment, each of the 3D points having a height value based on its respective position in space;
    wherein one or more of the multiple data points are based on the height values of the 3D points.

4. The method of claim 3, wherein characteristic data for a particular cell includes statistical height information of multiple 3D points along a portion of the surface of the physical environment that corresponds with the particular cell.

5. The method of claim 4, wherein setting or updating the characteristic data for the particular cell includes processing data points corresponding to the particular cell to calculate a mean height value for the particular cell.

6. The method of claim 4, wherein setting or updating the characteristic data for the particular cell includes processing data points corresponding to the particular cell to calculate a sum of squared differences in height values for the particular cell.

7. The method of claim 1, further comprising:
    monitoring an operational status of the aerial vehicle while the aerial vehicle is in flight within the physical environment;
    determining, based on the monitoring, that the operational status of the aerial vehicle does not satisfy an operational criterion; and
    responsively generating, by the aerial vehicle, an instruction to land,
    wherein the aerial vehicle generates the ground map responsive to the instruction to land.

8. The method of claim 1, further comprising:
    receiving, by the aerial vehicle, an instruction to land,
    wherein the aerial vehicle generates the ground map responsive to the instruction to land.

9. An apparatus comprising:
    one or more non-transitory computer readable storage media having program instructions stored thereon that, when executed by a processor, direct the processor to:
    process images to determine data points representative of height values at multiple points along a surface in a physical environment, wherein the images are captured by a camera mounted to an aerial vehicle while the aerial vehicle is in flight through the physical environment;

generate a multi-cell ground map of a portion of the surface, the ground map including a grid of multiple cells each of which includes height statistics based on the data points associated with the cell, wherein the ground map is derived from a plurality of image-based features associated with the respective cell;

identify, based on the ground map, a landing footprint comprising a subset of the multiple cells that have characteristic data satisfying a specified landing criterion;

designate a landing area on a surface in the physical environment corresponding to the identified landing footprint; and generate control commands causing the aerial vehicle to autonomously land on the designated landing area.

10. The apparatus of claim 9, wherein to generate the control commands causing the aerial vehicle to autonomously land on the designated landing area, the program instructions, when executed by the processor, direct the processor to:

generate a behavioral objective to land on the designated landing area; and input the generated behavioral objective into a motion planner of the aerial vehicle, the motion planner configured to process multiple behavioral objectives to generate a planned trajectory;

wherein the control commands are generated based on the planned trajectory.

11. The apparatus of claim 9, wherein to generate the ground map of the portion of the surface in the physical environment, the program instructions, when executed by the processor, direct the processor to:

process images captured by the camera to generate a disparity image; and mapping pixels in the generated disparity image to three-dimensional (3D) points in space corresponding to the points along the surface in the physical environment, each of the 3D points having a height value based on its respective position in space;

wherein the data points are based on the height values of the 3D points.

12. The apparatus of claim 11, wherein to generate the ground map of the portion of the surface in the physical environment, the program instructions, when executed by the processor, direct the processor to:

continually add data points to one or more cells in the ground map as new images are processed; and set or update the height statistics for the one or more cells as data points are added.

13. The apparatus of claim 12, wherein to set or update the height statistics for the one or more cells includes, the program instructions, when executed by the processor, direct the processor to:

down-weighting height values associated with older data points as newer data points are added to a particular cell of the one or more cells.

14. The apparatus of claim 9, wherein the height statistics include any of an average height, median height, minimum height, or maximum height of points along a portion of the surface corresponding to the particular cell.

15. The apparatus of claim 9, wherein the specified landing criterion is satisfied if the height statistics associated with the subset of the multiple cells have a variance below a threshold level.

16. The apparatus of claim 9, wherein the program instructions, when executed by the processor, direct the processor to:

process the images to detect a physical object in the physical environment;

extract semantic information associated with the detected physical object; and add the semantic information to one or more cells in the ground map that correspond with a location of the physical object in the physical environment.

17. The apparatus of claim 9, wherein a size and/or shape of the identified footprint is based on any of a size or shape of the aerial vehicle, a user preference, or a characteristic of a portion of the physical environment in proximity to the UAV.

18. An aerial vehicle comprising:

a propulsion system;

a camera configured to capture images of a physical environment; and a navigation system communicatively coupled to the camera and the propulsion system, the navigation system configured to:

generate, based on the images, a multi-cell ground map of a portion of a surface in the physical environment, the ground map including multiple cells each having characteristic data derived from a plurality of image-based features associated with the respective cell;

identify, based on the ground map, a landing footprint comprising a subset of the multiple cells that have characteristic data satisfying a specified landing criterion;

designate a landing area on a surface in the physical environment corresponding to the identified landing footprint; and direct the propulsion system to cause the aerial vehicle to autonomously land the aerial vehicle on the designated landing area.

19. The aerial vehicle of claim 18, wherein the navigation system configured to:

process the images captured by the camera to determine multiple data points indicative of height values at multiple points;

setting or updating the characteristic data for cells in the ground map based on one or more of the multiple data points that correspond to the cells.

20. The aerial vehicle of claim 19, wherein to process the images captured by the camera to determine multiple data points, the navigation system:

processes the images to generate a disparity image; and maps pixels in the disparity image to three-dimensional (3D) points in space corresponding to the points along the surface in the physical environment, each of the 3D points having a height value based on its respective position in space;

wherein one or more of the multiple data points are based on the height values of the 3D points.

* * * * *